(12) United States Patent
Yamashita

(10) Patent No.: US 7,342,945 B2
(45) Date of Patent: Mar. 11, 2008

(54) DATA TIME DIFFERENCE ABSORBING CIRCUIT AND DATA RECEIVING METHOD AND DEVICE

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 919 days.

(21) Appl. No.: 10/466,378

(22) PCT Filed: Jan. 16, 2002

(86) PCT No.: PCT/JP02/00218

§ 371 (c)(1),
(2), (4) Date: Jul. 15, 2003

(87) PCT Pub. No.: WO02/058316

PCT Pub. Date: Jul. 25, 2002

(65) Prior Publication Data

US 2004/0073725 A1   Apr. 15, 2004

(30) Foreign Application Priority Data

Jan. 17, 2001   (JP)   ............................. 2001-009107

(51) Int. Cl.
*H04J 3/06*   (2006.01)
(52) U.S. Cl. ...................... 370/516; 348/500
(58) Field of Classification Search ................ 370/516, 370/503, 517; 348/500, 518, 519; 375/354, 375/355, 362
See application file for complete search history.

(56) References Cited

U.S. PATENT DOCUMENTS 5,020,023 A   5/1991   Smith

| 5,278,651 A * | 1/1994 | Wada et al. ................. 348/500 |
| 5,815,117 A * | 9/1998 | Kolanek ...................... 342/442 |
| 6,674,482 B1 * | 1/2004 | Park .......................... 348/536 |
| 6,865,241 B1 * | 3/2005 | Adkins et al. .............. 375/372 |

FOREIGN PATENT DOCUMENTS

| JP | 2-247709 | 10/1990 |
| JP | 3-93331 | 4/1991 |
| JP | 8-79226 | 3/1996 |
| JP | 10-247175 | 9/1998 |
| JP | 2000-332741 | 11/2000 |

* cited by examiner

*Primary Examiner*—Ricky Q. Ngo
*Assistant Examiner*—Pao Sinkantarakorn
(74) *Attorney, Agent, or Firm*—Frommer Lawrence & Haug LLP; William S. Frommer

(57) ABSTRACT

A data time difference absorbing circuit comprises a memory (36) in which first digital data containing first time reference code data are stored and from which the first digital data are read, a memory (37) in which second digital data containing second time reference code data are stored and from which the second digital data are read, a timing data detecting portion (41) for detecting the first time reference code data contained in the first digital data read from the memory (36) and the second time reference code data contained in the second digital data read from the memory (37), a phase difference detecting portion (42) for detecting a phase difference between the first and second time reference code data, and a control signal producing portion (40) operative to control at least one of a timing at which the first digital data are read from the memory (36) and a timing at which the second digital data are read from the memory (37) in response to the phase difference detected by the phase difference detecting portion (42) so as to keep a condition in which the phase difference detected by the phase difference detecting portion (42) is substantially zero.

45 Claims, 29 Drawing Sheets

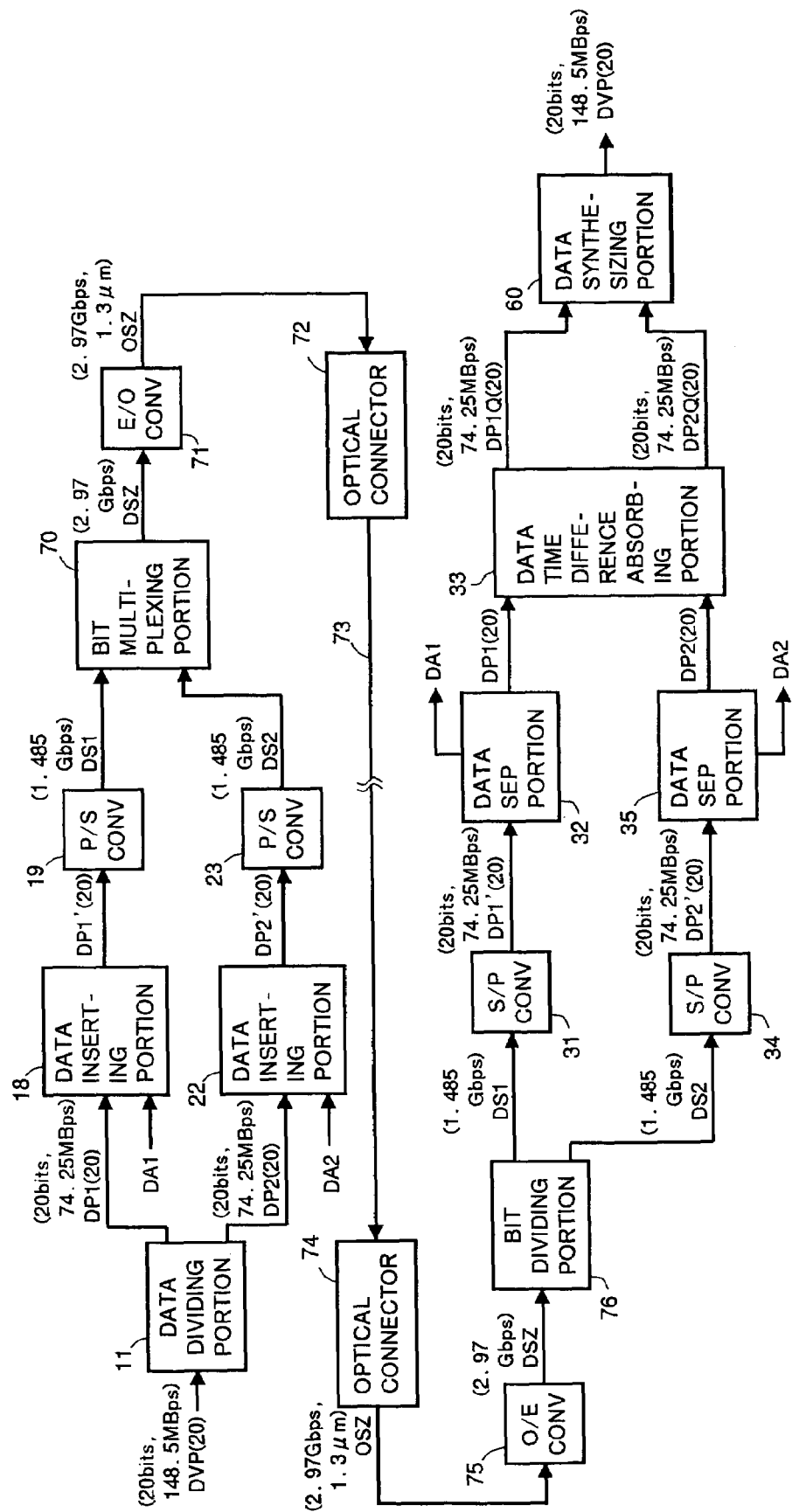

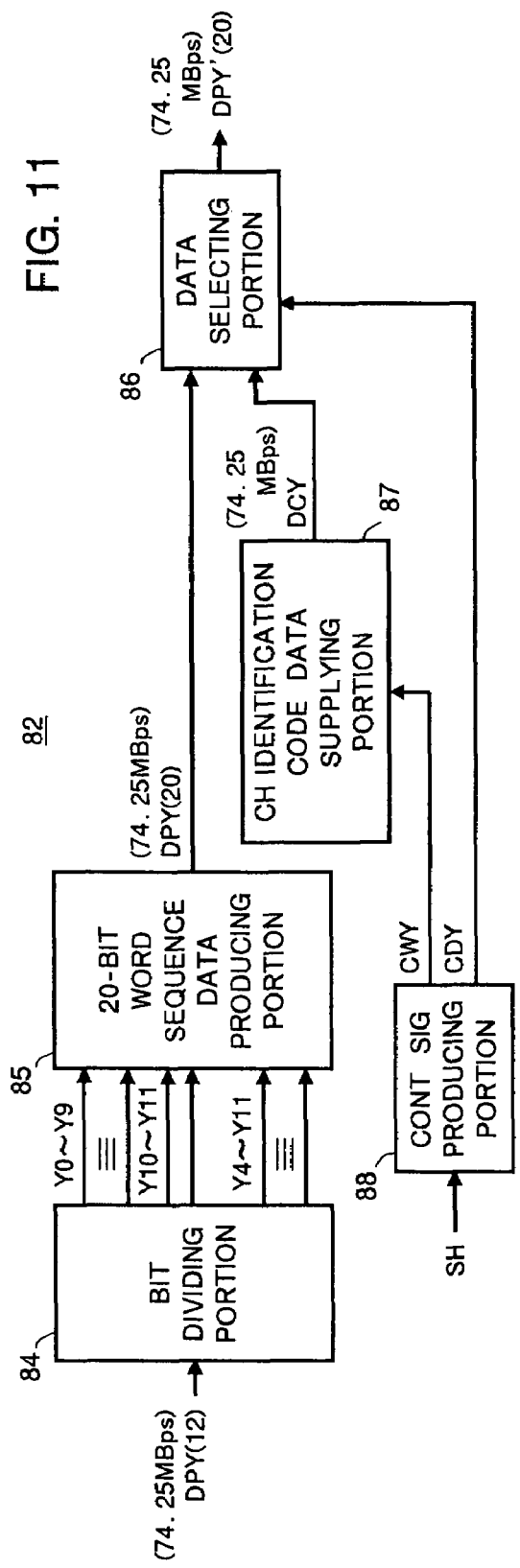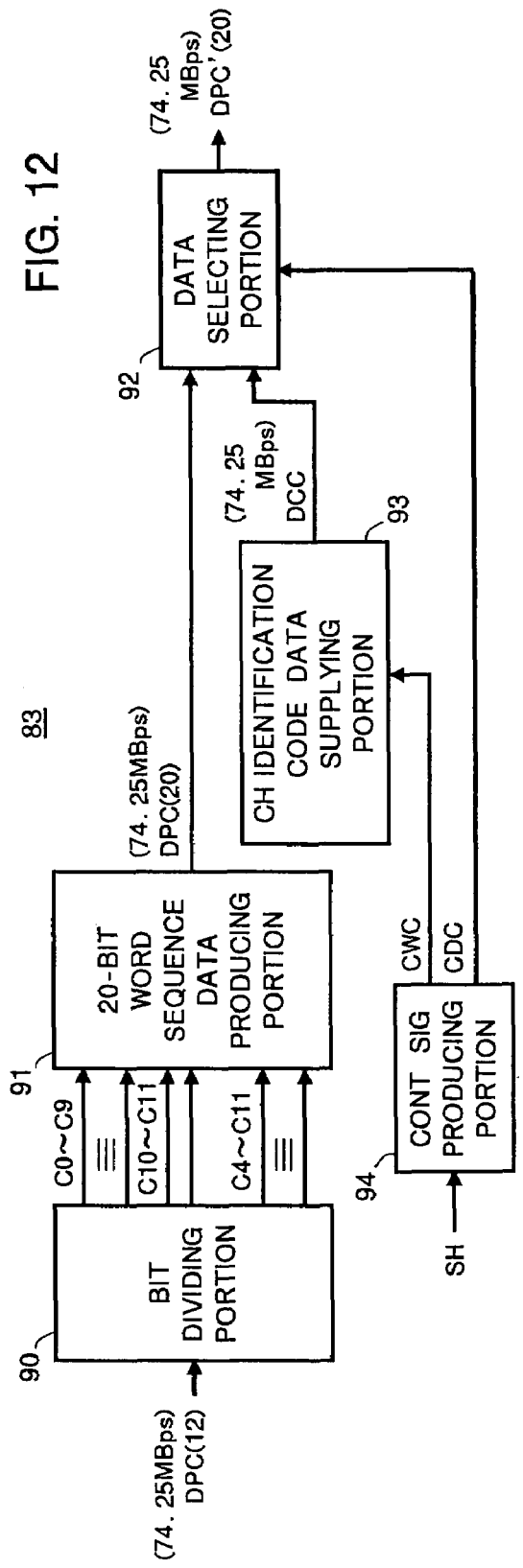

FIG. 26A

DRGB(36)A
(74.25MBps)

| [G DATA SEQUENCE] 12 bits | GD0 | GD1 | GD2 | GD3 | GD4 | GD5 | GD6 | GD7 |
|---|---|---|---|---|---|---|---|---|
| [B DATA SEQUENCE] 12 bits | BD0 | BD1 | BD2 | BD3 | BD4 | BD5 | BD6 | BD7 |
| [R DATA SEQUENCE] 12 bits | RD0 | RD1 | RD2 | RD3 | RD4 | RD5 | RD6 | RD7 |

FIG. 26B

DRGB(36)B
(74.25MBps)

| [G DATA SEQUENCE] 12 bits | GD0 | GD1 | GD2 | GD3 | GD4 | GD5 | GD6 | GD7 |
|---|---|---|---|---|---|---|---|---|
| [B DATA SEQUENCE] 12 bits | BD0 | BD1 | BD2 | BD3 | BD4 | BD5 | BD6 | BD7 |
| [R DATA SEQUENCE] 12 bits | RD0 | RD1 | RD2 | RD3 | RD4 | RD5 | RD6 | RD7 |

FIG. 27

DRGB(36)A OR DRGB(36)B

10 BITS GROUP 1

| 10 bits | G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
|---|---|---|---|---|---|---|---|---|
| 10 bits | B0;11 ~ B0;2 | B1;11 ~ B1;2 | B2;11 ~ B2;2 | B3;11 ~ B3;2 | B4;11 ~ B4;2 | B5;11 ~ B5;2 | B6;11 ~ B6;2 | B7;11 ~ B7;2 |
| 10 bits | R0;11 ~ R0;2 | R1;11 ~ R1;2 | R2;11 ~ R2;2 | R3;11 ~ R3;2 | R4;11 ~ R4;2 | R5;11 ~ R5;2 | R6;11 ~ R6;2 | R7;11 ~ R7;2 |
| 10 bits | GBR0 (0~1) + $\gamma 0$ | GBR1 (0~1) + $\gamma 1$ | GBR2 (0~1) + $\gamma 2$ | GBR3 (0~1) + $\gamma 3$ | GBR4 (0~1) + $\gamma 4$ | GBR5 (0~1) + $\gamma 5$ | GBR6 (0~1) + $\gamma 6$ | GBR7 (0~1) + $\gamma 7$ |

10 BITS GROUP 2

FIG. 28A

DRGB(20)A1
(74.25MBps)

| 10 bits | G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
|---|---|---|---|---|---|---|---|---|
| 10 bits | B0;11 ~ B0;2 | R0;11 ~ R0;2 | B2;11 ~ B2;2 | R2;11 ~ R2;2 | B4;11 ~ B4;2 | R4;11 ~ R4;2 | B6;11 ~ B6;2 | R6;11 ~ R6;2 |

FIG. 28B

DRGB(20)A2
(74.25MBps)

| 10 bits | GBR0 (0~1) + $\gamma 0$ | GBR1 (0~1) + $\gamma 1$ | GBR2 (0~1) + $\gamma 2$ | GBR3 (0~1) + $\gamma 3$ | GBR4 (0~1) + $\gamma 4$ | GBR5 (0~1) + $\gamma 5$ | GBR6 (0~1) + $\gamma 6$ | GBR7 (0~1) + $\gamma 7$ |
|---|---|---|---|---|---|---|---|---|
| 10 bits | B1;11 ~ B1;2 | R1;11 ~ R1;2 | B3;11 ~ B3;2 | R3;11 ~ R3;2 | B5;11 ~ B5;2 | R5;11 ~ R5;2 | B7;11 ~ B7;2 | R7;11 ~ R7;2 |

FIG. 29A

DRGB(20)B1
(74.25MBps)

| 10 bits | G0;11 ~ G0;2 | G1;11 ~ G1;2 | G2;11 ~ G2;2 | G3;11 ~ G3;2 | G4;11 ~ G4;2 | G5;11 ~ G5;2 | G6;11 ~ G6;2 | G7;11 ~ G7;2 |
|---|---|---|---|---|---|---|---|---|
| 10 bits | B0;11 ~ B0;2 | R0;11 ~ R0;2 | B2;11 ~ B2;2 | R2;11 ~ R2;2 | B4;11 ~ B4;2 | R4;11 ~ R4;2 | B6;11 ~ B6;2 | R6;11 ~ R6;2 |

FIG. 29B

DRGB(20)B2
(74.25MBps)

| 10 bits | GBR0 (0~1) + γ0 | GBR1 (0~1) + γ1 | GBR2 (0~1) + γ2 | GBR3 (0~1) + γ3 | GBR4 (0~1) + γ4 | GBR5 (0~1) + γ5 | GBR6 (0~1) + γ6 | GBR7 (0~1) + γ7 |
|---|---|---|---|---|---|---|---|---|
| 10 bits | B1;11 ~ B1;2 | R1;11 ~ R1;2 | B3;11 ~ B3;2 | R3;11 ~ R3;2 | B5;11 ~ B5;2 | R5;11 ~ R5;2 | B7;11 ~ B7;2 | R7;11 ~ R7;2 |

FIG. 31A

| 3FF(R) | 3FF(B) | 000(G) | 000(R) | 000(B) | XYZ(G) | LN1(R) | LN1(B) | LN2(G) |
|---|---|---|---|---|---|---|---|---|
| ... | ... | ... | ... | ... | ... | ... | ... | ... |
| 3FF(G) | 000(R) | 000(B) | 000(G) | XYZ(R) | XYZ(B) | LN1(G) | LN2(R) | LN2(B) |

DQA1(20)

|←——— EAV ———→|

DTA1

FIG. 31B

| 3FF(R) | 3FF(B) | 000(G) | 000(R) | 000(B) | XYZ(G) | LN1(R) | LN1(B) | LN2(G) |
|---|---|---|---|---|---|---|---|---|
| ... | ... | ... | ... | ... | ... | ... | ... | ... |
| 3FF(G) | 000(R) | 000(B) | 000(G) | XYZ(R) | XYZ(B) | LN1(G) | LN2(R) | LN2(B) |

DQA2(20)

|←——— EAV ———→|

DTA2

FIG. 31C

| 3FF(R) | 3FF(B) | 000(G) | 000(R) | 000(B) | XYZ(G) | LN1(R) | LN1(B) | LN2(G) |
|---|---|---|---|---|---|---|---|---|
| ... | ... | ... | ... | ... | ... | ... | ... | ... |
| 3FF(G) | 000(R) | 000(B) | 000(G) | XYZ(R) | XYZ(B) | LN1(G) | LN2(R) | LN2(B) |

DQB1(20)

|←——— EAV ———→|

DTB1

FIG. 31D

| 3FF(R) | 3FF(B) | 000(G) | 000(R) | 000(B) | XYZ(G) | LN1(R) | LN1(B) | LN2(G) |
|---|---|---|---|---|---|---|---|---|
| ... | ... | ... | ... | ... | ... | ... | ... | ... |
| 3FF(G) | 000(R) | 000(B) | 000(G) | XYZ(R) | XYZ(B) | LN1(G) | LN2(R) | LN2(B) |

DQB2(20)

|←——— EAV ———→|

DTB2

DATA TIME DIFFERENCE ABSORBING CIRCUIT AND DATA RECEIVING METHOD AND DEVICE

TECHNICAL FIELD

The present invention relates to a method of receiving a transmitted signal formed based on plural channels of digital data which represent signal information such as video signal information or the like and reproducing the plural channels of digital data from the transmitted signal received thereby, an apparatus for receiving a transmitted signal formed based on plural channels of digital data, on which the method is carried out, or a data time difference absorbing circuit for being employed in the apparatus.

TECHNICAL BACKGROUND

In the field of data transmission in which digital word sequence data containing information data representing signal information such as video signal information or the like are transmitted, an electric transmission system and an optical transmission system have been proposed to be put into practice. In the case of the electric transmission system, the digital word sequence data are converted to serial data and one or more electric signals are produced based on the serial data to be transmitted through one or more transmission lines each made of a coaxial cable or a pair of twisted lines. In the case of the optical transmission system, the digital word sequence data are converted to serial data and one or more optical signals are produced based on the serial data to be transmitted through one or more transmission lines each made of an optical fiber cables.

In the field of video signals, digitalization of video signals has been aimed for actualizing diversification in information to be transmitted, improvements in quality of images reproduced from the video signal and so on. For example, there has been proposed the High Definition Television (HDTV) system which uses a digital video signal composed of digital word sequence data representing video signal information. The digital video signal under the HDTV system (hereinafter, referred to an HD digital video signal) is formed in accordance with, for example, one of a series of standards established by the Broadcasting Technology Association (BTA) in Japan so as to be in the form of Y and $P_B/P_R$ signals or G, B and R signals. In the case of the Y and $P_B/P_R$ signals, Y represents a luminance signal and $P_B/P_R$ represent color difference signals. In the case of the G, B and R signals, G, B and R represent green, blue and red primary color signals, respectively.

The HD digital video signal produced in the form of Y and $P_B/P_R$ signals is a digital television signal for interlaced scanning by which each frame picture is formed with first and second field pictures each appearing at a rate of 60 Hz or 60/1.001 Hz (hereinafter, the expression "60 Hz" includes both of 60 Hz and 60/1.001 Hz) and produced in accordance with such data formats as shown in FIGS. 1A and 1B.

The data formats shown in FIGS. 1A and 1B include a luminance signal data sequence (Y data sequence) YD(10) as shown in FIG. 1A, which represents a luminance signal component of a video signal, and a color difference signal data sequence (PB/PR data sequence) CD(10) as shown in FIG. 1B, which represents color difference signal components of the video signal. Each of data words constituting the Y data sequence YD(10) or the $P_B/P_R$ data sequence CD(10) is composed of 10 bits. The word transmission rate of each of the Y data sequence YD(10) and the $P_B/P_R$ data sequence CD(10) is selected to be, for example, 74.25 MBps. A part of the Y data sequence YD(10) which includes a portion corresponding to a horizontal blanking period and parts of portions corresponding to a couple of video data periods appearing before and after the horizontal blanking period in a horizontal period of the Y data sequence YD(10) is shown in FIG. 1A. Similarly, a part of the $P_B/P_R$ data sequence CD(10) which includes a portion corresponding to a horizontal blanking period and parts of portions corresponding to a couple of video data periods appearing before and after the horizontal blanking period in a horizontal period of the $P_B/P_R$ data sequence CD(10) is shown in FIG. 1B.

In the Y data sequence CD(10), time reference code data SAV (Start of Active Video) which are composed of four 10-bit words (3FF(Y), 000(Y), 000(Y), XYZ(Y):3FF and 000 are hexadecimal numbers and (Y) indicates a word contained in the Y data sequence CD(10)) are provided just before a portion corresponding to the video data period and another time reference code data EAV (End of Active Video) which are composed of four 10-bit words (3FF(Y), 000(Y), 000(Y), XYZ(Y)) are provided just after the portion corresponding to the video data period. Similarly, in the PB/PR data sequence CD(10), time reference code data SAV which are composed of four 10-bit words (3FF(C), 000(C), 000(C), XYZ(C): 3FF and 000 are hexadecimal numbers and (C) indicates a word contained in the $P_B/P_R$ data sequence CD(10)) are provided just before a portion corresponding to the video data period and another time reference code data EAV which are composed of four 10-bit words (3FF(C), 000(C), 000(C), XYZ(C)) are provided just after the portion corresponding to the video data period. The time reference code data EAV and SAV contained in the Y data sequence YD(10) are provided in a portion corresponding to the horizontal blanking period of the Y data sequence YD(10) and the time reference code data EAV and SAV contained in the $P_B/P_R$ data sequence CD(10) are provided in a portion corresponding to the horizontal blanking period of the $P_B/P_R$ data sequence CD (10).

The HD digital video signal produced in the form of G, B and R signals is also a digital television signal for interlaced scanning and produced in accordance with such data formats as shown in FIGS. 2A, 2B and 2C. The data formats shown in FIGS. 2A, 2B and 2C include a green primary color signal data sequence (G data sequence) GD(10) as shown in FIG. 2A, which represents a green primary color signal component of a video signal, a blue primary color signal data sequence (B data sequence) BD(10) as shown in FIG. 2B, which represents a blue primary color signal component of the video signal, and a red primary color signal data sequence (R data sequence) RD(10) as shown in FIG. 2C, which represents a red primary color signal component of the video signal. Each of data words constituting the G data sequence GD(10), the B data sequence BD(10) or the R data sequence RD(10) is composed of 10 bits. The word transmission rate of each of the G data sequence GD(10), the B data sequence BD(10) and the R data sequence RD(10) is selected to be, for example, 74.25 MBps. A part of the G data sequence GD(10) which includes a portion corresponding to a horizontal blanking period and parts of portions corresponding to a couple of video data periods appearing before and after the horizontal blanking period in a horizontal period of the G data sequence GD(10) is shown in FIG. 2A. Similarly, a part of the B data sequence BD(10) which includes a portion corresponding to a horizontal blanking period and parts of portions corresponding to a couple of video data periods appearing before and after the horizontal blanking period in a horizontal period of the B data sequence BD(10) is shown in FIG. 2B and a part of the R data sequence RD(10) which includes a portion corresponding to a horizontal blanking period and parts of portions corresponding to a couple of video data periods appearing before and after the horizontal blanking period in a horizontal period of the R data sequence RD(10) is shown in FIG. 2C.

In each of the G data sequence GD(10), the B data sequence BD(10) and the R data sequence RD(10), time reference code data SAV which are composed of four 10-bit words (3FF(G), 000(G), 000(G), XYZ(G):3FF and 000 are hexadecimal numbers and (G) indicates a word contained in the G data sequence DG(10)), time reference code data SAV which are composed of four 10-bit words (3FF(B), 000(B), 000(B), XYZ(B):3FF and 000 are hexadecimal numbers and (B) indicates a word contained in the B data sequence BD(10)) or time reference code data SAV which are composed of four 10-bit words (3FF(R), 000(R), 000(R), XYZ (R):3FF and 000 are hexadecimal numbers and (R) indicates a word contained in the R data sequence RD(10)) are provided just before a portion corresponding to the video data period and another time reference code data EAV which are composed of four 10-bit words (3FF(G), 000(G), 000 (G), XYZ(G)), another time reference code data EAV which are composed of four 10-bit words (3FF(B), 000(B), 000(B), XYZ(B)) or another time reference code data EAV which are composed of four 10-bit words (3FF(R), 000(R), 000(R), XYZ(R)) are provided just after the portion corresponding to the video data period. The time reference code data EAV and SAV contained in each of the G data sequence GD(10), the B data sequence BD(10) and the R data sequence RD(10) are provided in a portion corresponding to the horizontal blanking period of each of the G data sequence GD(10), the B data sequence BD(10) and the R data sequence RD(10).

When the HD digital video signal produced, for example, in the form of Y and $P_B/P_R$ signals for interlaced scanning as described above is subjected to transmission through a data transmission line, the Y data sequence YD(10) and the $P_B/P_R$ data sequence CD(10) are multiplexed, with their portions corresponding to the horizontal blanking periods in each of which the time reference code data EAV and SAV are provided and which synchronize with each other, to produce a multiplex word sequence and then the multiplex word sequence is converted to serial data to be transmitted. Each of data words constituting the multiplex word sequence is composed of 20 bits and the word transmission rate of the multiplex word sequence is set to be 74.25 MBps. Accordingly, the HD digital video signal produced in the form of Y and $P_B/P_R$ signals is transmitted in the form of serial data at the bit transmission rate of 74.25×20=1.485 Gbps.

Although, for the present, the HD digital video signal produced in the form of Y and $P_B/P_R$ signals for interlaced scanning is transmitted in the form of serial data having the bit transmission rate of 1.485 Gbps, as described above, there has been proposed for the future to transmit an HD digital video signal produced in the form of Y and $P_B/P_R$ signals which is a digital television signal for sequential scanning by which frame pictures are successively obtained without first and second field pictures. In such a case, the HD digital video signal produced in the form of Y and $P_B/P_R$ signals for sequential scanning, which is usually called a progressive HD digital video signal, is transmitted in the form of serial data having the bit transmission rate of 1.485×2=2.97 Gbps. This bit transmission rate of 2.97 Gbps is twice the bit transmission rate of the serial data based on the HD digital video signal produced in the form of Y and $P_B/P_R$ signals for interlaced scanning.

Namely, when the progressive HD digital video signal produced in the form of Y and $P_B/P_R$ signals is subjected to transmission through a data transmission line, the Y data sequence YD(10) and the $P_B/P_R$ data sequence CD(10), the word transmission rate of each of which is selected to be 74.25×2=148.5 MBps, are multiplexed, with their portions corresponding to the horizontal blanking periods in each of which the time reference code data EAV and SAV are provided and which synchronize with each other, to produce a multiplex word sequence which constitutes a 20-bit word sequence data having the word transmission rate of 148.5 MBps and the multiplex word sequence is converted to serial data to be transmitted. Accordingly, the progressive HD digital video signal produced in the form of Y and $P_B/P_R$ signals is transmitted in the form of serial data having the bit transmission rate of 148.5 MBps×20=2.97 Gbps.

There has been also proposed a kind of progressive HD digital video signal by which frame pictures are successively obtained at a rate of other than 60 Hz, for example, 50 Hz, or which is aimed for reproducing moving pictures of a cinefilm at twenty-four frames per second with so improved quality as to be substantially equal to that of images reproduced by means of the HDTV system and so-called a D-Cinema signal. Although the D-Cinema signal is able to be obtained in the form of one of the progressive HD digital video signals, the frame rate of which is selected to be, for example, 24 Hz or 24/1.001 Hz (hereinafter, the expression "24 Hz" includes both of 24 Hz and 24/1.001 Hz) as mentioned above, the frame rate of the D-Cinema signal is selected to be not only 24 Hz but also a rate other than 24 Hz, for example, 25 Hz, 30 Hz or 30/1.001 Hz (hereinafter, the expression "30 Hz" includes both of 30 Hz and 30/1.001 Hz).

Such a progressive HD digital video signal produced in the form of Y and $P_B/P_R$ signals and transmitted in the form of serial data having the bit transmission rate of 2.97 Gbps is of extremely high speed compared with the previous HD digital video signal. Consequently, it is necessary for transmitting the progressive HD digital video signal produced in the form of Y and $P_B/P_R$ signals to use circuit devices containing respectively a serial to parallel (S/P) convertor which can deal with serial data at an extremely high bit transmission rate, a parallel to serial (P/S) convertor which can deal with serial data at an extremely high bit transmission rate and so on. However, it is impossible to apply previously proposed circuit devices containing respectively an S/P convertor, a P/S convertor and so on to be used as the circuit devices containing respectively the S/P convertor which can deal with serial data having the extremely high bit transmission rate, the P/S convertor which can deal with serial data having the extremely high bit transmission rate and so on. This means that new circuit devices containing respectively the S/P convertor which can deal with serial data having the extremely high bit transmission rate, the P/S convertor which can deal with serial data having the extremely high bit transmission rate and so on, must be developed and such development of the new circuit devices necessitates long time and great cost.

In the situation as mentioned above, it has been proposed to divide the progressive HD digital video signal into two channels of digital data so that circuit devices containing respectively the S/P convertor, the P/S convertor and so on, which have been already put into practice to be used for transmitting the HD digital video signal produced in the form of Y and $P_B/P_R$ signals for interlaced scanning, can be used for transmitting each of two channels of digital data when word sequence data such as the progressive HD digital video signal are transmitted. According to this proposal, for example, the progressive HD digital video signal produced in the form of Y and $P_B/P_R$ signals, which constitutes 20-bit word sequence data having the word transmission rate of 148.5 MBps, is divided into two channels of digital data each constituting 20-bit word sequence data having the word transmission rate of 74.25 MBps. In such a case, although two data transmission channels are required, the circuit devices containing respectively the S/P convertor, the P/S convertor and so on, which have been previously developed to be used for transmitting the HD digital video signal produced in the form of Y and $P_B/P_R$ signals for interlaced scanning, can be used in each of the data transmission channels for transmitting the divided progressive HD digital video signal produced in the form of Y and $P_B/P_R$ signals.

When such word sequence data as the progressive HD digital video signal produced in the form of Y and $P_B/P_R$ signals are divided into two channels of digital data and these digital data are transmitted through two data transmission channels, respectively, it is strongly desired that any time difference is not brought about between two channels of digital data transmitted respectively through two data transmission channels so that the original word sequence data can be appropriately reproduced from two channels of digital data received at a receiving side. However, in practice, it is quite difficult to prevent the time difference from bringing about between two channels of digital data transmitted respectively through two data transmission channels for the following reasons.

When two channels of digital data are transmitted respectively through two data transmission channels, each channel of digital data is subjected to various data processings including P/S conversion, S/P conversion and so on in each data transmission channel. As for the P/S conversion or the S/P conversion, for example, variations in logic parameters initially determined in a P/S convertor or S/P convertor conducting the P/S conversion or the S/P conversion of the digital data and variations in processing time in response to a condition of synchronous detection and so on are caused unavoidably. Consequently, time difference resulting from variations in the processing time necessary for the P/S conversion or S/P conversion, for example, and corresponding to, for example, one parallel word period at the maximum is brought about between two channels of digital data transmitted respectively through two data transmission channels.

With regard to transmission of two channels of digital data, there has been previously proposed a circuit for absorbing time difference between two transmitted channels of digital data, as described in, for example, Japanese patent application published before examination under publication number TOKUKAISHO 10-257037. In the circuit thus proposed, two channels digital data are converted respectively into two optical signals having respective central wavelengths different from each other and two optical signals are multiplexed to be transmitted through an optical fiber. The circuit is operative to absorb transmission time difference between two optical signals transmitted through the optical fiber, which results from delay time of each of the optical signals which is brought about in the optical fiber to correspond to the wavelength of the optical signal. In more concrete terms, the delay time of each of the optical signals brought about in the optical fiber is previously presumed based on the central wavelength of the optical signal and a FIFO (first-in first-out) memory device is provided in one of data transmitting channels, in which the shorter delay time of the optical signal is caused. The digital data converted from one of the optical signals transmitted through the optical fiber to have the shorter delay time is stored once in the FIFO memory and then read from the FIFO memory so as to have time delay substantially equal to the time delay of the digital data converted from the other of the optical signals transmitted through the optical fiber. Consequently, the time difference between two channels of digital data converted respectively from the optical signals transmitted through the optical fiber can be absorbed.

This previously proposed circuit for absorbing time difference between two channels of digital data in not able to be applied for absorbing time difference which is caused between two channels of digital data transmitted respectively two data transmission channels by, for example, P/S conversion or S/P conversion to which each of the two channels of digital data are subjected in the respective data transmission channel. The reason of this is that it is impossible to presume previously processing time necessary for the P/S conversion or S/P conversion to which each of the two channels of digital data are subjected in the respective data transmission channel so as to detect one of the channels of digital data provided with the shorter processing time and therefore one of the channels of digital data which is to be stored once in the FIFO memory and then to be read from the FIFO memory can not be determined.

Under such a condition as described above, any practical embodiment of useful system which can effectively absorb time difference which is caused between two channels of digital data, which are obtained by dividing word sequence data such as a progressive HD digital video data and transmitted respectively two data transmission channels, by P/S conversion, S/P conversion or the like to which each of two channels of digital data is subjected in the respective data transmission channel, has not been previously found. Further, any literature or thesis disclosing the useful system which can effectively absorb such time difference as mentioned above has not been previously found also.

Accordingly, it is an object of the present invention to provide a data time difference absorbing circuit which is operative to absorb appropriately and effectively time difference which caused between plural channels of digital data transmitted respectively through plural data transmission channels by, for example, P/S conversion or S/P conversion to which each of the plural channels of digital data is subjected in the respective data transmission channel, a method of receiving digital data in which the data time difference absorbing circuit can be used, and an apparatus for receiving digital data on which the method of receiving digital data is carried out.

DISCLOSURE OF THE INVENTION

According to a first aspect of the present invention, there is provided a data time difference absorbing circuit, which comprises a first memory in which each part having predetermined data amount of first digital data containing first time reference code data is stored one by one and from which each stored part of the first digital data is read one by one, a second memory in which each part having predetermined data amount of second digital data containing second time reference code data is stored one by one and from which each stored part of the second digital data is read one by one, a data detector for detecting the first time reference code data contained in the first digital data read from them first memory and the second time reference code data contained in the second digital data read from the second memory, a phase difference detector for detecting a phase difference between the first and second time reference code data detected by the data detector, and a memory controller operative to control at least one of a first timing at which the first digital data are read from the first memory and a second timing at which the second digital data are read from the second memory in response to the phase difference detected by the phase difference detector so as to keep a condition in which the phase difference detected by the phase difference detector is substantially zero.

According to a second aspect of the present invention, there is provided a data time difference absorbing circuit, which comprises a first memory in which each part having predetermined data amount of first digital data containing first time reference code data is stored one by one and from which each stored part of the first digital data is read one by one, a second memory in which each part having predetermined data amount of second digital data containing second time reference code data is stored one by one and from which each stored part of the second digital data is read one by one, a third memory in which each part having predetermined data amount of third digital data containing third time reference code data is stored one by one and from which each stored part of the third digital data is read one by one, a data detector for detecting the first time reference code data contained in the first digital data read from them first memory, the second time reference code data contained in the second digital data read from the second memory and the third time reference code data contained in the third digital data read from the third memory, a phase difference detector for detecting a phase difference between each two of the first, second and third time reference code data detected by the data detector, and a memory controller operative to control at least one of a first timing at which the first digital data are read from the first memory, a second timing at which the second digital data are read from the second memory and a third timing at which the third digital data are read from the third memory in response to the phase difference detected by the phase difference detector so as to keep a condition in which the phase difference detected by the phase difference detector is substantially zero.

According to a third aspect of the present invention, there is provided a data time difference absorbing circuit, which comprises a first memory in which each part having predetermined data amount of first digital data containing first time reference code data is stored one by one and from which each stored part of the first digital data is read one by one, a second memory in which each part having predetermined data amount of second digital data containing second time reference code data is stored one by one and from which each stored part of the second digital data is read one by one, a third memory in which each part having predetermined data amount of third digital data containing third time reference code data is stored one by one and from which each stored part of the third digital data is read one by one, a fourth memory in which each part having predetermined data amount of fourth digital data containing fourth time reference code data is stored one by one and from which each stored part of the fourth digital data is read one by one, a data detector for detecting the first time reference code data contained in the first digital data read from them first memory, the second time reference code data contained in the second digital data read from the second memory, the third time reference code data contained in the third digital data read from the third memory and the fourth time reference code data contained in the fourth digital data read from the fourth memory, a phase difference detector for detecting a phase difference between each two of the first, second, third and fourth time reference code data detected by the data detector, and a memory controller operative to control at least one of a first timing at which the first digital data are read from the first memory, a second timing at which the second digital data are read from the second memory, a third timing at which the third digital data are read from the third memory and a fourth timing at which the fourth digital data are read from the fourth memory in response to the phase difference detected by the phase difference detector so as to keep a condition in which the phase difference detected by the phase difference detector is substantially zero.

According to a fourth aspect of the present invention, there is provided a method of receiving digital data, which comprises the steps of receiving a signal transmitted through a data transmission line, obtaining a first digital data containing a first time reference code data and a second digital data containing a second time reference code data from the signal received, storing each part having predetermined data amount of the first digital data in a first memory one by one and each part having predetermined data amount of the second digital data in a second memory one by one and then reading each stored part of the first digital data from the first memory one by one and each stored part of the second digital data from the second memory, detecting the first time code data contained in the first digital data read from the first memory and the second time code data contained in the second digital data read from the second memory, detecting a phase difference between the first and second time reference code data previously detected, and controlling at least one of a first timing at which the first digital data are read from the first memory and a second timing at which the second digital data are read from the second memory in response to the phase difference previously detected so as to keep a condition in which the phase difference previously detected is substantially zero.

According to a fifth aspect of the present invention, there is provided a method of receiving digital data, which comprises the steps of receiving a signal transmitted through a data transmission line, obtaining a first digital data containing a first time reference code data, a second digital data containing a second time reference code data and a third digital data containing a third time reference code data from the signal received, storing each part having predetermined data amount of the first digital data in a first memory one by one, each part having predetermined data amount of the second digital data in a second memory one by one and each part having predetermined data amount of the third digital data in a third memory one by one and then reading each stored part of the first digital data from the first memory one by one, each stored part of the second digital data from the second memory and each stored part of the third digital data from the third memory, detecting the first time code data contained in the first digital data read from the first memory, the second time code data contained in the second digital data read from the second memory and the third time reference code data contained in the third digital data read from the third memory, detecting a phase difference between each two of the first, second and third time reference code data previously detected, and controlling at least one of a first timing at which the first digital data are read from the first memory, a second timing at which the second digital data are read from the second memory and a third timing at which the third digital data are read from the third memory in response to the phase difference previously detected so as to keep a condition in which the phase difference previously detected is substantially zero.

According to a sixth aspect of the present invention, there is provided a method of receiving digital data, which comprises the steps of receiving a signal transmitted through a data transmission line, obtaining a first digital data containing a first time reference code data, a second digital data containing a second time reference code data, a third digital data containing a third time reference code data and a fourth digital data containing a fourth time reference code data from the signal received, storing each part having predetermined data amount of the first digital data in a first memory one by one, each part having predetermined data amount of the second digital data in a second memory one by one, each part having predetermined data amount of the third digital data in a third memory one by one and each part having predetermined data amount of the fourth digital data in a fourth memory one by one and then reading each stored part of the first digital data from the first memory one by one, each stored part of the second digital data from the second memory, each stored part of the third digital data from the third memory and each stored part of the fourth digital data from the fourth memory, detecting the first time code data contained in the first digital data read from the first memory, the second time code data contained in the second digital data read from the second memory, the third time reference code data contained in the third digital data read from the third memory and the fourth time reference code data contained in the fourth digital data read from the fourth memory, detecting a phase difference between each two of the first, second, third and fourth time reference code data previously detected, and controlling at least one of a first timing at which the first digital data are read from the first memory, a second timing at which the second digital data are read from the second memory, a third timing at which the third digital data are read from the third memory and a fourth timing at which the fourth time reference code data contained in the fourth digital data read from the fourth memory in response to the phase difference previously detected so as to keep a condition in which the phase difference previously detected is substantially zero.

According to a seventh aspect of the present invention, there is provided an apparatus for receiving digital data, which comprises a data receiving portion for receiving a signal transmitted through a data transmission line, a digital data producing portion for obtaining a first digital data containing a first time reference code data and a second digital data containing a second time reference code data from the signal received by the data receiving portion, a first memory in which each part having predetermined data amount of the first digital data is stored one by one and from which each stored part of the first digital data is read one by one, a second memory in which each part having predetermined data amount of the second digital data is stored one by one and from which each stored part of the second digital data is read one by one, a data detecting portion for detecting the first time reference code data contained in the first digital data read from the first memory and the second time reference code data contained in the second digital data read from the second memory, a phase difference detecting portion for detecting a phase difference between the first and second time reference code data detected by the data detector, and a memory controlling portion operative to control at least one of a first timing at which the first digital data are read from the first memory and a second timing at which the second digital data are read from the second memory in response to the phase difference detected by the phase difference detecting portion so as to keep a condition in which the phase difference detected by the phase difference detecting portion is substantially zero.

According to an eighth aspect of the present invention, there is provided an apparatus for receiving digital data, which comprises a data receiving portion for receiving a signal transmitted through a data transmission line, a digital data producing portion for obtaining a first digital data containing a first time reference code data, a second digital data containing a second time reference code data and a third digital data containing a third time reference code data from the signal received by the data receiving portion, a first memory in which each part having predetermined data amount of the first digital data is stored one by one and from which each stored part of the first digital data is read one by one, a second memory in which each part having predetermined data amount of the second digital data is stored one by one and from which each stored part of the second digital data is read one by one, a third memory in which each part having predetermined data amount of the third digital data is stored one by one and from which each stored part of the third digital data is read one by one, a data detecting portion for detecting the first time reference code data contained in the first digital data read from the first memory, the second time reference code data contained in the second digital data read from the second memory and the third time reference code data contained in the third digital data read from the third memory, a phase difference detecting portion for detecting a phase difference between each two of the first, second and third time reference code data detected by the data detector, and a memory controlling portion operative to control at least one of a first timing at which the first digital data are read from the first memory, a second timing at which the second digital data are read from the second memory and a third timing at which the third digital data are read from the third memory in response to the phase difference detected by the phase difference detecting portion so as to keep a condition in which the phase difference detected by the phase difference detecting portion is substantially zero.

According to a ninth aspect of the present invention, there is provided an apparatus for receiving digital data, which comprises a data receiving portion for receiving a signal transmitted through a data transmission line, a digital data producing portion for obtaining a first digital data containing a first time reference code data, a second digital data containing a second time reference code data, a third digital data containing a third time reference code data and fourth digital data containing a fourth time reference code data from the signal received by the data receiving portion, a first memory in which each part having predetermined data amount of the first digital data is stored one by one and from which each stored part of the first digital data is read one by one, a second memory in which each part having predetermined data amount of the second digital data is stored one by one and from which each stored part of the second digital data is read one by one, a third memory in which each part having predetermined data amount of the third digital data is stored one by one and from which each stored part of the third digital data is read one by one and a fourth memory in which each part having predetermined data amount of the fourth digital data is stored one by one and from which each stored part of the fourth digital data is read one by one, a data detecting portion for detecting the first time reference code data contained in the first digital data read from the first memory, the second time reference code data contained in the second digital data read from the second memory, the third time reference code data contained in the third digital data read from the third memory and the fourth time reference code data contained in the fourth digital data read from the fourth memory, a phase difference detecting portion for detecting a phase difference between each two of the first, second, third and fourth time reference code data detected by the data detector, and a memory controlling portion operative to control at least one of a first timing at which the first digital data are read from the first memory, a second timing at which the second digital data are read from the second memory, a third timing at which the third digital data are read from the third memory and a fourth timing at which the fourth digital data are read from the fourth memory in response to the phase difference detected by the phase difference detecting portion so as to keep a condition in which the phase difference detected by the phase difference detecting portion is substantially zero.

In the data time difference absorbing circuit constituted in accordance with the first aspect of the present invention, the first digital data are read from the first memory at the first timing after the first digital data have been stored in the first memory and the second digital data are read from the second memory at the second timing after the second digital data have been stored in the second memory. The first timing and second timing are control led in response to the phase difference between the first and second time reference code data contained in the first and second digital data read from the first and second memories, respectively, so as to keep the condition in which the phase difference between the first and second time reference code data is substantially zero.

Consequently, in either case where one of the first and second digital data stored respectively in the first and second memories retard in relation to the other of the first and second digital data or one of the first and second digital data stored respectively in the first and second memories advance in relation to the other of the first and second digital data, the circuit functions to avoid the time difference between the fist and second digital data read from the first and second memories, respectively. This means that the time difference between the first and second digital data is absorbed appropriately and effectively with the data time difference absorbing circuit according to the first aspect of the present invention.

In the data time difference absorbing circuit constituted in accordance with the second aspect of the present invention, the first digital data are read from the first memory at the first timing after the first digital data have been stored in the first memory, the second digital data are read from the second memory at the second timing after the second digital data have been stored in the second memory and the third digital data are read from the third memory at the third timing after the third digital data have been stored in the third memory. The first timing, second timing and third timing are controlled in response to the phase difference between each two of the first, second and third time reference code data contained in the first, second and third digital data read from the first, second and third memories, respectively, so as to keep the condition in which the phase difference between each two of the first, second and third time reference code data is substantially zero.

Consequently, in either case where at least one of the first, second and third digital data stored respectively in the first, second and third memories retard in relation to the rest of the first, second and third digital data or at least one of the first, second and third digital data stored respectively in the first, second and third memories advance in relation to the rest of the first, second and third digital data, the circuit functions to avoid the time difference between each two of the first, second and third digital data read from the first, second and third memories, respectively. This means that the time difference between each two of the first, second and third digital data is absorbed appropriately and effectively with the data time difference absorbing circuit according to the second aspect of the present invention.

In the data time difference absorbing circuit constituted in accordance with the third aspect of the present invention, the first digital data are read from the first memory at the first timing after the first digital data have been stored in the first memory, the second digital data are read from the second memory at the second timing after the second digital data have been stored in the second memory, the third digital data are read from the third memory at the third timing after the third digital data have been stored in the third memory and the fourth digital data are read from the fourth memory at the fourth timing after the fourth digital data have been stored in the fourth memory. The first timing, second timing, third timing and fourth timing are controlled in response to the phase difference between each two of the first, second, third and fourth time reference code data contained in the first, second, third and fourth digital data read from the first, second, third and fourth memories, respectively, so as to keep the condition in which the phase difference between each two of the first, second, third and fourth time reference code data is substantially zero.

Consequently, in either case where at least one of the first, second, third and fourth digital data stored respectively in the first, second, third and fourth memories retard in relation to the rest of the first, second, third and fourth digital data or at least one of the first, second, third and fourth digital data stored respectively in the first, second, third and fourth memories advance in relation to the rest of the first, second, third and fourth digital data, the circuit functions to avoid the time difference between each two of the first, second, third and fourth digital data read from the first, second, third and fourth memories, respectively. This means that the time difference between each two of the first, second, third and fourth digital data is absorbed appropriately and effectively with the data time difference absorbing circuit according to the third aspect of the present invention.

In the method of receiving digital data constituted in accordance with the fourth aspect of the present invention or the apparatus for receiving digital data constituted in accordance with the seventh aspect of the present invention, the first and second digital data which are obtained from the signal transmitted through the data transmission line are subjected to such data processing that the first digital data are read from the first memory at the first timing after the first digital data have been stored in the first memory and the second digital data are read from the second memory at the second timing after the second digital data have been stored in the second memory. The first timing and second timing are controlled in response to the phase difference between the first and second time reference code data contained in the first and second digital data read from the first and second memories, respectively, so as to keep the condition in which the phase difference between the first and second time reference code data is substantially zero.

Consequently, in either case where one of the first and second digital data stored respectively in the first and second memories retard in relation to the other of the first and second digital data or one of the first and second digital data stored respectively in the first and second memories advance in relation to the other of the first and second digital data, the method or the apparatus functions to avoid the time difference between the fist and second digital data read from the first and second memories, respectively. This means that the time difference between the first and second digital data is absorbed appropriately and effectively with the method of receiving digital data according to the fourth aspect of the present invention or the apparatus for receiving digital data according to the seventh aspect of the present invention In the method of receiving digital data in accordance with the fifth aspect of the present invention or the apparatus for receiving digital data in accordance with the eighth aspect of the present invention, the first, second and third digital data which are obtained from the signal transmitted through the data transmission line are subjected to such data processing that the first digital data are read from the first memory at the first timing after the first digital data have been stored in the first memory, the second digital data are read from the second memory at the second timing after the second digital data have been stored in the second memory and the third digital data are read from the third memory at the third timing after the third digital data have been stored in the third memory. The first timing, second timing and third timing are controlled in response to the phase difference between each two of the first, second and third time reference code data contained in the first, second and third digital data read from the first, second and third memories, respectively, so as to keep the condition in which the phase difference between each two of the first, second and third time reference code data is substantially zero.

Consequently, in either case where at least the first, second and third digital data stored respectively in the first, second and third memories retard in relation to the rest of the first, second and third digital data or at least one of the first, second and third digital data stored respectively in the first, second and third memories advance in relation to the rest of the first, second and third digital data, the method or the apparatus functions to avoid the time difference between each two of the first, second and third digital data read from the first, second and third memories, respectively. This means that the time difference between each two of the first, second and third digital data is absorbed appropriately and effectively with the method of receiving digital data according to the fifth aspect of the present invention or the apparatus for receiving digital data according to the eighth aspect of the present invention.

In the method of receiving digital data in accordance with the sixth aspect of the present invention or the apparatus for receiving digital data in accordance with the ninth aspect of the present invention, the first, second, third and fourth digital data which are obtained from the signal transmitted through the data transmission line are subjected to such data processing that the first digital data are read from the first memory at the first timing after the first digital data have been stored in the first memory, the second digital data are read from the second memory at the second timing after the second digital data have been stored in the second memory, the third digital data are read from the third memory at the third timing after the third digital data have been stored in the third memory and the fourth digital data are read from the fourth memory at the fourth timing after the fourth digital data have been stored in the fourth memory. The first timing, second timing, third timing and fourth timing are controlled in response to the phase difference between each two of the first, second, third and fourth time reference code data contained in the first, second, third and fourth digital data read from the first, second, third and fourth memories, respectively, so as to keep the condition in which the phase difference between each two of the first, second, third and fourth time reference code data is substantially zero.

Consequently, in either case where at least one of the first, second, third and fourth digital data stored respectively in the first, second, third and fourth memories retard in relation to the rest of the first, second, third and fourth digital data or at least one of the first, second and third digital data stored respectively in the first, second, third and fourth memories advance in relation to the rest of the first, second, third and fourth digital data, the method or the apparatus functions to avoid the time difference between each two of the first, second, third and fourth digital data read from the first, second, third and fourth memories, respectively. This means that the time difference between each two of the first, second, third and fourth digital data is absorbed appropriately and effectively with the method of receiving digital data according to the sixth aspect of the present invention or the apparatus according to the ninth aspect of the present invention.

BRIEF DESCRIPTION OF THE DRAWINGS

FIG. 9 is a schematic block diagram showing a third example of a data transmitting and receiving apparatus including a third embodiment of apparatus for receiving digital data according to the seventh aspect of the present invention, in which a third embodiment of data time difference absorbing circuit according to the first aspect of the present invention is employed and a third embodiment of method of receiving digital data according to the fourth aspect of the present invention is carried out;

FIG. 11 is a schematic block diagram showing an embodied structure of a data inserting portion provided in the fourth example shown in FIG. 10;

FIG. 12 is a schematic block diagram showing another embodied structure of the data inserting portion provided in the fourth example shown in FIG. 10;

FIGS. 25, 26A, 26B, 27, 28A, 28B, 29A and 29B are data charts used for explaining the operation of a data dividing portion provided in the tenth example shown in FIGS. 23 and 24;

FIGS. 31A, 31B, 31C and 31D are time charts used for explaining the embodied structure of the data time difference absorbing portion shown in FIG. 30;

EMBODIMENTS MOST PREFERABLE FOR WORKING OF THE INVENTION

Figure 3:
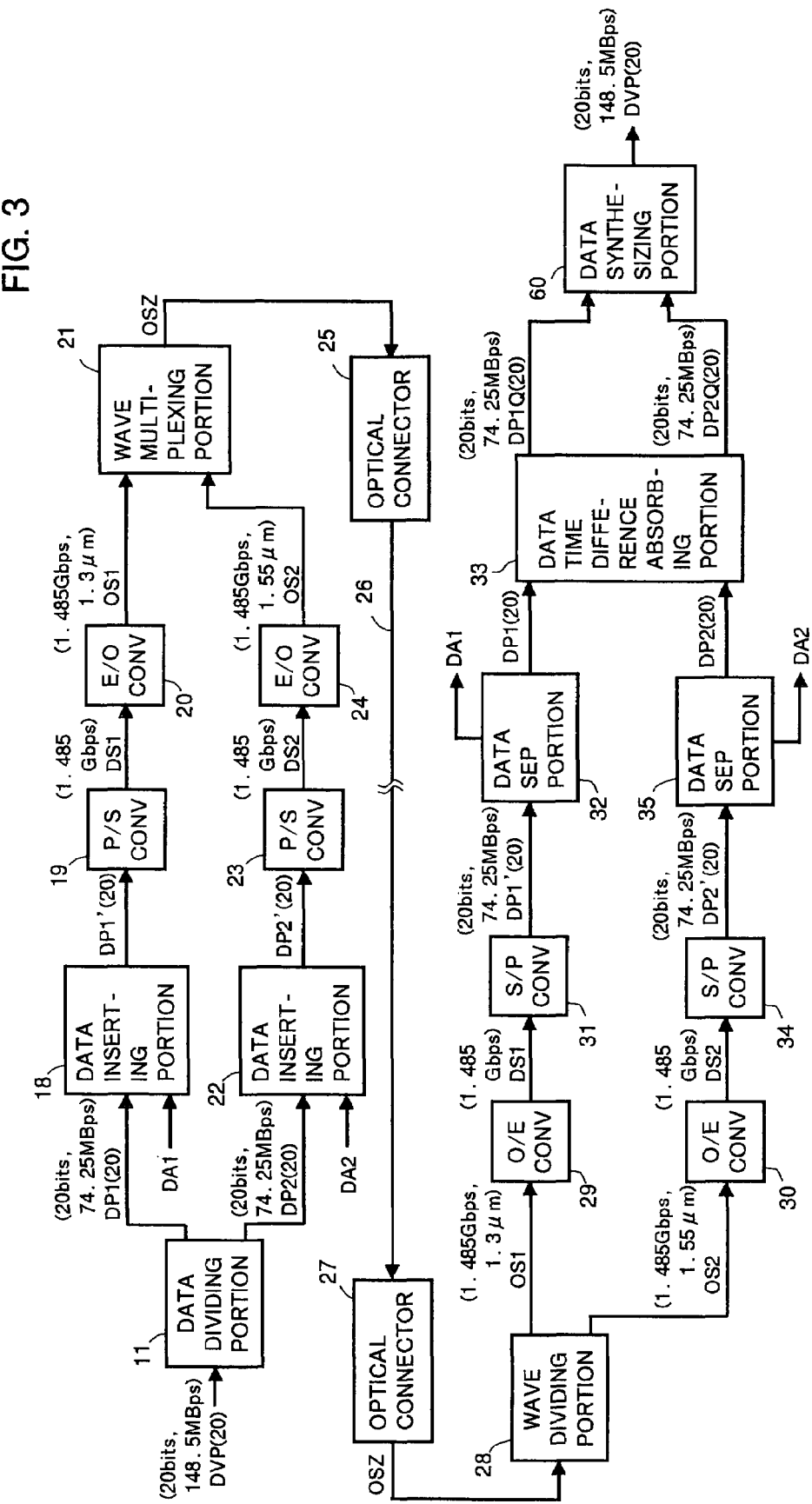
FIG. 3 is a schematic block diagram showing a first example of a data transmitting and receiving apparatus including a first embodiment of apparatus for receiving digital data according to the seventh aspect of the present invention, in which a first embodiment of data time difference absorbing circuit according to the first aspect of the present invention is employed and a first embodiment of method of receiving digital data according to the fourth aspect of the present invention is carried out.

FIG. 3 shows a first example of a data transmitting and receiving apparatus which includes a first embodiment of apparatus for receiving digital data according to the seventh aspect of the present invention, in which a first embodiment of data time difference absorbing circuit according to the first aspect of the present invention is employed and a first embodiment of method of receiving digital data according to the fourth aspect of the present invention is carried out.

Figure 1:
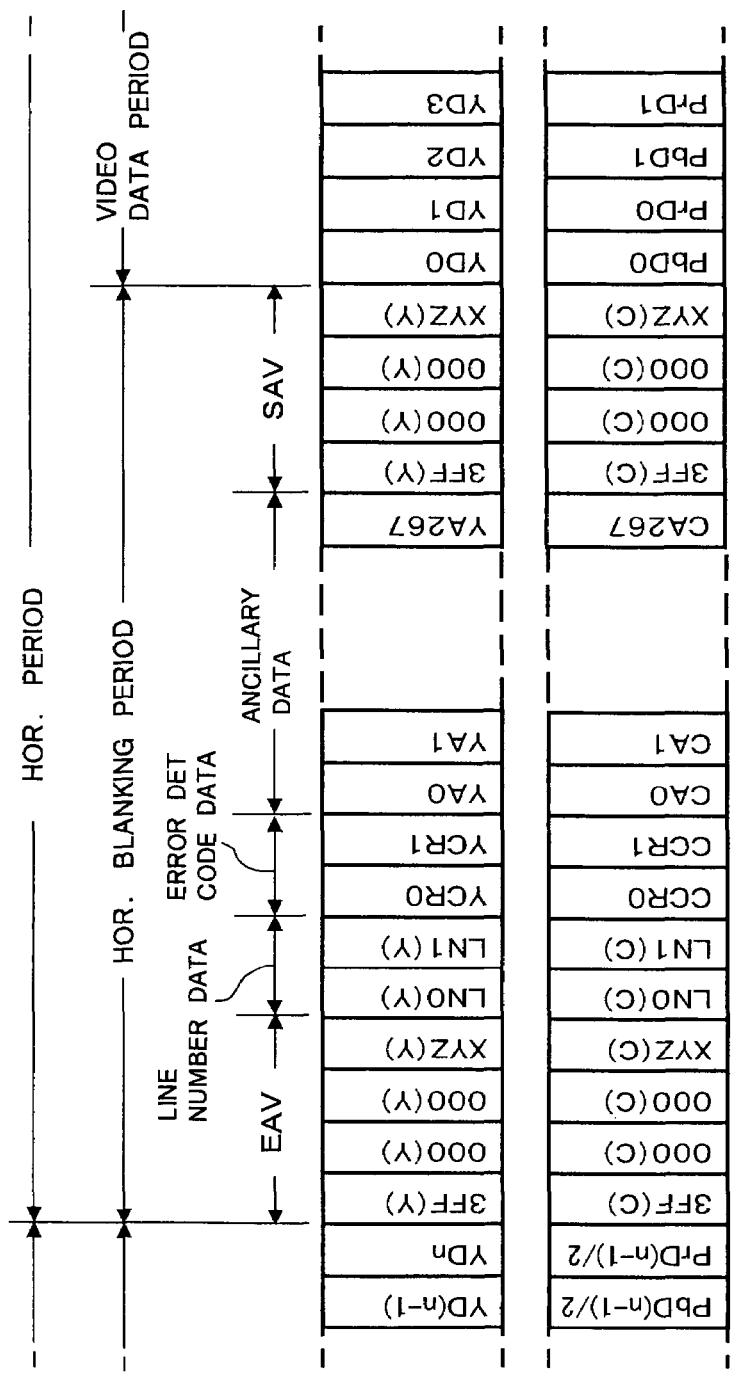
FIGS. 1A and 1B are time charts used for explaining an example of a data format for a digital video signal.

Referring to FIG. 3, a digital video signal DVP(20) is supplied to a data dividing portion 11 at a data transmitting side. The digital video signal DVP(20) is, for example, a progressive HD digital video signal produced in the form of Y and $P_B/P_R$ signals having a frame rate of 60 Hz and constituted with 20-bit word sequence data. The 20-bit word sequence data are composed of a series of 20-bit words, each of which is formed by multiplexing a Y data sequence YD(10) and a $P_B/P_R$ data sequence CD(10) with each other under a condition in which a horizontal blanking period portion of the Y data sequence YD(10) is synchronized with a horizontal blanking period portion of the $P_B/P_R$ data sequence CD(10). Each of the Y data sequence YD(10) and the $P_B/P_R$ data sequence CD(10) is formed to be transmitted at the word transmitting rate of, for example, 148.5 MBps in accordance with the data formats as shown in FIGS. 1A and 1B, respectively.

In the horizontal blanking period portion of the digital video signal DVP(20), four 20-bit words (3FF(C):3FF(Y), 000(C):000(Y), 000 (C):000(Y), XYZ(C):XYZ(Y)) are provided as time reference code data EAV and another four 20-bit words (3FF(C):3FF(Y), 000(C):000(Y), 000(C):000(Y), XYZ(C):XYZ(Y)) are provided as time reference code data SAV.

Figure 4:
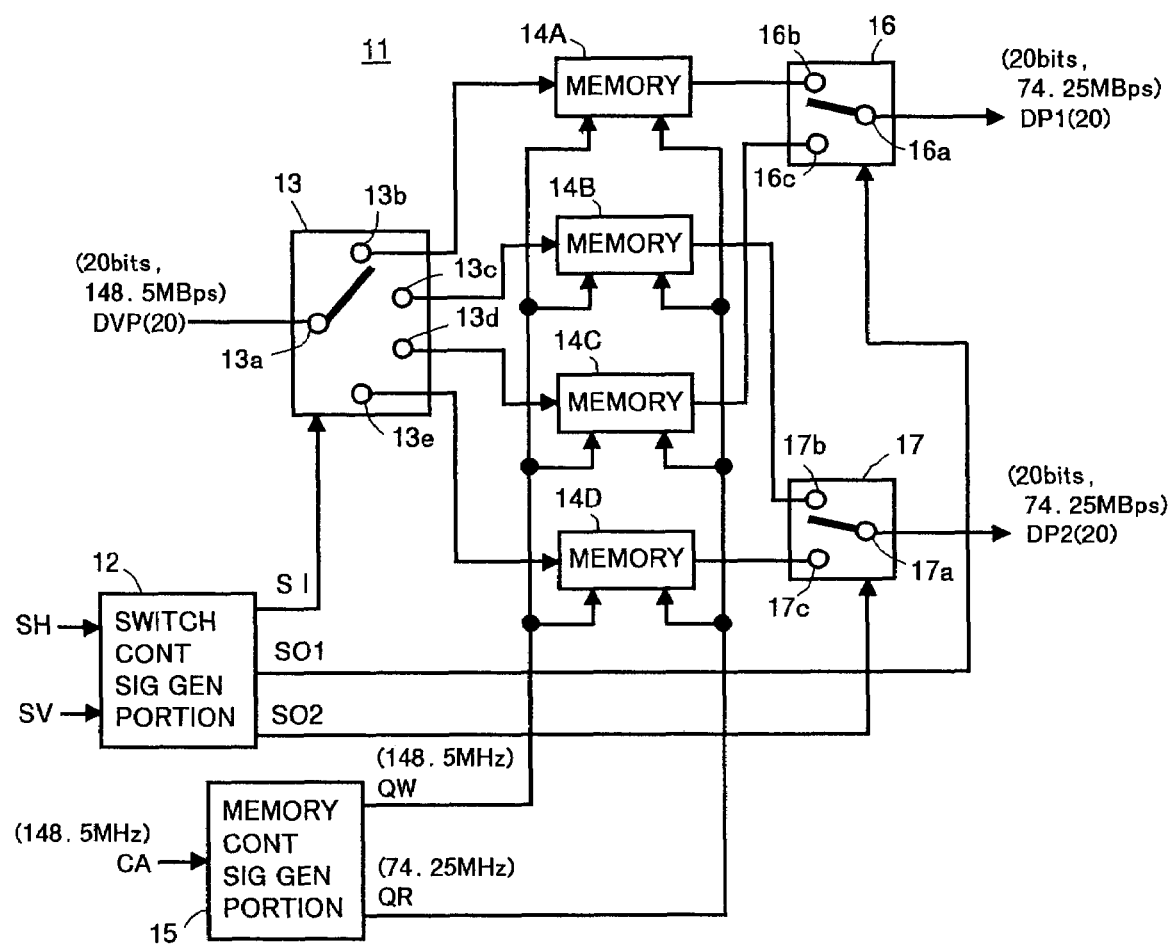
FIG. 4 is a schematic block diagram showing an embodied structure of a data dividing portion provided in the first example shown in FIG. 3.

FIG. 4 shows an embodied structure of the data dividing portion 11. In the embodied structure shown in FIG. 4, a horizontal synchronous signal SH and a vertical synchronous signal SV of the digital video signal DVP(20) which determine a horizontal period and a vertical period in the digital video signal DVP(20), respectively, are supplied to a switch control signal generating portion 12. The switch control signal generating portion 12 produces a switch control signal SI which is synchronized with each frame period (or each line (horizontal) period) in the digital video signal DVP(20), a switch control signal S01 which is synchronized with each odd-numbered frame period (or each of odd-numbered line period) in the digital video signal DVP(20) and a switch control signal S02 which is synchronized with each even-numbered frame period (or each even-numbered line period) in the digital video signal DVP(20), based on the horizontal synchronous signal SH and vertical synchronous signal SV.

The switch control signal SI obtained from the switch control signal generating portion 12 is supplied to a switch 13. The switch 13 has a movable contact 13*a* and four fixed contacts 13*b* to 13*e*. The movable contact 13*a* is controlled by the switch control signal SI repeatedly to come into contact with each of the fixed contacts 13*b* to 13*e* successively at every frame period (or every line (horizontal) period) in the digital video signal DVP(20). The fixed contacts 13*b* to 13*e* of the switch 13 are connected with four memories 14A, 14B, 14C and 14D, respectively.

The digital video signal DVP(20) supplied to the data dividing portion 11 is supplied through the switch 13 having the movable contact 13*a* controlled by the switch control signal SI to each of the memories 14A to 14D successively at every frame period portion (or every line period portion) thereof. Accordingly, each odd-numbered frame period portion (or each odd-numbered line period portion) of the digital video signal DVP(20) is successively supplied to the memories 14A and 14C alternately and each even-numbered frame period portion (or each even-numbered line period portion) of the digital video signal DVP(20) is successively supplied to the memories 14B and 14D alternately.

A writing clock signal QW having the frequency of 148.5 MHz and a reading clock signal OR having the frequency of 148.5/2=74.25 MHz are supplied to each of the memories 14A to 14D from a memory control signal generating portion 15 to which a clock signal CA having the frequency of 148.5 MHz is supplied. The digital video signal DVP(20) is written in each of the memories 14A to 14D at every frame period portion (or every line period portion) thereof in accordance with the writing clock signal QW having the frequency of 148.5 MHz and then read from each of the memories 14A to 14D at every frame period portion (or every line period portion) thereof in accordance with the reading clock signal OR having the frequency of 74.25 MHz.

Accordingly, the frame period portions (or the line period portions) of the digital video signal DVP(20) are written in each of the memories 14A to 14D successively at every period 1TF corresponding to one frame period of the digital video signal DVP(20) (or every period 1TL corresponding to one line period of the digital video signal DVP(20)), so that the odd-numbered frame period portions (or the odd-numbered line period portions) of the digital video signal DVP(20) are successively written in the memories 14A and 14C alternately to be stored therein and the even-numbered frame period portions (or the even-numbered line period portions) of the digital video signal DVP(20) are successively written in the memories 14B and 14D alternately to be stored therein.

Then, the odd-numbered frame period portions (or the odd-numbered line period portions) of the digital video signal DVP(20) written to be stored in the memories 14A and 14C in accordance with the writing clock signal QW having the frequency of 148.5 MHz are successively read from the memories 14A and 14C alternately in accordance with the reading clock signal OR having the frequency of 74.25 MHz at every unit period corresponding to two frame periods (or two line periods) in the digital video signal DVP(20) and the even-numbered frame period portions (or the odd-numbered line period portions) of the digital video signal DVP(20) written to be stored in the memories 14B and 14D in accordance with the writing clock signal QW having the frequency of 148.5 MHz are successively read from the memories 14B and 14D alternately in accordance with the reading clock signal OR having the frequency of 74.25 MHz at every unit period corresponding to two frame periods (or two line periods) in the digital video signal DVP(20).

Read output signals from the memories 14A and 14C are supplied to fixed contacts 16*b* and 16*c* of a switch 16, respectively. The switch 16 has a movable contact 16*a* in addition to the fixed contacts 16*b* and 16*c*. Similarly, read output signals from the memories 14C and 14D are supplied to fixed contacts 17*b* and 17*c* of a switch 17, respectively. The switch 17 has a movable contact 17*a* in addition to the fixed contacts 17*b* and 17*c*.

The switch control signal S01 obtained from the switch control signal generating portion 12 is supplied to the switch 16. The movable contact 16*a* of the switch 16 is controlled by the switch control signal S01 to come into contact with each of the fixed contact 16*b* and 16*c* alternately at every two frame periods (or two line periods) of the digital video signal DVP(20). Thereby, the read output signal from the memory 14A and the read output signal from the memory 14C are alternately derived to the movable contact 16*a* of the switch 16 at every period 2TF corresponding to two frame periods (or every period 2TL corresponding to two line periods) of the digital video signal DVP (20).

The read output signals thus obtained from the memories 14A and 14C are constituted with the odd-numbered frame period portions (or the odd-numbered line period portions) of the digital video signal DVP(20) which had been written to be stored in the memories 14A and 14C in accordance with the writing clock signal QW having the frequency of 148.5 MHz and then successively read from the memories 14A and 14C alternately in accordance with the reading clock signal QR having the frequency of 74.25 MHz at every unit period corresponding to two frame periods (or two line periods) in the digital video signal DVP(20). Therefore, the odd-numbered frame period portions (or the odd-numbered line period portions) of the digital video signal DVP(20), the word transmission rate of which has been converted into 74.25 MBps, are obtained at the movable contact 16*a* of the switch 16.

The switch control signal S02 obtained from the switch control signal generating portion 12 is supplied to the switch 17. The movable contact 17a of the switch 17 is controlled by the switch control signal S02 to come into contact with each of the fixed contact 17b and 17c alternately at every two frame periods (or two line periods) of the digital video signal DVP(20). Thereby, the read output signal from the memory 14B and the read output signal from the memory 14D are alternately derived to the movable contact 17a of the switch 17 at every period 2TF corresponding to two frame periods (or every period 2TL corresponding to two line periods) of the digital video signal DVP(20).

The read output signals thus obtained from the memories 14B and 14D are constituted with the even-numbered frame period portions (or the even-numbered line period portions) of the digital video signal DVP(20) which had been written to be stored in the memories 14B and 14D in accordance with the writing clock signal QW having the frequency of 148.5 MHz and then successively read from the memories 14B and 14D alternately in accordance with the reading clock signal QR having the frequency of 74.25 MHz at every unit period corresponding to two frame periods (or two line periods) in the digital video signal DVP(20). Therefore, the even-numbered frame period portions (or the even-numbered line period portions) of the digital video signal DVP(20), the word transmission rate of which has been converted into 74.25 MBps, are obtained at the movable contact 17a of the switch 17.

As described above, in the embodied structure of the data dividing portion 11 shown in FIG. 4, the digital video signal DVP(20) is divided into the odd-numbered frame period portions (or the odd-numbered line period portions) and the even-numbered frame period portions (or the even-numbered line period portions), the word transmission rate of each of which is converted to 74.25 MBps from 148.5 MBps and which are obtained at the movable contact 16a of the switch 16 and the movable contact 17a of the switch 17, respectively. The odd-numbered frame period portions (or the odd-numbered line period portions) obtained at the movable contact 16a of the switch 16 is derived from the data dividing portion 11 as 20-bit word sequence data DP1(20) having the word transmission rate of 74.25 MBps and the even-numbered frame period portions (or the even-numbered line period portions) obtained at the movable contact 17a of the switch 17 is derived from the data dividing portion 11 as 20-bit word sequence data DP2(20) having the word transmission rate of 74.25 MBps.

Accordingly, in the data dividing portion 11, the digital video signal DVP(20) which is constituted with 20-bit word sequence data having the word transmission rate of 148.5 MBps is divided into the 20-bit word sequence data DP1(20) and the 20-bit word sequence data DP2(20) each having the word transmission rate of 74.25 MBps which is a half of the word transmission rate of 148.5 MBps.

The 20-bit word sequence data DP1(20) derived from the data dividing portion 11 are supplied to a data inserting portion 18. In the data inserting portion 18, ancillary data DA1 which are, for example, audio data at need or the like are inserted into 20-bit word sequence data DP1(20) to produce 20-bit word sequence data DP1' (20) containing the ancillary data DA1. The 20-bit word sequence data DP1' (20) obtained from the data inserting portion 18 are supplied to a P/S convertor 19. The P/S convertor 19 is operative to cause the 20-bit word sequence data DP1' (20) to be subjected to P/S conversion to produce serial data DS1. The serial data DS1 is formed based on the 20-bit word sequence data DP1' (20) to be transmitted at the bit transmission rate of 74.25×20=1.485 Gbps and supplied to an electric to optical (E/O) convertor 20. The E/O convertor 20 is operative to cause the serial data DS1 to be subjected to E/O conversion to produce optical signal OS1 having the central wavelength of, for example, about 1.3 μm. The optical signal OS1 is formed based on the serial data DS1 to be transmitted at the bit transmission rate of 1.485 Gbps and supplied to a wave multiplexing portion 21.

The 20-bit word sequence data DP2(20) derived from the data dividing portion 11 are supplied to a data inserting portion 22. In the data inserting portion 22, ancillary data DA2 which are, for example, audio data at need or the like are inserted into 20-bit word sequence data DP2(20) to produce 20-bit word sequence data DP2' (20) containing the ancillary data DA2. The 20-bit word sequence data DP2' (20) obtained from the data inserting portion 22 are supplied to a P/S convertor 23. The P/S convertor 23 is operative to cause the 20-bit word sequence data DP2' (20) to be subjected to P/S conversion to produce serial data DS2. The serial data DS2 is formed based on the 20-bit word sequence data DP2' (20) to be transmitted at the bit transmission rate of 74.25×20=1.485 Gbps and supplied to an E/O convertor 24. The E/O convertor 24 is operative to cause the serial data DS2 to be subjected to E/O conversion to produce optical signal OS2 having the central wavelength of, for example, about 1.55 μm. The optical signal OS2 is formed based on the serial data DS2 to be transmitted at the bit transmission rate of 1.485 Gbps and supplied to the wave multiplexing portion 21.

The wave multiplexing portion 21 to which the optical signal OS1 from the E/O convertor 20 and the optical signal OS2 from the E/O convertor 24 are supplied is constituted with, for example, a wavelength division multiplexer (WDM) using optical fiber. In the wave multiplexing portion 21, the optical signal OS1 having the central wavelength of about 1.3 μm and the optical signal OS2 having the central wavelength of about 1.55 μm are multiplexed with each other to produce a multiplexed optical signal OSZ. The multiplexed optical signal OSZ is derived from the wave multiplexing portion 21 as a transmission signal.

The multiplexed optical signal OSZ which is the transmission signal derived from the wave multiplexing portion 21 is guided through an optical connector 25 to an optical fiber data transmission line 26 to be transmitted thereby to a receiving side. The optical fiber data transmission line 26 is made of, for example, fused quartz single-mode fiber (fused quartz SMF).

The multiplexed optical signal OSZ transmitted through the optical fiber data transmission line 26 is received by the first embodiment of apparatus for receiving digital data according to the seventh aspect of the present invention, in which the first embodiment of data time difference absorbing circuit according to the first aspect of the present invention is employed and the first embodiment of method of receiving digital data according to the fourth aspect of the present invention is carried out.

In the first embodiment of apparatus for receiving digital data according to the seventh aspect of the present invention, the multiplexed optical signal OSZ transmitted through the optical fiber data transmission line 26 is guided through an optical connector 27 to a wave dividing portion 28. The optical connector 27 and the wave dividing portion 28 constitute a data receiving portion for receiving the multiplexed optical signal OSZ transmitted through the optical fiber data transmission line 26.

The wave dividing portion 28 is constituted with, for example, a wavelength dividing demultiplexer (WDD) using optical fiber functioning as wave dividing means. In the wave dividing portion 28, the multiplexed optical signal OSZ is divided into an optical element having the central wavelength of about 1.3 μm and another optical element having the central wavelength of about 1.55 μm to reproduce the optical signal OS1 which has the central wavelength of about 1.3 μm and the bit transmission rate of 1.485 Gbps and the optical signal OS2 which has the central wavelength of about 1.55 μm and the bit transmission rate of 1.485 Gbps.

The optical signal OS1 which has the central wavelength of about 1.3 μm and the bit transmission rate of 1.485 Gbps and the optical signal OS2 which has the central wavelength of about 1.55 μm and the bit transmission rate of 1.485 Gbps reproduced by the wave dividing portion 28 are supplied to optical to electrical (O/E) convertors 29 and 30, respectively.

The O/E convertor 29 is operative to cause the optical signal OS1 to be subjected to O/E conversion to reproduce the serial data DS1. The serial data DS1 is reproduced based on the optical signal OS1 having the central wavelength of about 1.3 μm and the bit transmission rate of 1.485 Gbps to be transmitted at the bit transmission rate of 1.485 Gbps. The serial data DS1 thus reproduced are supplied to an S/P convertor 31. The S/P convertor 31 is operative to cause the serial data DS1 to be subjected to S/P conversion to reproduce the 20-bit word sequence data DP1' (20). The 20-bit word sequence data DP1' (20) are reproduced based on the serial data DS1 to be transmitted at the word transmission rate of 74.25 MBps and supplied to a data separating portion 32. In the data separating portion 32, the ancillary data DA1 are separated from the 20-bit word sequence data DP1' (20) so that the 20-bit word sequence data DP1 (20) and the ancillary data DA1 are separately obtained. The 20-bit word sequence data DP1 (20) are supplied to a data time difference absorbing portion 33.

The O/E convertor 30 is operative to cause the optical signal OS2 to be subjected to O/E conversion to reproduce the serial data DS2. The serial data DS2 is reproduced based on the optical signal OS2 having the central wavelength of about 1.55 μm and the bit transmission rate of 1.485 Gbps to be transmitted at the bit transmission rate of 1.485 Gbps. The serial data DS2 thus reproduced are supplied to an S/P convertor 34. The S/P convertor 34 is operative to cause the serial data DS1 to be subjected to S/P conversion to reproduce the 20-bit word sequence data DP2' (20). The 20-bit word sequence data DP2' (20) are reproduced based on the serial data DS2 to be transmitted at the word transmission rate of 74.25 MBps and supplied to a data separating portion 35. In the data separating portion 35, the ancillary data DA2 are separated from the 20-bit word sequence data DP2' (20) so that the 20-bit word sequence data DP2 (20) and the ancillary data DA2 are separately obtained. The 20-bit word sequence data DP2(20) are supplied to the data time difference absorbing portion 33.

The data time difference absorbing portion 33 is formed with the first embodiment of data time difference absorbing portion circuit according to the first aspect of the present invention.

In the data time difference absorbing portion 33, time difference between the 20-bit word sequence data DP1 (20) from the data separating portion 32 and the 20-bit word sequence data DP2 (20) from the data separating portion 35 is absorbed to produce 20 bit word sequence data DP1Q(20) which are obtained based on the 20 bit word sequence data DP1(20) to be transmitted at the word transmission rate of 74.25 MBps and produce 20-bit word sequence data DP2Q (20) which are obtained based on the 20-bit word sequence data DP2(20) to be transmitted at the word transmission rate of 74.25 MBps in such a manner that time difference between the 20-bit word sequence data DP1Q(20) and the 20-bit word sequence data DP2Q(20) is substantially zero.

Figure 5:
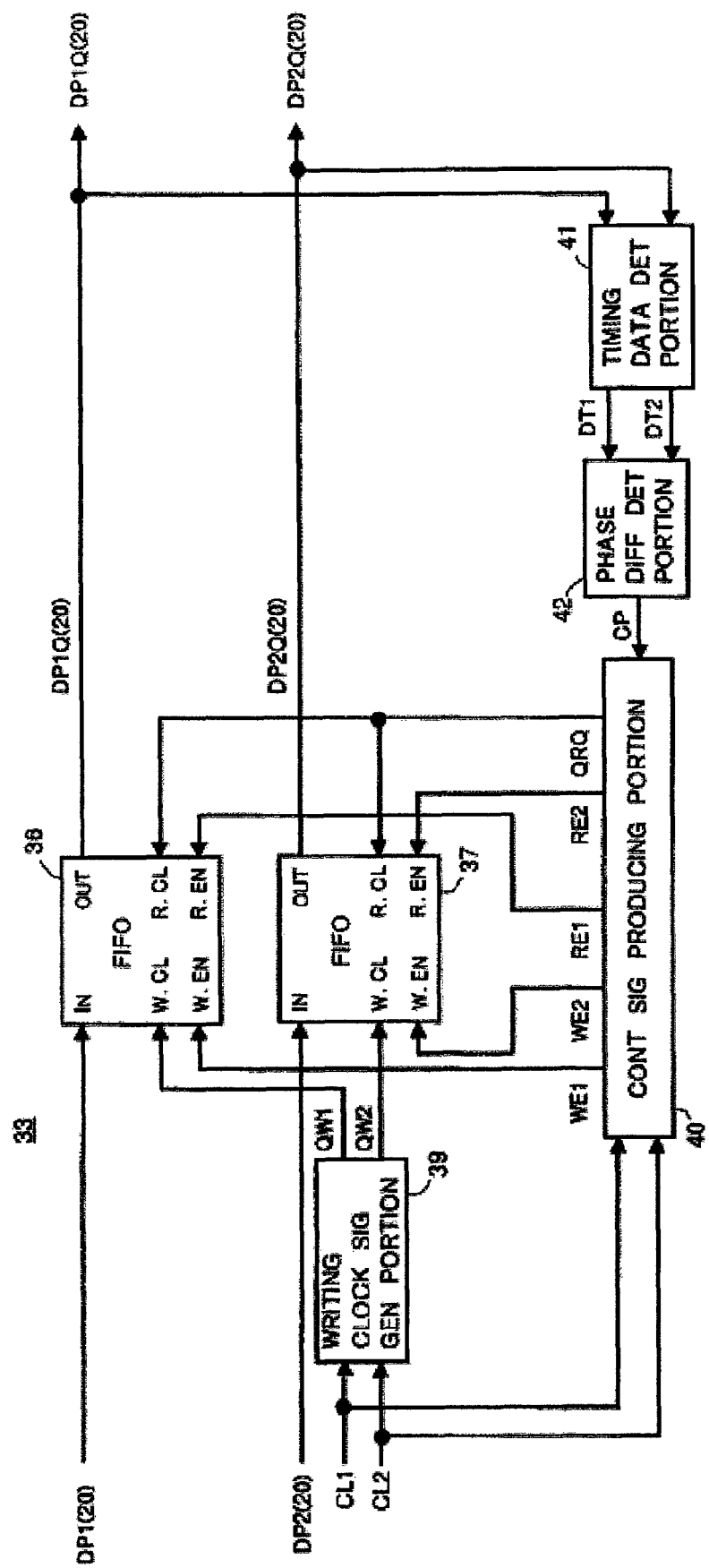
FIG. 5 is a schematic block diagram showing an embodied structure of a data time difference absorbing portion provided in the first example shown in FIG. 3.

FIG. 5 shows an embodied structure of the data time difference absorbing portion 33. In the embodied structure shown in FIG. 5, the 20-bit word sequence data DP1(20) obtained from the data separating portion 32 are supplied to an input terminal (IN) of an FIFO memory 36 and the 20-bit word sequence data DP2(20) obtained from the data separating portion 35 are supplied to an input terminal (IN) of an FIFO memory 37.

A clock pulse signal CL1 for the 20-bit word sequence data DP1' (20) which is, for example, reproduced in the S/P convertor 31 to have the frequency of 74.25 MHz and a clock pulse signal CL2 for the 20-bit word sequence data DP2' (20) which is, for example, reproduced in the S/P convertor 34 to have the frequency of 74.25 MHz, are supplied to a writing clock signal generating portion 39 and a control signal producing portion 40.

In the writing clock signal generating portion 39, a writing clock signal QW1 is produced based on the clock pulse signal CL1 to have the frequency of 74.25 MHz and a writing clock signal QW2 is produced based on the clock pulse signal CL2 to have the frequency of 74.25 MHz. The writing clock signal QW1 is supplied to a writing clock terminal (W.CL) of the FIFO memory 36 and the writing clock signal QW2 is supplied to a writing clock terminal (W.CL) of the FIFO memory 37.

In the control signal producing portion 40, a writing enable signal WE1 is produced based on the clock pulse signal CL1 and a writing enable signal WE2 is produced based on the clock pulse signal CL2. The writing enable signal WE1 is supplied to a writing enable terminal (W.EN) of the FIFO memory 36 and the writing enable signal WE2 is supplied to a writing enable terminal (W.EN) of the FIFO memory 37.

In the FIFO memory 36, under a condition in which the writing enable signal WE1 functions effectively, the 20-bit word sequence data DP1(20) having the word transmission rate of 74.25 MBps are written to be stored at every predetermined data amount in accordance with the writing clock signal QW1. Similarly, in the FIFO memory 37, under a condition in which the writing enable signal WE2 functions effectively, the 20-bit word sequence data DP2(20) having the word transmission rate of 74.25 MBps are written to be stored at every predetermined data amount in accordance with the writing clock signal QW2.

Further, in the control signal producing portion 40, a reading clock signal QRQ is also produced based on the clock pulse signal CL1 or CL2 to be supplied to a reading clock terminal (R.CL) of the FIFO memory 36 and a reading clock terminal (R.CL) of the FIFO memory 37 to be common to the FIFO memories 36 and 37 and reading enable signals RE1 and RE2 are produced to be supplied to a reading enable terminal (R.EN) of the FIFO memory 36 and a reading enable terminal (R.EN) of the FIFO memory 37, respectively.

Thereby, under a condition in which the reading enable signal RE1 acts effectively on the FIFO memory 36, the 20-bit word sequence data DP1(20) stored in the FIFO memory 36 are read from an output terminal (OUT) of the FIFO memory 36 at every predetermined data amount to be transmitted at the word transmission rate of 74.25 MBps in accordance with the reading clock signal QRQ. The 20-bit word sequence data DP1(20) thus read out are derived from the FIFO memory 36 as 20-bit word sequence data DP1Q (20) having the word transmission rate of 74.25 MBps.

Similarly, under a condition in which the reading enable signal RE2 acts effectively on the FIFO memory 37, the 20-bit word sequence data DP2(20) stored in the FIFO memory 37 are read from an output terminal (OUT) of the FIFO memory 37 at every predetermined data amount to be transmitted at the word transmission rate of 74.25 MBps in accordance with the reading clock signal QRQ. The 20-bit word sequence data DP2(20) thus read out are derived from the FIFO memory 37 as 20-bit word sequence data DP2Q (20) having the word transmission rate of 74.25 MBps.

The 20-bit word sequence data DP1Q(20) derived from the FIFO memory 36 and the 20-bit word sequence data DP2Q(20) derived from the FIFO memory 37 are supplied to a timing data detecting portion 41. In the timing data detecting portion 41, the time reference code data EAV contained in the 20-bit word sequence data DP1Q(20) are detected to produce a timing detection output signal DT1 in response to the detected time reference code data EAV and the time reference code data EAV contained in the 20-bit word sequence data DP2Q(20) are detected to produce a timing detection output signal DT2 in response to the detected time reference code data EAV.

Figure 6A:
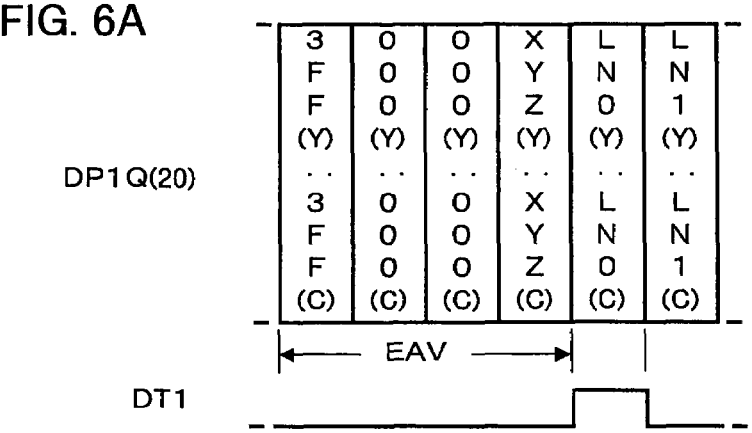
FIGS. 6A and 6B are time charts used for explaining the embodied structure of the data time difference absorbing portion shown in FIG. 5.
Figure 6B:
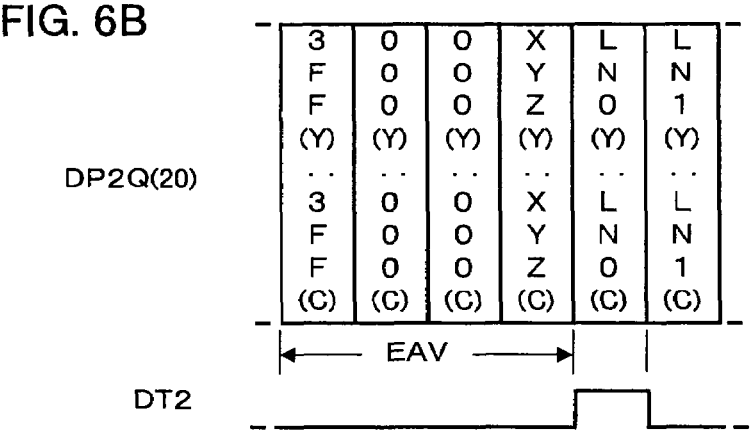

The timing detection output signal DT1 is obtained, for example, just after the time reference code data EAV in the 20-bit word sequence data DP1Q(20) as shown in FIG. 6A and the timing detection output signal DT2 is obtained, for example, just after the time reference code data EAV in the 20-bit word sequence data DP2Q(20) as shown in FIG. 6B. These timing detection output signals DT1 and DT2 thus obtained represent a relation of timing between the time reference code data EAV in the 20-bit word sequence data DP1Q(20) and the time reference code data EAV in the 20-bit word sequence data DP2Q(20), that is, a relation of timing between the 20-bit word sequence data DP1Q(20) and the 20-bit word sequence data DP2Q(20).

The timing detection output signals DT1 and DT2 obtained from the timing data detecting portion 41 are supplied to a phase difference detecting portion 42. In the phase difference detecting portion 42, a phase difference between the timing detection output signals DT1 and DT2 is detected to produce a phase difference detection output signal CP in response to the detected phase difference. The phase difference detection output signal CP thus produced represents a relation of retard or advance in phase between the timing detection output signals DT1 and DT2. For example, the phase difference detection output signal CP represents "0 0" when each of the timing detection output signals DT1 and DT2 has the same phase, that is, the phase difference between the timing detection output signals DT1 and DT2 is substantially zero, "0 1" when the phase of the timing detection output signal DT1 advances in relation to the phase of the timing detection output signal DT2 and "1 0" when the phase of the timing detection output signal DT1 retards in relation to the phase of the timing detection output signal DT2.

The phase difference detection output signal CP obtained from the phase difference detecting portion 42 is supplied to the control signal producing portion 40. The control signal producing portion 40 is operative to cause the reading enable signal RE1 or RE2 to vary in response to the phase difference detection output signal CP so as to control a timing at which the 20-bit word sequence data DP1(20) are read from the FIFO memory 36 or a timing at which the 20-bit word sequence data DP2(20) are read from the FIFO memory 37. Such a control of the timing for reading is conducted to keep a condition in which the phase difference between the timing detection output signals DT1 and DT2 detected by the phase difference detecting portion 42 is substantially zero. Consequently, the 20-bit word sequence data DP1Q(20) derived from the FIFO memory 36 and the 20-bit word sequence data DP2Q(20) derived from the FIFO memory 37 are so processed that the time difference between the 20-bit word sequence data DP1Q(20) and the 20-bit word sequence data DP2Q(20) is substantially absorbed.

Figure 7:
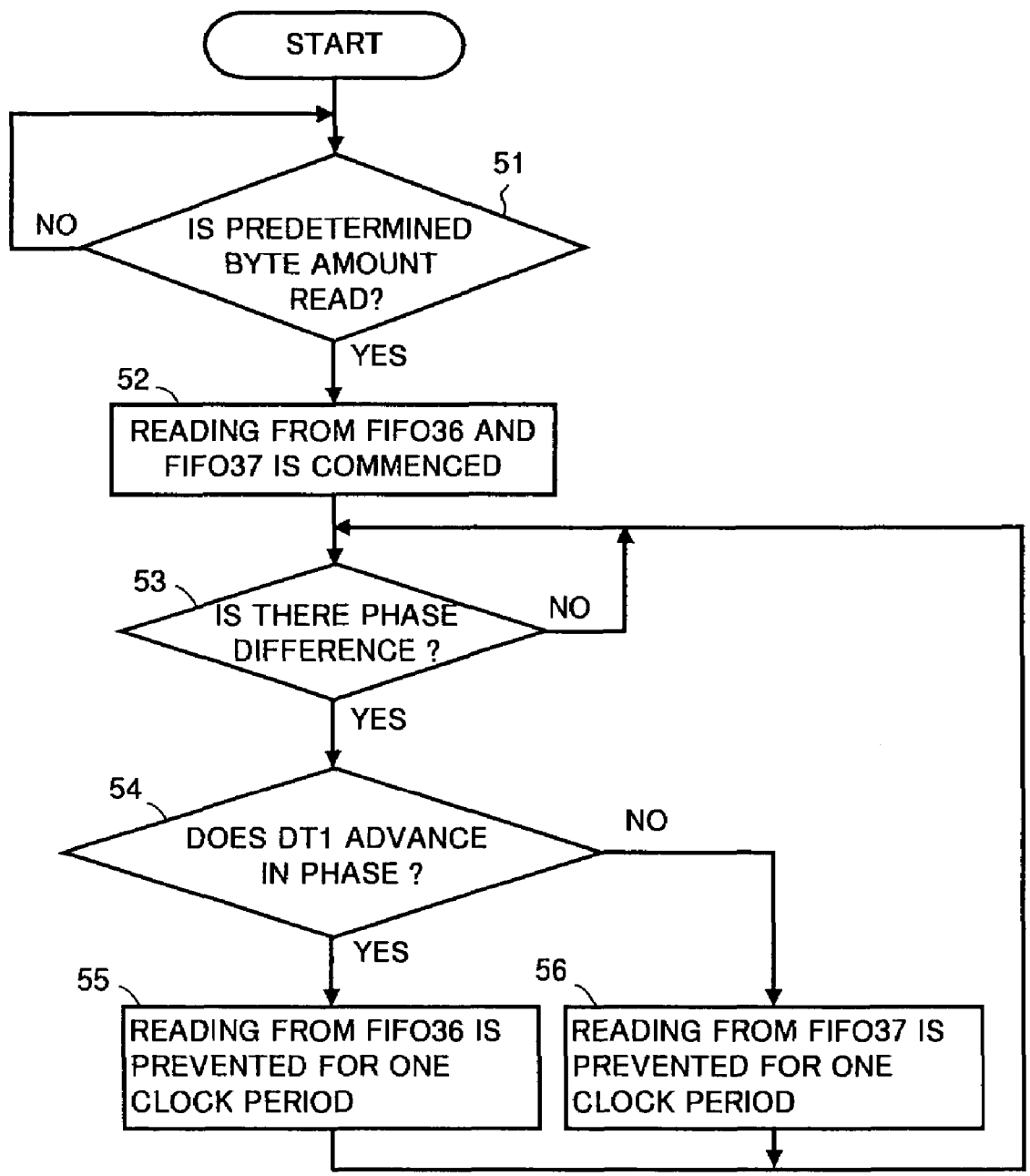
FIG. 7 is a flow chart used for explaining the operation of the embodied structure of the data time difference absorbing portion shown in FIG. 5.

One example of an operation program for the control of the timing for reading as described above is carried out in a microcomputer contained in the control signal producing portion 40 in accordance with a flow chart shown in FIG. 7.

According to the flow chart shown in FIG. 7, the operation program starts in a condition in which the 20-bit word sequence data DP1(20) are written to be stored in the FIFO memory 36 and the 20-bit word sequence data DP2(20) are written to be stored in the FIFO memory 37. After the start, first, in step 51, it is checked whether or not the 20-bit word sequence data DP1(20) have been stored by a predetermined byte amount in the FIFO memory 36 and the 20-bit word sequence data DP2(20) have been stored by a predetermined byte amount in the FIFO memory 37.

If the 20-bit word sequence data DP1(20) have not been stored by the predetermined byte amount in the FIFO memory 36 or the 20-bit word sequence data DP2(20) have not been stored by the predetermined byte amount in the FIFO memory 37, the check in the step 51 is repeated.

When it is clarified in the step 51 that the 20-bit word sequence data DP1 (20) have been stored by the predetermined byte amount in the FIFO memory 36 and the 20-bit word sequence data DP2(20) have been stored by the predetermined byte amount in the FIFO memory 37, the reading of the 20-bit word sequence data DP1(20) from the FIFO memory 36 and the reading of the 20-bit word sequence data DP2(20) from the FIFO memory 37 are commenced, in step 52.

Next, it is checked on the basis of the phase difference detection output signal CP from the phase difference detecting portion 42 whether there is any phase difference between the timing detection output signals DT1 and DT2 or not, in step 53. When there is the phase difference between the timing detection output signals DT1 and DT2, it is also checked whether the phase of the timing detection output signal DT1 advances in relation to the phase of the timing detection output signal DT2 or not, in step 54.

If the timing detection output signal DT1 advances in relation to the phase of the timing detection output signal DT2, the reading enable signal RE1 is controlled to prevent the 20-bit word sequence data DP1(20) form being read from the FIFO memory 36 for one clock period of the reading clock signal QRQ, in step 55, and then the process returns to the step 53. On the contrary, if the timing detection output signal DT1 retards in relation to the phase of the timing detection output signal DT2, the reading enable signal RE2 is controlled to prevent the 20-bit word sequence data DP2(20) form being read from the FIFO memory 37 for one clock period of the reading clock signal QRQ, in step 56, and then the process returns to the step 53.

Further, if it is clarified as a result of the check in the step 53 that there is no substantial phase difference between the timing detection output signals DT1 and DT2, the check in the step 53 is repeated.

The 20-bit word sequence data DP1Q(20) and DP2Q(20) obtained from the data time difference absorbing portion 33 are supplied to a data synthesizing portion 60. In the data synthesizing portion 60, the 20-bit word sequence data DP1Q(20) and DP2Q(20) are subjected to data synthesizing process, which is proceeded inversely to the data dividing process to which the 20 bit word sequence data constituting the digital video signal DVP(20) are subjected in the data dividing portion 11, to reproduce the digital video signal DVP(20).

Incidentally, it is possible to use an ordinary address controlled memory in place of each of the FIFO memories 36 and 37 in the data time difference absorbing portion 33.

Figure 8:
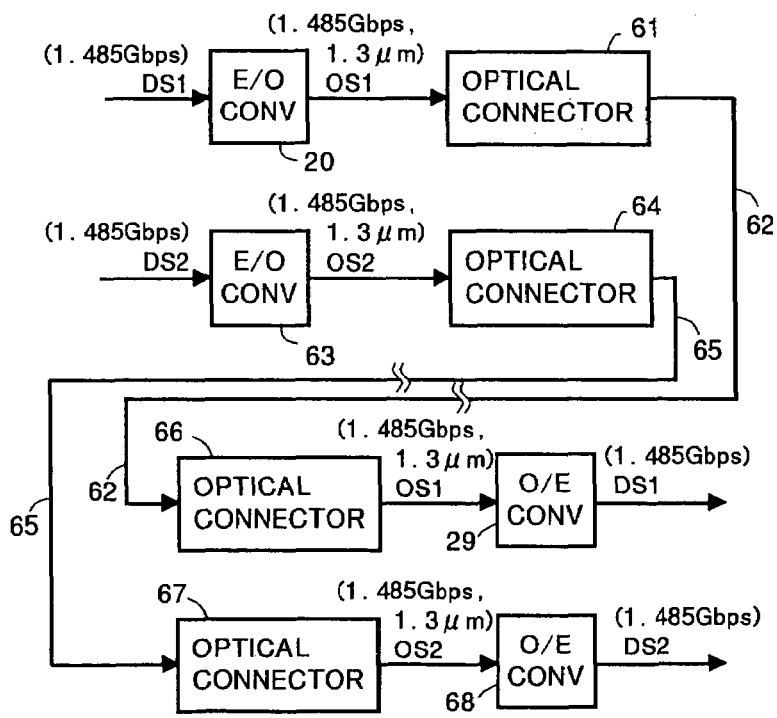
FIG. 8 is a schematic block diagram showing a part of a second example of a data transmitting and receiving apparatus including a second embodiment of apparatus for receiving digital data according to the seventh aspect of the present invention, in which a second embodiment of data time difference absorbing circuit according to the first aspect of the present invention is employed and a second embodiment of method of receiving digital data according to the fourth aspect of the present invention is carried out.

FIG. 8 shows a part of a second example of a data transmitting and receiving apparatus including a second embodiment of apparatus for receiving digital data according to the seventh aspect of the present invention, in which a second embodiment of data time difference absorbing circuit according to the first aspect of the present invention is employed and a second embodiment of method of receiving digital data according to the fourth aspect of the present invention is carried out.

The second example, a part of which is shown in FIG. 8, has a number of blocks constituted in the same manner as those in the first example shown in FIG. 3 and blocks in the second example which are constituted to be different from those in the first example are shown in FIG. 8.

Referring to FIG. 8, the wave multiplexing portion 21 and the wave dividing portion 28 employed in the first example shown in FIG. 3 are not provided, and an E/O convertor 63 and an O/E convertor 68 are provided in place of the E/O convertor 24 and the O/E convertor 30 employed in the first example shown in FIG. 3.

In the second example, a part of which is shown in FIG. 8, serial data DS1 having the bit transmission rate of 1.485 Gbps are supplied to an E/O convertor 20 and an optical signal OS1 having the central wavelength of 1.3 μm and the bit transmission rate of 1.485 Gbps is obtained from the E/O convertor 20. The optical signal OS1 is guided through an optical connector 61 to an optical fiber data transmission line 62 to be transmitted to a receiving side. Serial data DS2 having the bit transmission rate of 1.485 Gbps are supplied to the E/O convertor 63. An optical signal OS2 having the central wavelength of 1.3 μm and the bit transmission rate of 1.485 Gbps is obtained based on the serial data DS2 from the E/O convertor 63. The optical signal OS2 is guided through an optical connector 64 to an optical fiber data transmission line 65 to be transmitted to a receiving side. Each of the optical fiber data transmission lines 62 and 65 is made of, for example, fused quartz SMF.

In the receiving side, the optical signal OS1 transmitted through the optical fiber data transmission line 62 is guided through an optical connector 66 to an O/E convertor 29. The serial data DS1 is reproduced based on the optical signal OS1 to be transmitted at the bit transmission rata of 1.485 Gbps in the O/E convertor 29. Similarly, the optical signal OS2 transmitted through the optical fiber data transmission line 65 is guided through an optical connector 67 to the O/E convertor 68. The serial data DS2 is reproduced based on the optical signal OS2 to be transmitted at the bit transmission rata of 1.485 Gbps in the O/E convertor 68.

As described above, in the second example having the part shown in FIG. 8, the optical signals OS1 and OS2 in the form of two channel signals are transmitted through the optical fiber data transmission lines 62 and 65, respectively, The other operations of the second example are the same as those in the first example shown in FIG. 3.

FIG. 9 shows a third example of a data transmitting and receiving apparatus including a third embodiment of apparatus for receiving digital data according to the seventh aspect of the present invention, in which a third embodiment of data time difference absorbing circuit according to the first aspect of the present invention is employed and a third embodiment of method of receiving digital data according to the fourth aspect of the present invention is carried out.

The third example shown in FIG. 9 has also a number of blocks constituted in the same manner as those in the first example shown in FIG. 3 and in FIG. 9, blocks, signals and data corresponding to those in the first example shown in FIG. 3 are marked with the same references and further description thereof will be omitted.

In the third example shown in FIG. 9, ancillary data DA1 inserted into 20-bit word sequence data DP1(20) in a data inserting portion 18 contain channel (CH) identification code data and ancillary data DA2 inserted into 20-bit word sequence data DP2(20) in a data inserting portion 22 contain also CH identification code data. Serial data DS1 having the bit transmission rate of 1.485 Gbps from a P/S convertor 19 and serial data DS2 having the bit transmission rate of 1.485 Gbps from a P/S convertor 23 are supplied to a bit multiplexing portion 70. In the bit multiplexing portion 70, each bit of the serial data DS1 and each bit of the serial data DS2 are alternately extracted to be arranged successively so that the serial data DS1 and DS2 are subjected to bit multiplexing to produce multiplexed serial data DSZ having the bit transmission rate of 1.485 Gbps×2=2.97 Gbps.

The multiplexed serial data DSZ obtained from the bit multiplexing portion 70 are supplied to an E/O convertor 71. The E/O convertor 71 is operative to cause the multiplexed serial data DSZ to be subjected to E/O conversion to produce an optical signal OSZ having the central wavelength of about 1.3 μm. The optical signal OSZ is obtained based on the multiplexed serial data DSZ from the E/O convertor 71 to be transmitted at the bit transmission rate of 2.97 Gbps and guided through an optical connector 72 to an optical fiber data transmission line 73 to be transmitted to a receiving side. The optical fiber data transmission line 73 is made of, for example, fused quartz SMF.

The optical signal OSZ transmitted through the optical fiber data transmission line 73 is received by the third embodiment of apparatus for receiving digital data according to the seventh aspect of the present invention, in which the third embodiment of data time difference absorbing circuit according to the first aspect of the present invention is employed and the third embodiment of method of receiving digital data according to the fourth aspect of the present invention is carried out.

In the third embodiment of apparatus for receiving digital data according to the seventh aspect of the present invention, the optical signal OSZ which has the central wavelength of about 1.3 μm and is transmitted at the bit transmission rate of 2.97 Gbps through the optical fiber data transmission line 73 is guided through an optical connector 74 to an O/E convertor 75. The optical connector 74 and the O/E convertor 75 constitute a data receiving portion for receiving the optical signal OSZ transmitted through the optical fiber data transmission line 73.

The O/E convertor 75 is operative to cause the optical signal OSZ having the central wavelength of about 1.3 μm to be subjected to O/E conversion to reproduce the multiplexed serial data DSZ having the bit transmission rate of 2.97 Gbps. The multiplexed serial data DSZ thus reproduced are supplied to a bit dividing portion 76.

In the bit dividing portion 76, each bit of the multiplexed serial data DSZ is extracted successively and separated to form a couple of bit groups, one of which includes every other bits and the other of which includes another every other bits so that the multiplexed serial data DSZ is subjected to bit dividing. Thereby, the serial data DS1 having the bit transmission rate of 2.97 Gbps/2=1.485 Gbps and the serial data DS2 having the bit transmission rate of 2.97 Gbps/2=1.485 Gbps which form two channel data are reproduced. The serial data DS1 are supplied to an S/P convertor 31 and the serial data DS2 are supplied to an S/P convertor 34.

The other operations of the third example shown in FIG. 9 are the same as those of the first example shown in FIG. 3.

Figure 10:
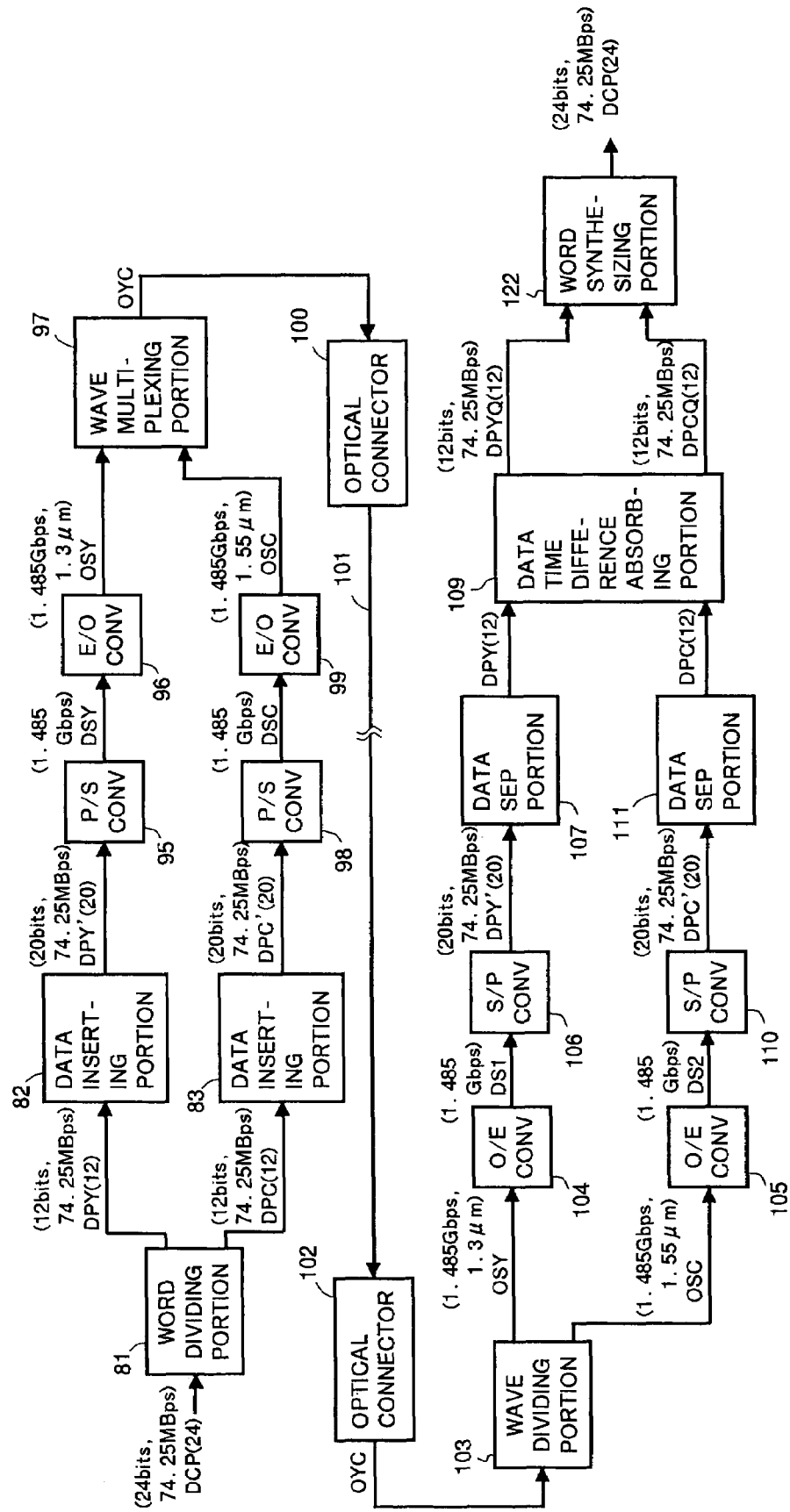
FIG. 10 is a schematic block diagram showing a fourth example of a data transmitting and receiving apparatus including a fourth embodiment of apparatus for receiving digital data according to the seventh aspect of the present invention, in which a fourth embodiment of data time difference absorbing circuit according to the first aspect of the present invention is employed and a fourth embodiment of method of receiving digital data according to the fourth aspect of the present invention is carried out.

FIG. 10 shows a fourth example of a data transmitting and receiving apparatus including a fourth embodiment of apparatus for receiving digital data according to the seventh aspect of the present invention, in which a fourth embodiment of data time difference absorbing circuit according to the first aspect of the present invention is employed and a fourth embodiment of method of receiving digital data according to the fourth aspect of the present invention is carried out.

In the fourth example shown in FIG. 10, a digital video signal DC P(24) is supplied to a word dividing portion 81. The digital video signal DCP(24) is, for example, a D-Cinema signal produced in the form of Y a nd $P_B/P_R$ signals having a frame rate of 24 Hz and constituted with 24-bit word sequence data. The 24-bit word sequence data are composed of a series of 24-bit words, each of which is formed by multiplexing a Y data sequence in the form of 24-bit word sequence data and a $P_B/P_R$ data sequence in the form of 24-bit word sequence data with each other under a condition in which a horizontal blanking period of the Y data sequence containing the time reference code data EAV and SAV is synchronized with a horizontal blanking period of the $P_B/P_R$ data sequence containing also the time reference code data EAV and SAV. Each of the Y data sequence and the $P_B/P_R$ data sequence is formed to be transmitted at the word transmitting rate of, for example, 74.25 MBps in accordance with such a data formats as shown in FIGS. 1A and 1B, respectively.

In the word dividing portion 81, the 24-bit word sequence data constituting the D-Cinema signal and having the word transmitting rate of 74.25 MBps are subjected to word dividing by which each 24-bit word is divided into two 12-bit words, so that 12-bit word sequence data DPY(12) corresponding to the Y data sequence and 12-bit word sequence data DPC(12) corresponding to the $P_B/P_R$ data sequence are produced. The 12-bit word sequence data DPY(12) are formed to have the word transmission rate of 74.25 MBps and supplied to a data inserting portion 82. The $P_B/P_R$ data sequence are also formed to have the word transmission rate of 74.25 MBps and supplied to a data inserting portion 83.

In the data inserting portion 82, the 12-bit word sequence data DPY(12) are converted to 20-bit word sequence data and CH identification code data DYC are inserted into the 20-bit word sequence data as occasion demands to produce 20-bit word sequence data DPY'(20). Similarly, in the data inserting portion 83, the 12-bit word sequence data DPC(12) are converted to 20-bit word sequence data and CH identification code data DCC are inserted into the 20-bit word sequence data as occasion demands to produce 20-bit word sequence data DPC'(20).

FIG. 11 shows an embodied structure of the data inserting portion 82. In the embodied structure shown in FIG. 11, the 12-bit word sequence data DPY(12) having the word transmission rate of 74.25 MBps are supplied to a bit dividing portion 84. In the bit dividing portion 84, twelve bits Y0 to Y11 constituting each word of the 12-bit word sequence data DPY(12) are divided into a 10-bit group including Y0 to Y9, a 2-bit group including Y10 and Y11 and a 8-bit group including Y4 to Y11. These 10-bit group, 2-bit group and 8-bit group are separately extracted simultaneously from each word of the 12-bit word sequence data DPY(12).

The 10-bit group including Y0 to Y9, 2-bit group including Y10 and Y11 and 8-bit group including Y4 to Y11 derived from the bit dividing portion 84 in response to each word of the 12-bit word sequence data DPY(12) are supplied to a 20-bit word sequence data producing portion 85. In the 20-bit word sequence data producing portion 85, the 10-bit group, 2-bit group and 8-bit group are multiplexed to produce a 20-bit word and a series of the 20-bit words thus produced constitutes the 20-bit word sequence data DPY (20). In such a manner as mentioned above, the 12-bit word sequence data DPY(12) having the word transmission rate of 74.25 MBps are converted to the 20-bit word sequence data DPY(20) having the word transmission rate of 74.25 MBps.

The 20-bit word sequence data DPY(20) obtained from the 20-bit word sequence data producing portion 85 are supplied to a data selecting portion 86. CH identification code data DCY having the word transmission rate of 74.25 MBps are also supplied to the data selecting portion 86 from a CH identification code data supplying portion 87, as occasion demands. The CH identification code data DCY are constituted with a series of 20 bit words each having a predetermined code.

Further, in the embodied structure shown in FIG. 11, a horizontal synchronous signal SH for the digital video signal DCP(24) is supplied to a control signal producing portion 88. In the control signal producing portion 88, control signals CWY and CDY each synchronizing with the horizontal synchronous signal SH are produced. The control signals CWY is supplied to the CH identification code data supplying portion 87 and the control signals CDY is supplied to the data selecting portion 86.

The CH identification code data supplying portion 87 is operative to supply the data selecting portion 86 with the CH identification code data DCY in response to the control signal CWY, as occasion demands. The data selecting potion 86 is operative to extract the CH identification code data DCY from the CH identification code data supplying portion 87 when the control signal CDY is supplied and also to extract the 20-bit word sequence data DPY(20) when the control signal CDY is not supplied. This means that the data selecting portion 86 is operative to insert the CH identification code data DCY into the horizontal blanking period portion in the horizontal period portion of the 20-bit word sequence data DPY(20) in response to the control signal CDY, as occasion demands.

Figure 13A:
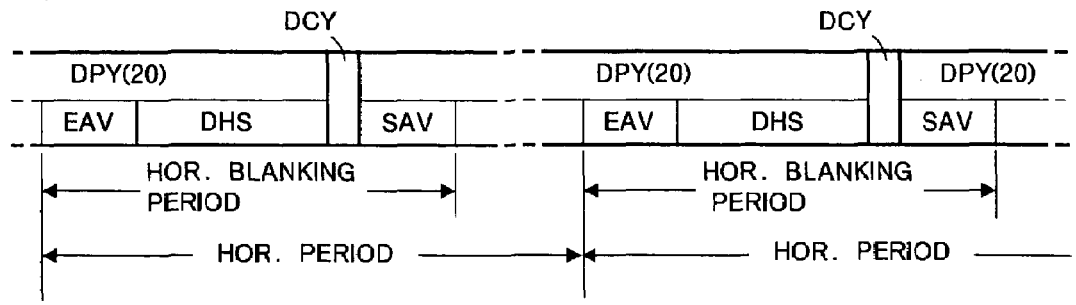
FIGS. 13A and 13B are time charts used for explaining the embodied structure of the data inserting portion provided in the four th example shown in FIG. 10.

In the case of one example of the processing for inserting the CH identification code data DCY into the 20-bit word sequence data DPY(20) in the data selecting portion 86, as shown in FIG. 13A, the CH identification code data DCY are inserted into a portion just before the time reference code data SAV (just after horizontal synchronous data DHS) of the horizontal blanking period portion in the horizontal period portion of the 20-bit word sequence data DPY(20). In such a case, the CH identification code data DCY are composed of a series of prohibited code which are not used for representing video information. The timing at which the CH identification code data DCY are inserted into the 20-bit word sequence data DPY(20) is determined by the control signals CWY and CDY.

As a result, the 20-bit word sequence data DPY(20) having the horizontal period portion into which the CH identification code data DCY are inserted as occasion demand are obtained from the data selecting portion 86 to be derived from the data inserting portion 82 as the 20-bit word sequence data DPY' (20) having the word transmission rate of 74.25 MBps.

FIG. 12 shows an embodied structure of the data inserting portion 83. In the embodied structure shown in FIG. 12, the 12-bit word sequence data DPC(12) having the word transmission rate of 74.25 MBps are supplied to a bit dividing portion 90. In the bit dividing portion 90, twelve bits C0 to C11 constituting each word of the 12-bit word sequence data DPC(12) are divided into a 10-bit group including C0 to C9, a 2-bit group including C10 and C11 and a 8-bit group including C4 to C11. These 10-bit group, 2-bit group and 8-bit group are separately extracted simultaneously from each word of the 12-bit word sequence data DPC(12).

The 10-bit group including C0 to C9, 2-bit group including C10 and C11 and 8-bit group including C4 to C11 derived from the bit dividing portion 90 in response to each word of the 12-bit word sequence data DPC(12) are supplied to a 20-bit word sequence data producing portion 91. In the 20-bit word sequence data producing portion 91, the 10-bit group, 2-bit group and 8-bit group are multiplexed to produce a 20-bit word and a series of the 20-bit words thus produced constitutes the 20-bit word sequence data DPC (20). In such a manner as mentioned above, the 12-bit word sequence data DPC(12) having the word transmission rate of 74.25 MBps are converted to the 20-bit word sequence data DPC(20) having the word transmission rate of 74.25 MBps.

The 20-bit word sequence data DPC(20) obtained from the 20-bit word sequence data producing portion 91 are supplied to a data selecting portion 92. CH identification code data DCC having the word transmission rate of 74.25 MBps are also supplied to the data selecting portion 92 from a CH identification code data supplying portion 93, as occasion demands. The CH identification code data DCC are constituted with a series of 20-bit words each having a predetermined code.

Further, in the embodied structure shown in FIG. 12, a horizontal synchronous signal SH for the digital video signal DCP(24) is supplied to a control signal producing portion 94. In the control signal producing portion 94, control signals CWC and CDC each synchronizing with the horizontal synchronous signal SH are produced. The control signals CWC is supplied to the CH identification code data supplying portion 93 and the control signals CDC is supplied to the data selecting portion 92.

The CH identification code data supplying portion 93 is operative to supply the data selecting portion 92 with the CH identification code data DCC in response to the control signal CWC, as occasion demands. The data selecting portion 92 is operative to extract the CH identification code data DCC from the CH identification code data supplying portion 93 when the control signal CDC is supplied and also to extract the 20-bit word sequence data DPC(20) when the control signal CDC is not supplied. This means that the data selecting portion 92 is operative to insert the CH identification code data DCC into the horizontal blanking period portion in the horizontal period portion of the 20-bit word sequence data DPC(20) in response to the control signal CDC, as occasion demands.

Figure 13B:
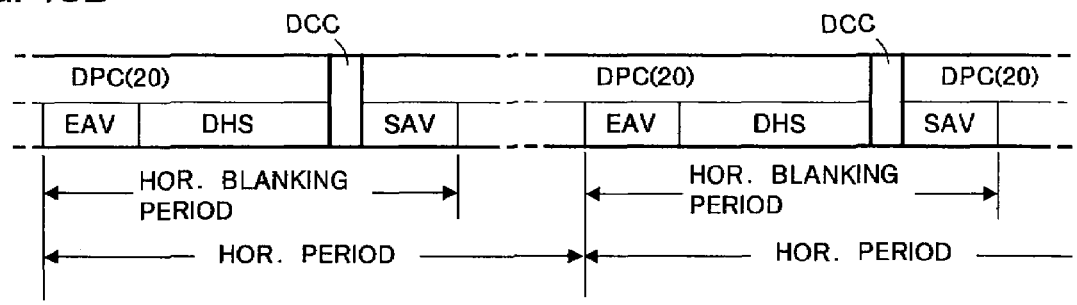

In the case of one example of the processing for inserting the CH identification code data DCC into the 20-bit word sequence data DPC(20) in the data selecting portion 92, as shown in FIG. 13B, the CH identification code data DCC are inserted into a portion just before the time reference code data SAV (just after horizontal synchronous data DHS) of the horizontal blanking period portion in the horizontal period portion of the 20-bit word sequence data DPC(20). In such a case, the CH identification code data DCC are composed of a series of prohibited code which are not used for representing video information. The timing at which the CH identification code data DCC are inserted into the 20-bit word sequence data DPC(20) is determined by the control signals CWC and CDC.

As a result, the 20-bit word sequence data DPC(20) having the horizontal period portion into which the CH identification code data DCC are inserted as occasion demand are obtained from the data selecting portion 92 to be derived from the data inserting portion 83 as the 20-bit word sequence data DPC' (20) having the word transmission rate of 74.25 MBps.

The 20-bit word sequence data DPY' (20) derived from the data inserting portion 82 are supplied to a P/S convertor 95. The P/S convertor 95 is operative to cause the 20-bit word sequence data DPY' (20) to be subjected to P/S conversion to produce serial data DSY to be transmitted at the bit transmission rate of 74.25 MBps×20=1.485 Gbps. The serial data DSY thus obtained based on the 20-bit word sequence data DPY' (20) are supplied to an E/O convertor 96. The E/O convertor 96 is operative to cause the serial data DSY to be subjected to E/O conversion to produce an optical signal OSY having the central wavelength of, for example, about 1.3 µm to be transmitted at the bit transmission rate of 1.485 Gbps. The optical signal OSY thus obtained based on the serial data DSY is supplied to a wave multiplexing portion 97.

The 20-bit word sequence data DPC' (20) derived from the data inserting portion 83 are supplied to a P/S convertor 98. The P/S convertor 98 is operative to cause the 20-bit word sequence data DPC' (20) to be subjected to P/S conversion to produce serial data DSC to be transmitted at the bit transmission rate of 74.25 MBps×20=1.485 Gbps. The serial data DSC thus obtained based on the 20-bit word sequence data DPC' (20) are supplied to an E/O convertor 99. The E/O convertor 99 is operative to cause the serial data DSC to be subjected to E/O conversion to produce an optical signal OSC having the central wavelength of, for example, about 1.55 µm to be transmitted at the bit transmission rate of 1.485 Gbps. The optical signal OSC thus obtained based on the serial data DSC is supplied to the wave multiplexing portion 97.

The wave multiplexing portion 97 to which the optical signal OSY from the E/O convertor 96 and the optical signal OSC from the E/O convertor 99 are constituted with, for example, a wavelength division multiplexer (WDM) using optical fiber. In the wave multiplexing portion 97, the optical signal OSY having the central wavelength of about 1.31 µm and the optical signal OSC having the central wavelength of about 1.55 µm are multiplexed with each other to produce a multiplexed optical signal OYC. The multiplexed optical signal OYC is derived from the wave multiplexing portion 97 as a transmission signal.

Incidentally, in the case of the fourth example shown in FIG. 10, it is not always necessary to have the insertion of the CH identification code data DCY in the data inserting portion 82 and the insertion of the CH identification code data DCC in the data inserting portion 83.

The multiplexed optical signal OYC which is the transmission signal derived from the wave multiplexing portion 97 is guided through an optical connector 100 to an optical fiber data transmission line 101 to be transmitted thereby to a receiving side. The optical fiber data transmission line 101 is made of, for example, fused quartz SMF.

The multiplexed optical signal OYC transmitted through the optical fiber data transmission line 101 is received by the fourth embodiment of apparatus for receiving digital data according to the seventh aspect of the present invention, in which the fourth embodiment of data time difference absorbing circuit according to the first aspect of the present invention is employed and the fourth embodiment of method of receiving digital data according to the fourth aspect of the present invention is carried out.

In the fourth embodiment of apparatus for receiving digital data according to the seventh aspect of the present invention, the multiplexed optical signal OYC transmitted through the optical fiber data transmission line 101 is guided through an optical connector 102 to a wave dividing portion 103. The optical connector 102 and the wave dividing portion 103 constitute a data receiving portion for receiving the multiplexed optical signal OYC transmitted through the optical fiber data transmission line 101.

The wave dividing portion 103 is constituted with, for example, a WDD using optical fiber functioning as wave dividing means. In the wave dividing portion 103, the multiplexed optical signal OYC is divided into an optical element having the central wavelength of about 1.3 μm and another optical element having the central wavelength of about 1.55 μm to reproduce the optical signal OSY which has the central wavelength of about 1.3 μm and the bit transmission rate of 1.485 Gbps and the optical signal OSC which has the central wavelength of about 1.55 μm and the bit transmission rate of 1.485 Gbps.

The optical signal OSY which has the central wavelength of about 1.3 μm and the bit transmission rate of 1.485 Gbps and the optical signal OSC which has the central wavelength of about 1.55 μm and the bit transmission rate of 1.485 Gbps reproduced by the wave dividing portion 103 are supplied to O/E convertors 104 and 105, respectively.

The O/E convertor 104 is operative to cause the optical signal OSY to be subjected to O/E conversion to reproduce the serial data DSY. The serial data DSY is reproduced based on the optical signal OSY having the central wavelength of about 1.3, m and the bit transmission rate of 1.485 Gbps to be transmitted at the bit transmission rate of 1.485 Gbps. The serial data DSY thus reproduced are supplied to an S/P convertor 106. The S/P convertor 106 is operative to cause the serial data DSY to be subjected to S/P conversion to reproduce the 20-bit word sequence data DPY' (20). The 20-bit word sequence data DPY' (20) are reproduced based on the serial data DSY to be transmitted at the word transmission rate of 74.25 MBps and supplied to a data separating portion 107. In the data separating portion 107, the 20-bit word sequence data DPY' (20) are subjected to data processing which is processed inversely to the data processing to which the 12-bit word sequence data DPY(12) is subjected in the data inserting portion 82, so that the CH identification code data DCY are separated from the 20-bit word sequence data DPY' (20) to reproduce the 20-bit word sequence data DPY(20) and then the 20-bit word sequence data DPY(20) are converted to the 12-bit word sequence data DPY(12). The 12-bit word sequence data DPY (12) thud reproduced in the data separating portion 107 are supplied to a data time difference absorbing portion 109.

The O/E convertor 105 is operative to cause the optical signal OSC to be subjected to O/E conversion to reproduce the serial data DSC. The serial data DSC is reproduced based on the optical signal OSC having the central wavelength of about 1.55 μm and the bit transmission rate of 1.485 Gbps to be transmitted at the bit transmission rate of 1.485 Gbps. The serial data DSC thus reproduced are supplied to an S/P convertor 110. The S/P convertor 110 is operative to cause the serial data DSC to be subjected to S/P conversion to reproduce the 20-bit word sequence data DPC' (20). The 20-bit word sequence data DPC' (20) are reproduced based on the serial data DSC to be transmitted at the word transmission rate of 74.25 MBps and supplied to a data separating portion 111. In the data separating portion 111, the 20-bit word sequence data DPC' (20) are subjected to data processing which is processed inversely to the data processing to which the 12-bit word sequence data DPC(12) is subjected in the data inserting portion 83, so that the CH identification code data DCC are separated from the 20-bit word sequence data DPC' (20) to reproduce the 20-bit word sequence data DPC(20) and then the 20-bit word sequence data DPC(20) are converted to the 12-bit word sequence data DPC(12). The 12-bit word sequence data DPC (12) thud reproduced in the data separating portion 111 are supplied to the data time difference absorbing portion 109.

The data time difference absorbing portion 109 is formed with the fourth embodiment of data time difference absorbing portion circuit according to the first aspect of the present invention.

In the data time difference absorbing portion 109, time difference between the 12-bit word sequence data. DPY (12) from the data separating portion 107 and the 12-bit word sequence data DPC (12) from the data separating portion 111 is absorbed to produce 12-bit word sequence data DPYQ (12) which are obtained based on the 12-bit word sequence data DPY(12) to be transmitted at the word transmission rate of 74.25 MBps and produce 12-bit word sequence data DPCQ(12) which are obtained based on the 12-bit word sequence data DPC(12) to be transmitted at the word transmission rate of 74.25 MBps in such a manner that time difference between the 12-bit word sequence data DPYQ (12) and the 12-bit word sequence data DPCQ(12) is substantially zero.

Figure 14:
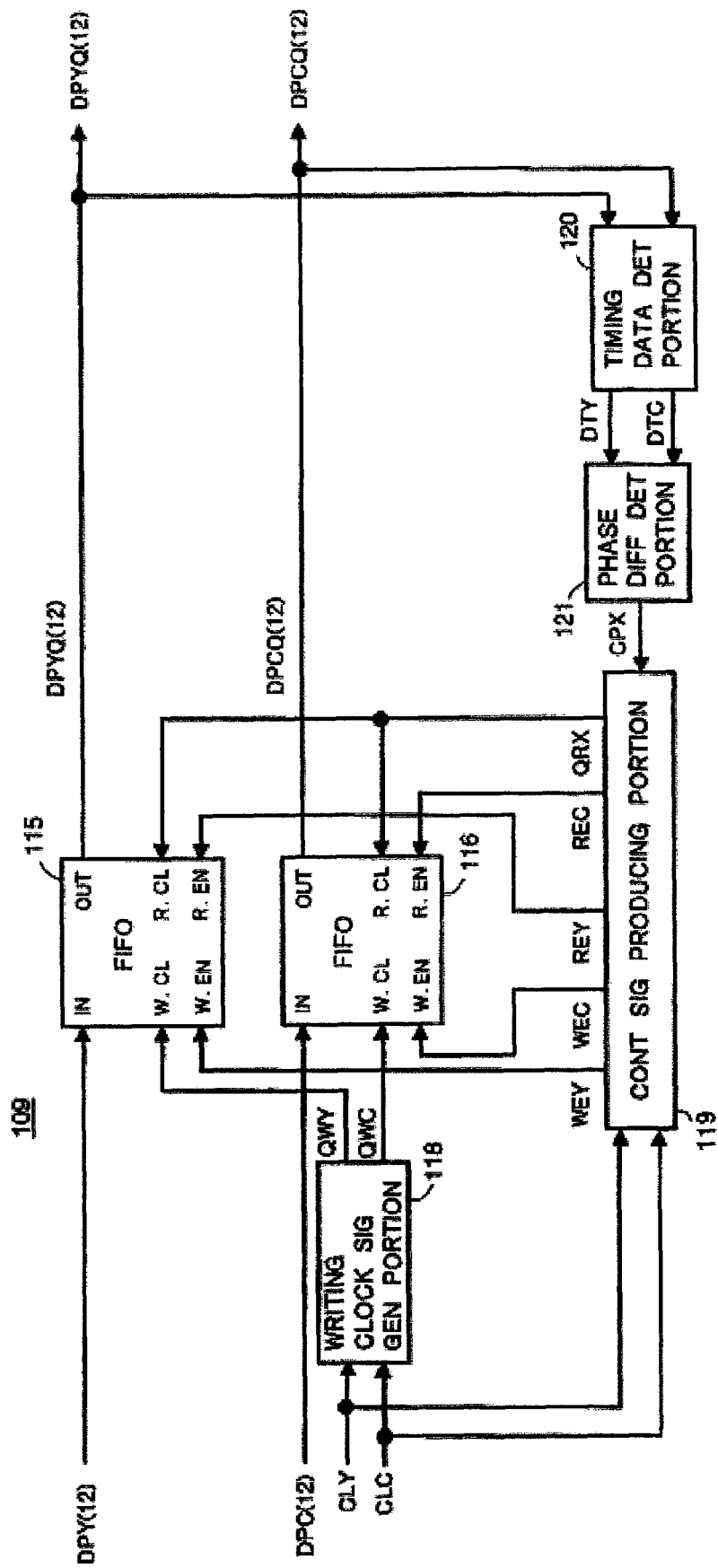
FIG. 14 is a schematic block diagram used for explaining the embodied structure of the data time difference absorbing portion provided in the fourth example shown in FIG. 10.

FIG. 14 shows an embodied structure of the data time difference absorbing portion 109. In the embodied structure shown in FIG. 14, the 12-bit word sequence data DPY(12) obtained from the data separating portion 107 are supplied to an input terminal (IN) of an FIFO memory 115 and the 12-bit word sequence data DPC(12) obtained from the data separating portion 111 are supplied to an input terminal (IN) of an FIFO memory 116.

A clock pulse signal CLY for the 12-bit word sequence data DPY' (12) which is, for example, reproduced in the S/P convertor 106 to have the frequency of 74.25 MHz and a clock pulse signal CLC for the 12-bit word sequence data DPC' (12) which is, for example, reproduced in the S/P convertor 110 to have the frequency of 74.25 MHz, are supplied to a writing clock signal generating portion 118 and a control signal producing portion 119.

In the writing clock signal generating portion 118, a writing clock signal QWY is produced based on the clock pulse signal CLY to have the frequency of 74.25 MHz and a writing clock signal QWC is produced based on the clock pulse signal CLC to have the frequency of 74.25 MHz. The writing clock signal QWY is supplied to a writing clock terminal (W.CL) of the FIFO memory 115 and the writing clock signal QWC is supplied to a writing clock terminal (W.CL) of the FIFO memory 116.

In the control signal producing portion 119, a writing enable signal WEY is produced based on the clock pulse signal CLY and a writing enable signal WEC is produced based on the clock pulse signal CLC. The writing enable signal WEY is supplied to a writing enable terminal (W.EN) of the FIFO memory 115 and the writing enable signal WEC is supplied to a writing enable terminal (W.EN) of the FIFO memory 116.

In the FIFO memory 115, under a condition in which the writing enable signal WEY functions effectively, the 12-bit word sequence data DPY(12) having the word transmission rate of 74.25 MBps are written to be stored at every predetermined data amount in accordance with the writing clock signal QWY. Similarly, in the FIFO memory 116, under a condition in which the writing enable signal WEC functions effectively, the 12-bit word sequence data DPC(12) having the word transmission rate of 74.25 MBps are written to be stored at every predetermined data amount in accordance with the writing clock signal QWC.

Further, in the control signal producing portion 119, a reading clock signal QRX is also produced based on the clock pulse signal CLY or CLC to be supplied to a reading clock terminal (R.CL) of the FIFO memory 115 and a reading clock terminal (R.CL) of the FIFO memory 116 to be common to the FIFO memories 115 and 116 and reading enable signals REY and REC are produced to be supplied to a reading enable terminal (R.EN) of the FIFO memory 115 and a reading enable terminal (R.EN) of the FIFO memory 115, respectively.

Thereby, under a condition in which the reading enable signal REY acts effectively on the FIFO memory 115, the 12-bit word sequence data DPY(12) stored in the FIFO memory 115 are read from an output terminal (OUT) of the FIFO memory 115 at every predetermined data amount to be transmitted at the word transmission, rate of 74.25 MBps in accordance with the reading clock signal QRX. The 12-bit word sequence data DPY(12) thus read out are derived from the FIFO memory 115 as 12-bit word sequence data DPYQ(12) having the word transmission rate of 74.25 MBps.

Similarly, under a condition in which the reading enable signal REC acts effectively on the FIFO memory 116, the 12-bit word sequence data DPC(12) stored in the FIFO memory 116 are read from an output terminal (OUT) of the FIFO memory 116 at every predetermined data amount to be transmitted at the word transmission rate of 74.25 MBps in accordance with the reading clock signal QRX. The 12-bit word sequence data DPC(12) thus read out are derived from the FIFO memory 116 as 12-bit word sequence data DPCQ(12) having the word transmission rate of 74.25 MBps.

The 12-bit word sequence data DPYQ(12) derived from the FIFO memory 115 and the 12-bit word sequence data DPCQ(12) derived from the FIFO memory 116 are supplied to a timing data detecting portion 120. In the timing data detecting portion 120, the time reference code data EAV contained in the 12-bit word sequence data DPYQ(12) are detected to produce a timing detection output signal DTY in response to the detected time reference code data EAV and the time reference code data EAV contained in the 12-bit word sequence data DPCQ(12) are detected to produce a timing detection output signal DTC in response to the detected time reference code data EAV.

The timing detection output signals DTY and DTC thus obtained represent a relation of timing between the time reference code data EAV in the 12-bit word sequence data DPYQ(12) and the time reference code data EAV in the 12-bit word sequence data DPCQ(12), that is, a relation of timing between the 12-bit word sequence data DPYQ(12) and the 12-bit word sequence data DPCQ(12).

The timing detection output signals DTY and DTC obtained from the timing data detecting portion 120 are supplied to a phase difference detecting portion 121. In the phase difference detecting portion 121, a phase difference between the timing detection output signals DTY and DTC is detected to produce a phase difference detection output signal CPX in response to the detected phase difference. The phase difference detection output signal CPX thus produced represents a relation of retard or advance in phase between the timing detection output signals DTY and DTC. For example, the phase difference detection output signal CPX represents "0 0" when each of the timing detection output signals DTY and DTC has the same phase, that is, the phase difference between the timing detection output signals DTY and DTC is substantially zero, "0 1" when the phase of the timing detection output signal DTY advances in relation to the phase of the timing detection output signal DTC and "1 0" when the phase of the timing detection output signal DTY retards in relation to the phase of the timing detection output signal DTC.

The phase difference detection output signal CPX obtained from the phase difference detecting portion 121 is supplied to the control signal producing portion 119. The control signal producing portion 119 is operative to cause the reading enable signal REY or REC to vary in response to the phase difference detection output signal CPX so as to control a timing at which the 12-bit word sequence data DPY(12) are read from the FIFO memory 115 or a timing at which the 12-bit word sequence data DPC(12) are read from the FIFO memory 116. Such a control of the timing for reading is conducted to keep a condition in which the phase difference between the timing detection output signals DTY and DTC detected by the phase difference detecting portion 121 is substantially zero. Consequently, the 12-bit word sequence data DPY(12) derived from the FIFO memory 115 and the 12-bit word sequence data DPC(12) derived from the FIFO memory 116 are so processed that the time difference between the 12-bit word sequence data DPY(12) and the 12-bit word sequence data DPC(12) is substantially absorbed.

The 12-bit word sequence data DPYQ(12) and DPCQ(12) obtained from the data time difference absorbing portion 109 are supplied to a word synthesizing portion 122. In the word synthesizing portion 122, the 12-bit word sequence data DPYQ(12) and DPCQ(12) are subjected to word synthesizing, which is processed inversely to the word dividing to which the 24-bit word data constituting the digital video signal DCP(24) is subjected in the word dividing portion 81, to reproduce the digital video signal DCP(24).

Incidentally, it is also possible to use an ordinary address controlled memory in place of each of the FIFO memories 115 and 116 in the data time difference absorbing portion 109.

Figure 15:
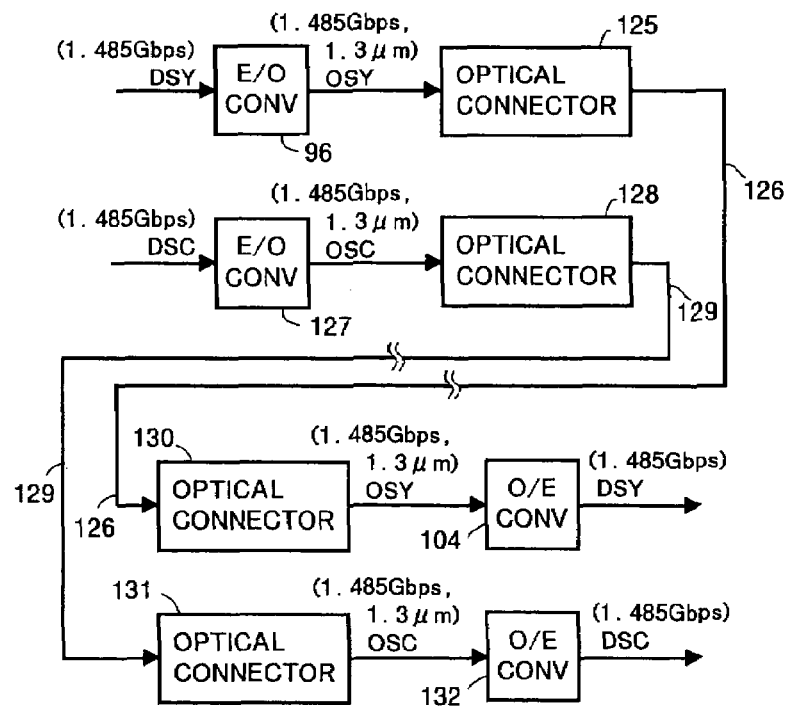
FIG. 15 is a schematic block diagram showing a part of a fifth example of a data transmitting and receiving apparatus including a fifth embodiment of apparatus for receiving digital data according to the seventh aspect of the present invention, in which a fifth embodiment of data time difference absorbing circuit according to the first aspect of the present invention is employed and a fifth embodiment of method of receiving digital data according to the fourth aspect of the present invention is carried out.

FIG. 15 shows a part of a fifth example of a data transmitting and receiving apparatus including a fifth embodiment of apparatus for receiving digital data according to the seventh aspect of the present invention, in which a fifth embodiment of data time difference absorbing circuit according to the first aspect of the present invention is employed and a fifth embodiment of method of receiving digital data according to the fourth aspect of the present invention is carried out.

The fifth example, a part of which is shown in FIG. 15, has a number of blocks constituted in the same manner as those in the fourth example shown in FIG. 10 and blocks in the fifth example which are constituted to be different from those in the fourth example are shown in FIG. 15.

Referring to FIG. 15, the wave multiplexing portion 97 and the wave dividing portion 103 employed in the fourth example shown in FIG. 10 are not provided, and an E/O convertor 127 and an O/E convertor 132 are provided in place of the E/O convertor 99 and the O/E convertor 105 employed in the fourth example shown in FIG. 10.

In the fourth example, a part of which is shown in FIG. 15, serial data DSY having the bit transmission rate of 1.485 Gbps is supplied to an E/O convertor 95 and an optical signal OSY having the central wavelength of 1.3 μm and the bit transmission rate of 1.485 Gbps is obtained from the E/O convertor 95. The optical signal OSY is guided through an optical connector 125 to an optical fiber data transmission line 126 to be transmitted to a receiving side. Serial data DSC having the bit transmission rate of 1.485 Gbps is supplied to the E/O convertor 127. An optical signal OSC having the central wavelength of 1.3 μm and the bit transmission rate of 1.485 Gbps is obtained based on the serial data DSC from the E/O convertor 127. The optical signal OSC is guided through an optical connector 128 to an optical fiber data transmission line 129 to be transmitted to a receiving side. Each of the optical fiber data transmission lines 126 and 129 is made of, for example, fused quartz SMF.

In the receiving side, the optical signal OSY transmitted through the optical fiber data transmission line 126 is guided through an optical connector 130 to an O/E convertor 104. The serial data DSY is reproduced based on the optical signal OSY to be transmitted at the bit transmission rata of 1.485 Gbps in the O/E convertor 104. Similarly, the optical signal OSC transmitted through the optical fiber data transmission line 129 is guided through an optical connector 131 to the O/E convertor 132. The serial data DSC is reproduced based on the optical signal OSC to be transmitted at the bit transmission rata of 1.485 Gbps in the O/E convertor 132.

As described above, in the fifth example having the part shown in FIG. 15, the optical signals OSY and OSC in the form of two channel signals are transmitted through the optical fiber data transmission lines 126 and 129, respectively, The other operations of the fifth example are the same as those in the fourth example shown in FIG. 10.

Figure 16:
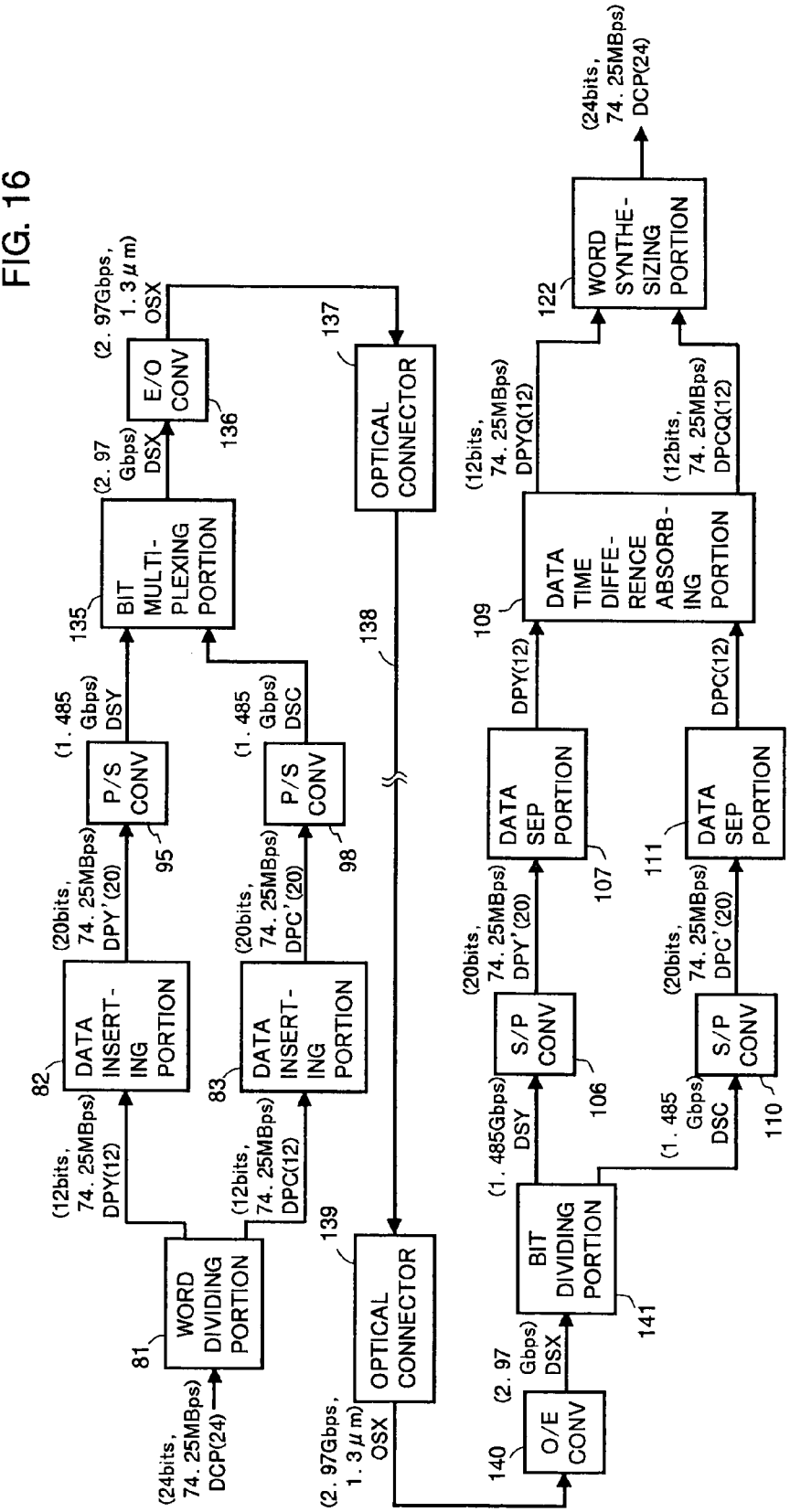
FIG. 16 is a schematic block diagram showing a sixth example of a data transmitting and receiving apparatus including a sixth embodiment of apparatus for receiving digital data according to the seventh aspect of the present invention, in which a sixth embodiment of data time difference absorbing circuit according to the first aspect of the present invention is employed and a sixth embodiment of method of receiving digital data according to the fourth aspect of the present invention is carried out.

FIG. 16 shows a sixth example of a data transmitting and receiving apparatus including a sixth embodiment of apparatus for receiving digital data according to the seventh aspect of the present invention, in which a sixth embodiment of data time difference absorbing circuit according to the first aspect of the present invention is employed and a sixth embodiment of method of receiving digital data according to the fourth aspect of the present invention is carried out.

The sixth example shown in FIG. 16 has also a number of blocks constituted in the same manner as those in the fourth example shown in FIG. 10 and in FIG. 16, blocks, signals and data corresponding to those in the fourth example shown in FIG. 10 are marked with the same references and further description thereof will be omitted.

In the sixth example shown in FIG. 16, serial data DSY having the bit transmission rate of 1.485 Gbps from a P/S convertor 95 and serial data DSC having the bit transmission rate of 1.485 Gbps from a P/S convertor 98 are supplied to a bit multiplexing portion 135. In the bit multiplexing portion 135, each bit of the serial data DSY and each bit of the serial data DSC are alternately extracted to be arranged successively so that the serial data DSY and DSC are subjected to bit multiplexing to produce multiplexed serial data DSX having the bit transmission rate of 1.485 Gbps× 2=2.97 Gbps.

The multiplexed serial data DSX obtained from the bit multiplexing portion 135 are supplied to an E/O convertor 136. The E/O convertor 136 is operative to cause the multiplexed serial data DSX to be subjected to E/O conversion to produce an optical signal OSX having the central wavelength of about 1.3 μm. The optical signal OSX is obtained based on the multiplexed serial data DSX from the E/O convertor 136 to be transmitted at the bit transmission rate of 2.97 Gbps and guided through an optical connector 137 to an optical fiber data transmission line 138 to be transmitted to a receiving side. The optical fiber data transmission line 138 is made of, for example, fused quartz SMF.

The optical signal OSX transmitted through the optical fiber data transmission line 138 is received by the fourth embodiment of apparatus for receiving digital data according to the seventh aspect of the present invention, in which the fourth embodiment of data time difference absorbing circuit according to the first aspect of the present invention is employed and the fourth embodiment of method of receiving digital data according to the fourth aspect of the present invention is carried out.

In the fourth embodiment of apparatus for receiving digital data according to the seventh aspect of the present invention, the optical signal OSX which has the central wavelength of about 1.3 μm and is transmitted at the bit transmission rate of 2.97 Gbps through the optical fiber data transmission line 138 is guided through an optical connector 139 to an O/E convertor 140. The optical connector 139 and the O/E convertor 140 constitute a data receiving portion for receiving the optical signal OSX transmitted through the optical fiber data transmission line 138.

The O/E convertor 140 is operative to cause the optical signal OSX having the central wavelength of about 1.3 μm to be subjected to O/E conversion to reproduce the multiplexed serial data DSX having the bit transmission rate of 2.97 Gbps. The multiplexed serial data DSX thus reproduced are supplied to a bit dividing portion 141.

In the bit dividing portion 141, each bit of the multiplexed serial data DSX is extracted successively and separated to form a couple of bit groups, one of which includes every other bits and the other of which includes another every other bits so that the multiplexed serial data DSX is subjected to bit dividing. Thereby, the serial data DSY having the bit transmission rate of 2.97 Gbps/2=1.485 Gbps and the serial data DSC having the bit transmission rate of 2.97 Gbps/2=1.485 Gbps which form two channel data are reproduced. The serial data DSY are supplied to an S/P convertor 106 and the serial data DSC are supplied to an S/P convertor 110.

The other operations of the fifth example shown in FIG. 16 are the same as those of the fourth example shown in FIG. 10.

Figure 17:
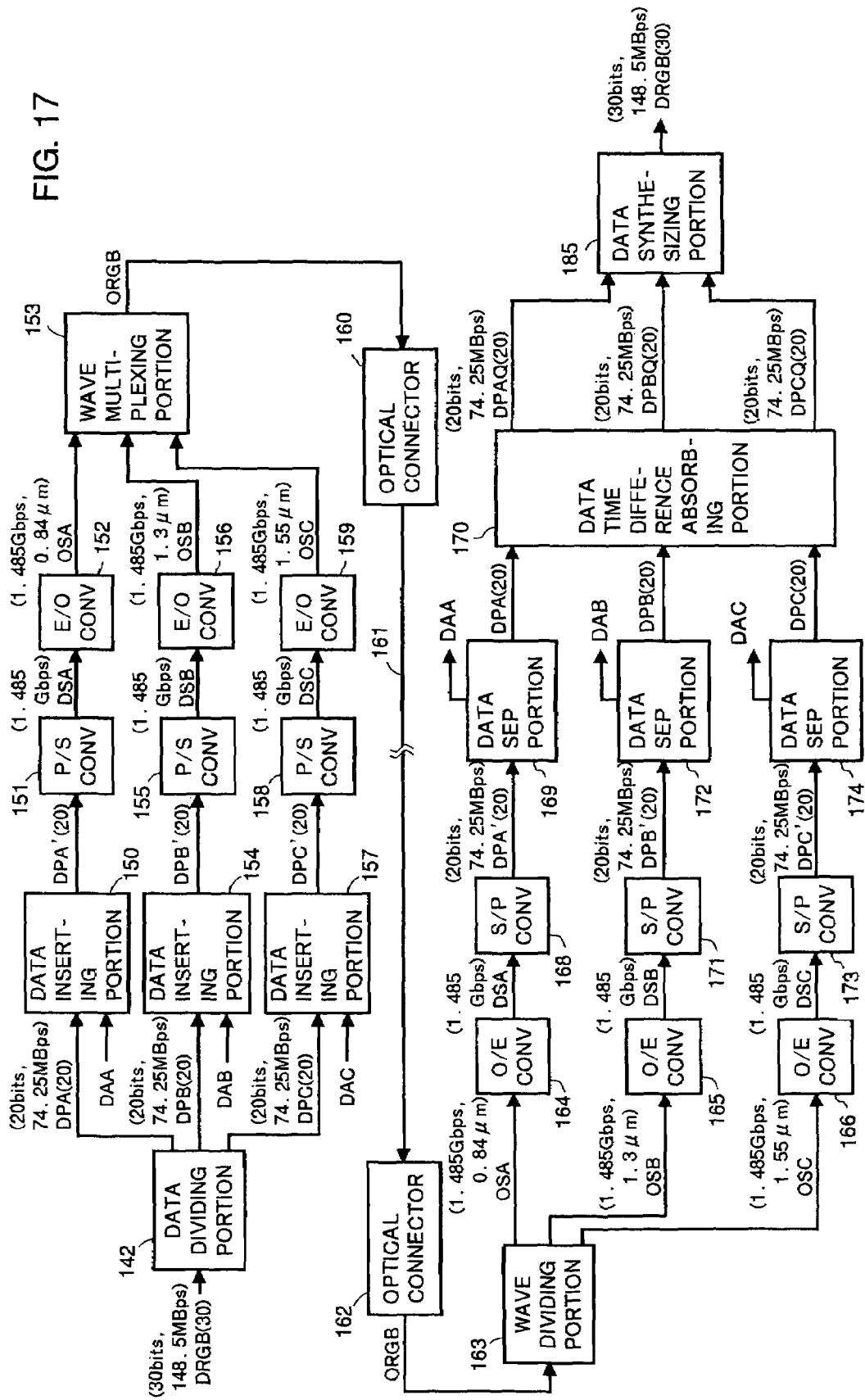
FIG. 17 is a schematic block diagram showing a seventh example of a data transmitting and receiving apparatus including a first embodiment of apparatus for receiving digital data according to the eighth aspect of the present invention, in which a first embodiment of data time difference absorbing circuit according to the second aspect of the present invention is employed and a first embodiment of method of receiving digital data according to the fifth aspect of the present invention is carried out.

FIG. 17 shows a seventh example of a data transmitting and receiving apparatus which includes a first embodiment of apparatus for receiving digital data according to the seventh aspect of the present invention, in which a first embodiment of data time difference absorbing circuit according to the second aspect of the present invention is employed and a first embodiment of method of receiving digital data according to the fifth aspect of the present invention is carried out.

Referring to FIG. 17, a digital video signal DRGB(30) is supplied to a data dividing portion 142 at a data transmitting side. The digital video signal DRGB(30) is, for example, a progressive HD digital video signal produced in the form of G, B and R signals having a frame rate of 24 Hz and constituted with 30-bit word sequence data. The 30-bit word sequence data are composed of a series of 30 bit words, each of which is formed by multiplexing a G data sequence GD(10), a B data sequence BD(10) and a R data sequence RD(10) with each other under a condition in which horizontal blanking period portions of the G data sequence GD(10), the B data sequence BD(10) and the R data sequence RD(10) are synchronized with one another.

Figure 2:
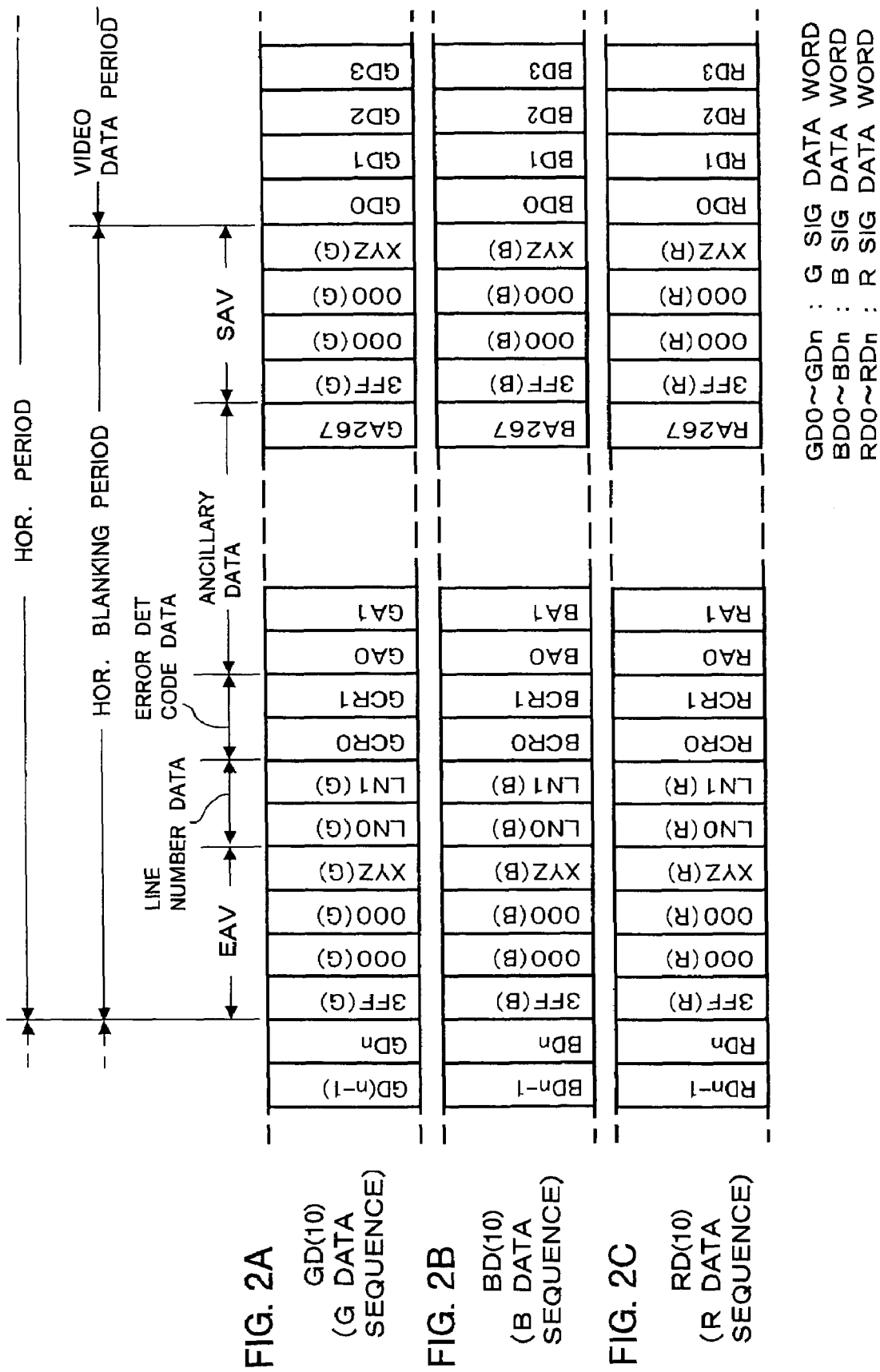
FIGS. 2A, 2B and 2C are time charts used for explaining another example of a data format for a digital video signal.

Each of the G data sequence GD(10), the B data sequence BD(10) and the R data sequence RD(10) is constituted with 10-bit word sequence data to be transmitted at the word transmitting rate of, for example, 148.5 MBps in accordance with the data formats as shown in FIGS. 2A, 2B and 2C, respectively.

In the horizontal blanking period portion of the digital video signal DRGB(30), four 30-bit words (3FF(G):3FF(B):3FF(R), 000(G):000(B) :000(R), 000(G):000(B):000(R), XYZ(G):XYZ(B):XYZ(R)) are provided as time reference code data EAV and another four 30-bit words (3FF(G):3FF(B):3FF(R), 000(G):000(B):000(R), 000(G):000(B):000(R), XYZ(G):XYZ(B) :XYZ(R)) are provided as time reference code data SAV.

Figure 18:
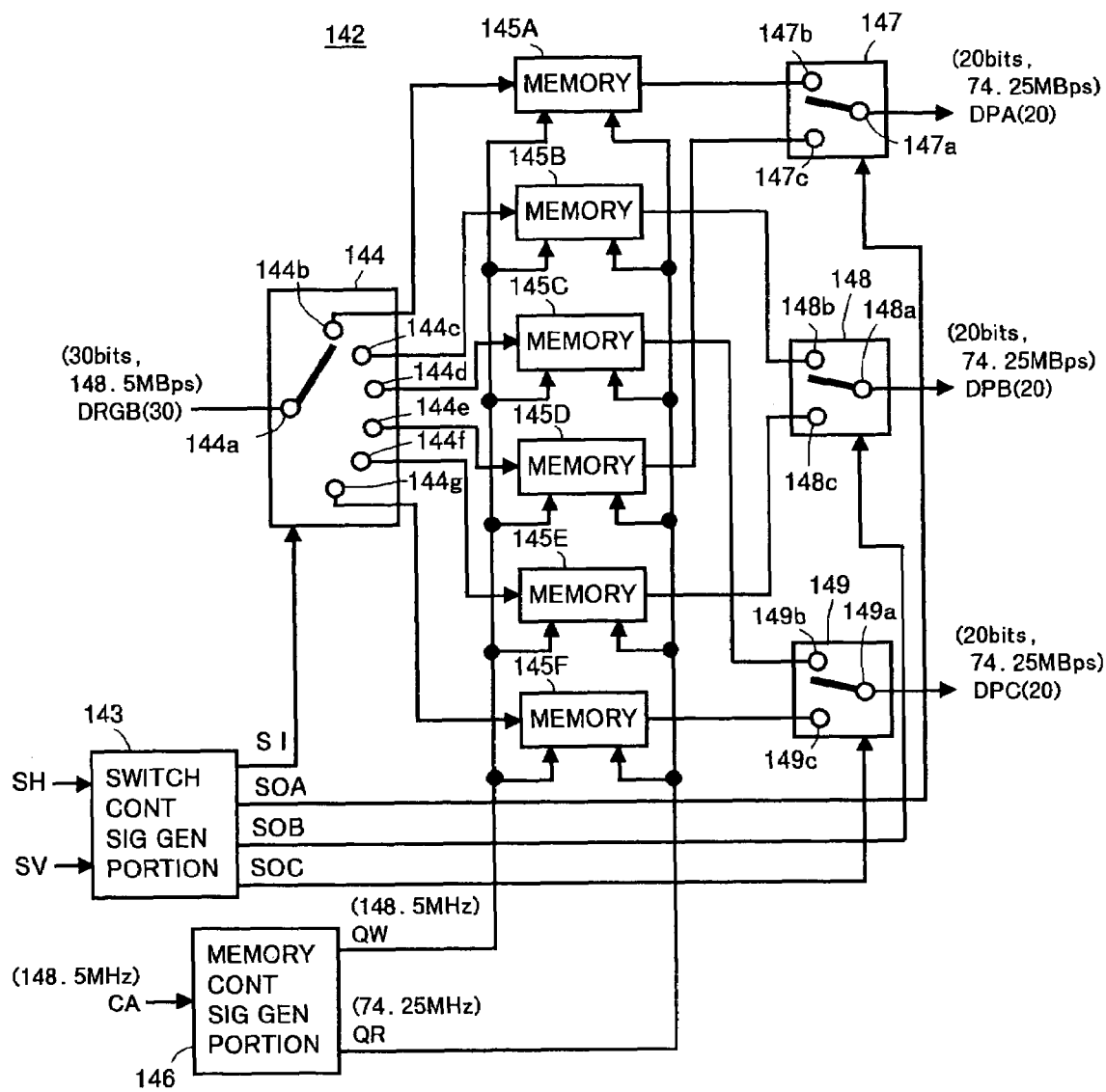
FIG. 18 is a schematic block diagram showing an embodied structure of a data dividing portion provided in the seventh example shown in FIG. 17.

FIG. 18 shows an embodied structure of the data dividing portion 142. In the embodied structure shown in FIG. 18, a horizontal synchronous signal SH and a vertical synchronous signal SV of the digital video signal DRGB(30) which determine a horizontal period and a vertical period in the digital video signal DRGB(30), respectively, are supplied to a switch control signal generating portion 143. The switch control signal generating portion 143 produces a switch control signal SI which is synchronized with each frame period (or each line (horizontal) period) in the digital video signal DRGB(30), a switch control signal SOA which is synchronized with each first frame period (or each first line period) in the digital video signal DRGB(30), a switch control signal SOB which is synchronized with each second frame period (or each second line period) in the digital video signal DRGB(30) and a switch control signal SOC which is synchronized with each third frame period (or each third line period) in the digital video signal DRGB(30), based on the horizontal synchronous signal SH and vertical synchronous signal SV.

The switch control signal SI obtained from the switch control signal generating portion 143 is supplied to a switch 144. The switch 144 has a movable contact 144a and six fixed contacts 144b to 144g. The movable contact 144a is controlled by the switch control signal SI repeatedly to come into contact with each of the fixed contacts 144b to 144g successively at every frame period (or every line (horizontal) period) in the digital video signal DRGB(30). The fixed contacts 144b to 144g of the switch 144 are connected with six memories 145A to 145F, respectively.

The digital video signal DRGB(30) supplied to the data dividing portion 142 is supplied through the switch 144 having the movable contact 144a controlled by the switch control signal SI to each of the memories 145A to 145F successively at every frame period portion (or every line period portion) thereof. Accordingly, each first frame period portion (or each first line period portion) of the digital video signal DRGB(30) is successively supplied to the memories 145A and 145D alternately, each second frame period portion (or each second line period portion) of the digital video signal DRGB(30) is successively supplied to the memories 145B and 145E alternately, and each third frame period portion (or each third line period portion) of the digital video signal DRGB(30) is successively supplied to the memories 145C and 145F alternately.

A writing clock signal QW having the frequency of 148.5 MHz and a reading clock signal QR having the frequency of 148.5/2=74.25 MHz are supplied to each of the memories 145A to 145F from a memory control signal generating portion 146 to which a clock signal CA having the frequency of 148.5 MHz is supplied. The digital video signal DRGB(30) is written in each of the memories 145A to 145F at every frame period portion (or every line period portion) thereof in accordance with the writing clock signal QW having the frequency of 148.5 MHz and then read from each of the memories 145A to 145F at every frame period portion (or every line period portion) thereof in accordance with the reading clock signal QR having the frequency of 74.25 MHz.

Accordingly, the frame period portions (or the line period portions) of the digital video signal DRGB(30) are written in each of the memories 145A to 145F successively at every period 1TF corresponding to one frame period of the digital video signal DRGB(30) (or every period 1TL corresponding to one line period of the digital video signal DRGB(30)), so that the first frame period portions (or the first line period portions) of the digital video signal DRGB(30) are successively written in the memories 145A and 145D alternately to be stored therein, the second frame period portions (or the second line period portions) of the digital video signal DRGB(30) are successively written in the memories 145B and 145E alternately to be stored therein, and the third frame period portions (or the third line period portions) of the digital video signal DRGB(30) are successively written in the memories 145C and 145F alternately to be stored therein.

Then, the first frame period portions (or the first line period portions) of the digital video signal DRGB(30) written to be stored in the memories 145A and 145D in accordance with the writing clock signal QW having the frequency of 148.5 MHz are successively read from the memories 145A and 145D alternately in accordance with the reading clock signal QR having the frequency of 74.25 MHz twenty bits to twenty bits at every unit period corresponding to three frame periods (or three line periods) in the digital video signal DRGB(30) so as to produce 20-bit word sequence data, the second frame period portions (or the second line period portions) of the digital video signal DRGB(30) written to be stored in the memories 145B and 145E in accordance with the writing clock signal QW having the frequency of 148.5 MHz are successively read from the memories 145B and 145E alternately in accordance with the reading clock signal QR having the frequency of 74.25 MHz twenty bits to twenty bits at every unit period corresponding to three frame periods (or three line periods) in the digital video signal DRGB(30) so as to produce 20-bit word sequence data, and the third frame period portions (or the third line period portions) of the digital video signal DRGB(30) written to be stored in the memories 145C and 145F in accordance with the writing clock signal QW having the frequency of 148.5 MHz are successively read from the memories 145C and 145F alternately in accordance with the reading clock signal QR having the frequency of 74.25 MHz twenty bits to twenty bits at every unit period corresponding to three frame periods (or three line periods) in the digital video signal DRGB(30) so as to produce 20-bit word sequence data.

Read output signals from the memories 145A and 145D, each of which forms 20-bit word sequence data, are supplied to fixed contacts 147b and 147c of a switch 147, respectively. The switch 147 has a movable contact 147a in addition to the fixed contacts 147b and 147c. Read output signals from the memories 145B and 145E, each of which forms 20-bit word sequence data, are supplied to fixed contacts 148b and 148c of a switch 148, respectively. The switch 148 has a movable contact 148a in addition to the fixed contacts 148b and 148c. Further, read output signals from the memories 145C and 145F, each of which forms 20-bit word sequence data, are supplied to fixed contacts 149*b* and 149*c* of a switch 149, respectively. The switch 149 has a movable contact 149*a* in addition to the fixed contacts 149*b* and 149*c*.

The switch control signal SOA obtained from the switch control signal generating portion 143 is supplied to the switch 147. The movable contact 147*a* of the switch 147 is controlled by the switch control signal SOA to come into contact with each of the fixed contact 147*b* and 147*c* alternately at every three frame periods (or three line periods) of the digital video signal DRGB(30). Thereby, the read output signal from the memory 145A and the read output signal from the memory 145D are alternately derived to the movable contact 147*a* of the switch 147 at every period 3TF corresponding to three frame periods (or every period 3TL corresponding to three line periods) of the digital video signal DRGB(30).

The read output signals thus obtained from the memories 145A and 145D are constituted with the first frame period portions (or the first line period portions) of the digital video signal DRGB(30) which had been written to be stored in the memories 145A and 145D in accordance with the writing clock signal QW having the frequency of 148.5 MHz and then successively read from the memories 145A and 145D alternately in accordance with the reading clock signal QR having the frequency of 74.25 MHz twenty bits to twenty bits at every unit period corresponding to three frame periods (or three line periods) in the digital video signal DRGB(30) so as to produce 20-bit word sequence data. Therefore, the first frame period portions (or the first line period portions) of the digital video signal DRGB(30) which forms 20-bit word sequence data having the word transmission rate of 74.25 MBps are obtained at the movable contact 147*a* of the switch 147.

The switch control signal SOB obtained from the switch control signal generating portion 143 is supplied to the switch 148. The movable contact 148*a* of the switch 148 is controlled by the switch control signal SOB to come into contact with each of the fixed contact 148*b* and 148*c* alternately at every three frame periods (or three line periods) of the digital video signal DRGB(30). Thereby, the read output signal from the memory 145B and the read output signal from the memory 145E are alternately derived to the movable contact 148*a* of the switch 148 at every period 3TF corresponding to three frame periods (or every period 3TL corresponding to three line periods) of the digital video signal DRGB(30).

The read output signals thus obtained from the memories 145B and 145E are constituted with the second frame period portions (or the second line period portions) of the digital video signal DRGB(30) which had been written to be stored in the memories 145B and 145E in accordance with the writing clock signal QW having the frequency of 148.5 MHz and then successively read from the memories 145B and 145E alternately in accordance with the reading clock signal QR having the frequency of 74.25 MHz twenty bits to twenty bits at every unit period corresponding to three frame periods (or three line periods) in the digital video signal DRGB(30) so as to produce 20-bit word sequence data. Therefore, the second frame period portions (or the second line period portions) of the digital video signal DRGB(30) which forms 20-bit word sequence data having the word transmission rate of 74.25 MBps are obtained at the movable contact 148*a* of the switch 148.

Further, the switch control signal SOC obtained from the switch control signal generating portion 143 is supplied to the switch 149. The movable contact 149*a* of the switch 149 is controlled by the switch control signal SOC to come into contact with each of the fixed contact 149*b* and 149*c* alternately at every three frame periods (or three line periods) of the digital video signal DRGB(30). Thereby, the read output signal from the memory 145C and the read output signal from the memory 145F are alternately derived to the movable contact 149*a* of the switch 149 at every period 3TF corresponding to three frame periods (or every period 3TL corresponding to three line periods) of the digital video signal DRGB(30).

The read output signals thus obtained from the memories 145C and 145F are constituted with the first frame period portions (or the first line period portions) of the digital video signal DRGB(30) which had been written to be stored in the memories 145C and 145F in accordance with the writing clock signal QW having the frequency of 148.5 MHz and then successively read from the memories 145C and 145F alternately in accordance with the reading clock signal OR having the frequency of 74.25 MHz twenty bits to twenty bits at every unit period corresponding to three frame periods (or three line periods) in the digital video signal DRGB(30) so as to produce 20-bit word sequence data. Therefore, the third frame period portions (or the third line period portions) of the digital video signal DRGB(30) which forms 20 bit word sequence data having the word transmission rate of 74.25 MBps are obtained at the movable contact 149*a* of the switch 149.

As described above, in the embodied structure of the data dividing portion 142 shown in FIG. 18, the digital video signal DRGB(30) is divided into the first frame period portions (or the first line period portions), the second frame period portions (or the second first line period portions) and the third frame period portions (or the third line period portions), each of which form 20-bit word sequence data having the word transmission rate of 74.25 MBps converted from 148.5 MBps and which are obtained at the movable contact 147*a* of the switch 147, the movable contact 148*a* of the switch 148 and the movable contact 149*a* of the switch 149, respectively. The first frame period portions (or the first line period portions) obtained at the movable contact 147*a* of the switch 147 are derived from the data dividing portion 142 as 20-bit word sequence data DPA(20) having the word transmission rate of 74.25 MBps, the second frame period portions (or the second line period portions) obtained at the movable contact 148*a* of the switch 148 are derived from the data dividing portion 142 as 20-bit word sequence data DPB(20) having the word transmission rate of 74.25 MBps, and the third frame period portions (or the third line period portions) obtained at the movable contact 149*a* of the switch 149 are derived from the data dividing portion 142 as 20-bit word sequence data DPC(20) having the word transmission rate of 74.25 MBps Accordingly, in the data dividing portion 142, the digital video signal DRGB(30) which is constituted with 30-bit word sequence data having the word transmission rate of 148.5 MBps is divided into the 20-bit word sequence data DPA(20), the 20-bit word sequence data DPB(20) and the 20-bit word sequence data DPC(20) each having the word transmission rate of 74.25 MBps which is a half of the word transmission rate of 148.5 MBps.

The 20-bit word sequence data DPA(20) derived from the data dividing portion 142 are supplied to a data inserting portion 150. In the data inserting portion 150, ancillary data DAA which are, for example, audio data at need or the like are inserted into 20-bit word sequence data DPA(20) to produce 20-bit word sequence data DPA'(20) containing the ancillary data DAA. The 20-bit word sequence data DPA' (20) obtained from the data inserting portion 150 are supplied to a P/S convertor 151.

The P/S convertor 151 is operative to cause the 20-bit word sequence data DPA' (20) to be subjected to P/S conversion to produce serial data DSA. The serial data DSA is formed based on the 20-bit word sequence data DPA' (20) to be transmitted at the bit transmission rate of 74.25×20=1.485 Gbps and supplied to an E/O convertor 152. The E/O convertor 152 is operative to cause the serial data DSA to be subjected to E/O conversion to produce optical signal OSA having the central wavelength of, for example, about 0.84 µm. The optical signal OSA is formed based on the serial data DSA to be transmitted at the bit transmission rate of 1.485 Gbps and supplied to a wave multiplexing portion 153.

The 20-bit word sequence data DPB(20) derived from the data dividing portion 142 are supplied to a data inserting portion 154. In the data inserting portion 154, ancillary data DAB which are, for example, audio data at need or the like are inserted into 20-bit word sequence data DPB(20) to produce 20-bit word sequence data DPB' (20) containing the ancillary data DAB. The 20-bit word sequence data DPB' (20) obtained from the data inserting portion 154 are supplied to a P/S convertor 155.

The P/S convertor 155 is operative to cause the 20-bit word sequence data DPB' (20) to be subjected to P/S conversion to produce serial data DSB. The serial data DSB is formed based on the 20-bit word sequence data DPB' (20) to be transmitted at the bit transmission rate of 74.25×20=1.485 Gbps and supplied to an E/O convertor 156. The E/O convertor 156 is operative to cause the serial data DSB to be subjected to E/O conversion to produce optical signal OSB having the central wavelength of, for example, about 1.3 µm. The optical signal OSB is formed based on the serial data DSB to be transmitted at the bit transmission rate of 1.485 Gbps and supplied to the wave multiplexing portion 153.

The 20-bit word sequence data DPC(20) derived from the data dividing portion 142 are supplied to a data inserting portion 157. In the data inserting portion 157, ancillary data DAC which are, for example, audio data at need or the like are inserted into 20-bit word sequence data DPC(20) to produce 20-bit word sequence data DPC' (20) containing the ancillary data DAC. The 20-bit word sequence data DPC' (20) obtained from the data inserting portion 157 are supplied to a P/S convertor 158.

The P/S convertor 158 is operative to cause the 20-bit word sequence data DPC' (20) to be subjected to P/S conversion to produce serial data DSC. The serial data DSC is formed based on the 20-bit word sequence data DPC' (20) to be transmitted at the bit transmission rate of 74.25×20=1.485 Gbps and supplied to an E/O convertor 159. The E/O convertor 159 is operative to cause the serial data DSC to be subjected to E/O conversion to produce optical signal OSC having the central wavelength of, for example, about 1.55 µm. The optical signal OSC is formed based on the serial data DSC to be transmitted at the bit transmission rate of 1.485 Gbps and supplied to a wave multiplexing portion 153.

The wave multiplexing portion 153 to which the optical signal OSA from the E/O convertor 152, the optical signal OSB from the E/O convertor 156 and the optical signal OSC from the E/O convertor 159 are supplied are constituted with, for example, a WDM using optical fiber. In the wave multiplexing portion 153, the optical signal OSA having the central wavelength of about 0.84 µm, the optical signal OSB having the central wavelength of about 1.3 µm and the optical signal OSC having the central wavelength of about 1.55 µm are multiplexed with one another to produce a multiplexed optical signal ORGB. The multiplexed optical signal ORGB is derived from the wave multiplexing portion 153 as a transmission signal.

The multiplexed optical signal ORGB which is the transmission signal derived from the wave multiplexing portion 153 is guided through an optical connector 160 to an optical fiber data transmission line 161 to be transmitted thereby to a receiving side. The optical fiber data transmission line 161 is made of, for example, fused quartz SMF.

The multiplexed optical signal ORGB transmitted through the optical fiber data transmission line 161 is received by the first embodiment of apparatus for receiving digital data according to the eighth aspect of the present invention, in which the first embodiment of data time difference absorbing circuit according to the second aspect of the present invention is employed and the first embodiment of method of receiving digital data according to the fifth aspect of the present invention is carried out.

In the first embodiment of apparatus for receiving digital data according to the eighth aspect of the present invention, the multiplexed optical signal ORGB transmitted through the optical fiber data transmission line 161 is guided through an optical connector 162 to a wave dividing portion 163. The optical connector 162 and the wave dividing portion 163 constitute a data receiving portion for receiving the multiplexed optical signal ORGB transmitted through the optical fiber data transmission line 161.

The wave dividing portion 163 is constituted with, for example, a WDD using optical fiber functioning as wave dividing means. In the wave dividing portion 163, the multiplexed optical signal ORGB is divided into a first optical element having the central wavelength of about 0.84/m, a second optical element having the central wavelength of about 1.3 µm and a third optical element having the central wavelength of about 1.55 µm to reproduce the optical signal OSA which has the central wavelength of about 0.84 µm and the bit transmission rate of 1.485 Gbps, the optical signal OSB which has the central wavelength of about 1.3 µm and the bit transmission rate of 1.485 Gbps, and the optical signal OSC which has the central wavelength of about 1.55/m and the bit transmission rate of 1.485 Gbps.

The optical signal OSA having the central wavelength of about 0.84 µm, the optical signal OSB having the central wavelength of about 1.3 µm and the optical signal OSC having the central wavelength of about 1.55 µm reproduced by the wave dividing portion 163 are supplied to O/E convertors 164, 165 and 166, respectively.

The O/E convertor 164 is operative to cause the optical signal OSA to be subjected to O/E conversion to reproduce the serial data DSA. The serial data DSA is reproduced based on the optical signal OSA having the central wavelength of about 0.84 µm and the bit transmission rate of 1.485 Gbps to be transmitted at the bit transmission rate of 1.485 Gbps. The serial data DSA thus reproduced are supplied to an S/P convertor 168. The S/P convertor 168 is operative to cause the serial data DSA to be subjected to S/P conversion to reproduce the 20-bit word sequence data DPA' (20). The 20-bit word sequence data DPA' (20) are reproduced based on the serial data DSA to be transmitted at the word transmission rate of 74.25 MBps and supplied to a data separating portion 169. In the data separating portion 169, the ancillary data DAA are separated from the 20-bit word sequence data DPA' (20) so that the 20-bit word sequence data DPA(20) and the ancillary data DAA are separately obtained. The 20-bit word sequence data DPA(20) are supplied to a data time difference absorbing portion 170.

The O/E convertor 165 is operative to cause the optical signal OSB to be subjected to O/E conversion to reproduce the serial data DSB. The serial data DSB is reproduced based on the optical signal OSB having the central wavelength of about 1.3, m and the bit transmission rate of 1.485 Gbps to be transmitted at the bit transmission rate of 1.485 Gbps. The serial data DSB thus reproduced are supplied to an S/P convertor 171. The S/P convertor 171 is operative to cause the serial data DSB to be subjected to S/P conversion to reproduce the 20-bit word sequence data DPB' (20). The 20-bit word sequence data DPB' (20) are reproduced based on the serial data DSB to be transmitted at the word transmission rate of 74.25 MBps and supplied to a data separating portion 172. In the data separating portion 172, the ancillary data DAB are separated from the 20-bit word sequence data DPB' (20) so that the 20-bit word sequence data DPB(20) and the ancillary data DAB are separately obtained. The 20-bit word sequence data DPB(20) are supplied to the data time difference absorbing portion 170.

The O/E convertor 166 is operative to cause the optical signal OSC to be subjected to O/E conversion to reproduce the serial data DSC. The serial data DSC is reproduced based on the optical signal OSC having the central wavelength of about 1.55 µm and the bit transmission rate of 1.485 Gbps to be transmitted at the bit transmission rate of 1.485 Gbps. The serial data DSC thus reproduced are supplied to an S/P convertor 173. The S/P convertor 173 is operative to cause the serial data DSC to be subjected to S/P conversion to reproduce the 20-bit word sequence data DPC' (20). The 20-bit word sequence data DPC' (20) are reproduced based on the serial data DSC to be transmitted at the word transmission rate of 74.25 MBps and supplied to a data separating portion 174. In the data separating portion 174, the ancillary data DAC are separated from the 20-bit word sequence data DPC' (20) so that the 20-bit word sequence data DPC(20) and the ancillary data DAC are separately obtained. The 20-bit word sequence data DPC(20) are supplied to the data time difference absorbing portion 170.

The data time difference absorbing portion 170 is formed with the first embodiment of data time difference absorbing portion circuit according to the second aspect of the present invention.

In the data time difference absorbing portion 170, time difference between each two of the 20-bit word sequence data DPA(20) from the data separating portion 169, the 20-bit word sequence data DPB (20) from the data separating portion 172 and the 20-bit word sequence data DPC(20) from the data separating portion 174 is absorbed to produce 20-bit word sequence data DPAQ(20) which are obtained based on the 20-bit word sequence data DPA(20) to be transmitted at the word transmission rate of 74.25 MBps, 20-bit word sequence data DPBQ(20) which are obtained based on the 20-bit word sequence data DPB(20) to be transmitted at the word transmission rate of 74.25 MBps and 20-bit word sequence data DPCQ(20) which are obtained based on the 20-bit word sequence data DPC(20) to be transmitted at the word transmission rate of 74.25 MBps in such a manner that time difference between each two of the 20-bit word sequence data DPA(20), the 20-bit word sequence data DPB (20) and the 20-bit word sequence data DPC(20) is substantially zero.

Figure 19:
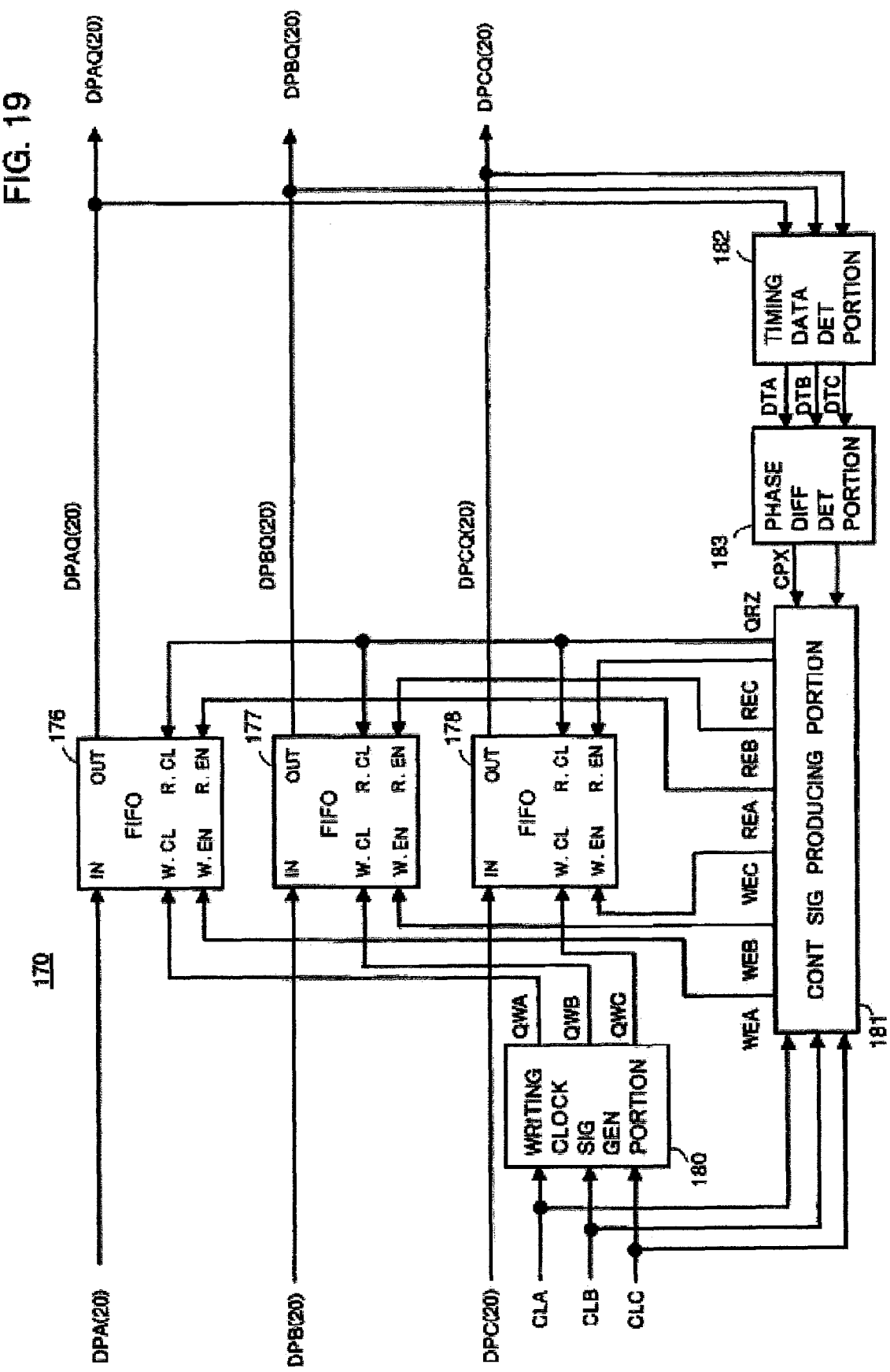
FIG. 19 is a schematic block diagram showing an embodied structure of a data time difference absorbing portion provided in the seventh example shown in FIG. 17.

FIG. 19 shows an embodied structure of the data time difference absorbing portion 170. In the embodied structure shown in FIG. 19, the 20-bit word sequence data DPA(20) obtained from the data separating portion 169 are supplied to an input terminal (IN) of an FIFO memory 176, the 20-bit word sequence data DPB(20) obtained from the data separating portion 172 are supplied to an input terminal (IN) of an FIFO memory 177, and the 20-bit word sequence data DPC(20) obtained from the data separating portion 174 are supplied to an input terminal (IN) of an FIFO memory 178.

A clock pulse signal CLA for the 20-bit word sequence data DPA' (20) which is, for example, reproduced in the S/P convertor 168 to have the frequency of 74.25 MHz, a clock pulse signal CLB for the 20-bit word sequence data DPB' (20) which is, for example, reproduced in the S/P convertor 171 to have the frequency of 74.25 MHz and a clock pulse signal CLC for the 20-bit word sequence data DPC' (20) which is, for example, reproduced in the S/P convertor 173 to have the frequency of 74.25 MHz, are supplied to a writing clock signal generating portion 180 and a control signal producing portion 181.

In the writing clock signal generating portion 180, a writing clock signal QWA is produced based on the clock pulse signal CLA to have the frequency of 74.25 MHz, a writing clock signal QWB is produced based on the clock pulse signal CLB to have the frequency of 74.25 MHz and a writing clock signal QWC is produced based on the clock pulse signal CLC to have the frequency of 74.25 MHz. The writing clock signal QWA is supplied to a writing clock terminal (W.CL) of the FIFO memory 176, the writing clock signal QWB is supplied to a writing clock terminal (W.CL) of the FIFO memory 177 and the writing clock signal QWC is supplied to a writing clock terminal (W.CL) of the FIFO memory 178.

In the control signal producing portion 181, a writing enable signal WEA is produced based on the clock pulse signal CLA, a writing enable signal WEB is produced based on the clock pulse. signal CLB and a writing enable signal WEC is produced based on the clock pulse signal CLC. The writing enable signal WEA is supplied to a writing enable terminal (W.EN) of the FIFO memory 176, the writing enable signal WEB is supplied to a writing enable terminal (W.EN) of the FIFO memory 177 and the writing enable signal WEC is supplied to a writing enable terminal (W.EN) of the FIFO memory 178.

In the FIFO memory 176, under a condition in which the writing enable signal WEA functions effectively, the 20-bit word sequence data DPA(20) having the word transmission rate of 74.25 MBps are written to be stored at every predetermined data amount in accordance with the writing clock signal QWA. In the FIFO memory 177, under a condition in which the writing enable signal WEB functions effectively, the 20-bit word sequence data DPB(20) having the word transmission rate of 74.25 MBps are written to be stored at every predetermined data amount in accordance with the writing clock signal QWB. In the FIFO memory 178, under a condition in which the writing enable signal WEC functions effectively, the 20-bit word sequence data DPC(20) having the word transmission rate of 74.25 MBps are written to be stored at every predetermined data amount in accordance with the writing clock signal QWC.

Further, in the control signal producing portion 181, a reading clock signal QRZ is also produced based on the clock pulse signal CLA, CLB or CLC to be supplied to a reading clock terminal (R.CL) of the FIFO memory 176, a reading clock terminal (R.CL) of the FIFO memory 177 and a reading clock terminal (R.CL) of the FIFO memory 178 to be common to the FIFO memories 176, 177 and 178 and reading enable signals REA, REB and REC are produced to be supplied to a reading enable terminal (R.EN) of the FIFO memory 176, a reading enable terminal (R.EN) of the FIFO memory 177 and a reading enable terminal (R.EN) of the FIFO memory 178, respectively.

Thereby, under a condition in which the reading enable signal REA acts effectively on the FIFO memory 176, the 20-bit word sequence data DPA(20) stored in the FIFO memory 176 are read from an output terminal (OUT) of the FIFO memory 176 at every predetermined data amount to be transmitted at the word transmission rate of 74.25 MBps in accordance with the reading clock signal QRZ. The 20-bit word sequence data DPA(20) thus read out are derived from the FIFO memory 176 as 20-bit word sequence data DPAQ (20) having the word transmission rate of 74.25 MBps.

Similarly, under a condition in which the reading enable signal REB acts effectively on the FIFO memory 177, the 20-bit word sequence data DPB(20) stored in the FIFO memory 177 are read from an output terminal (OUT) of the FIFO memory 177 at every predetermined data amount to be transmitted at the word transmission rate of 74.25 MBps in accordance with the reading clock signal QRZ. The 20-bit word sequence data DPB(20) thus read out are derived from the FIFO memory 177 as 20-bit word sequence data DPBQ (20) having the word transmission rate of 74.25 MBps.

Further, under a condition in which the reading enable signal REC acts effectively on the FIFO memory 178, the 20-bit word sequence data DPC(20) stored in the FIFO memory 178 are read from an output terminal (OUT) of the FIFO memory 178 at every predetermined data amount to be transmitted at the word transmission rate of 74.25 MBps in accordance with the reading clock signal QRZ. The 20-bit word sequence data DPC(20) thus read out are derived from the FIFO memory 178 as 20-bit word sequence data DPCQ (20) having the word transmission rate of 74.25 MBps.

The 20-bit word sequence data DPAQ(20) derived from the FIFO memory 176, the 20-bit word sequence data DPBQ(20) derived from the FIFO memory 177 and the 20-bit word sequence data DPCQ(20) derived from the FIFO memory 178 are supplied to a timing data detecting portion 182. In the timing data detecting portion 182, the time reference code data EAV contained in the 20-bit word sequence data DPAQ(20) are detected to produce a timing detection output signal DTA in response to the detected time reference code data EAV, the time reference code data EAV contained in the 20-bit word sequence data DPBQ(20) are detected to produce a timing detection output signal DTB in response to the detected time reference code data EAV, and the time reference code data EAV contained in the 20-bit word sequence data DPCQ(20) are detected to produce a timing detection output signal DTC in response to the detected time reference code data EAV.

Figure 20A:
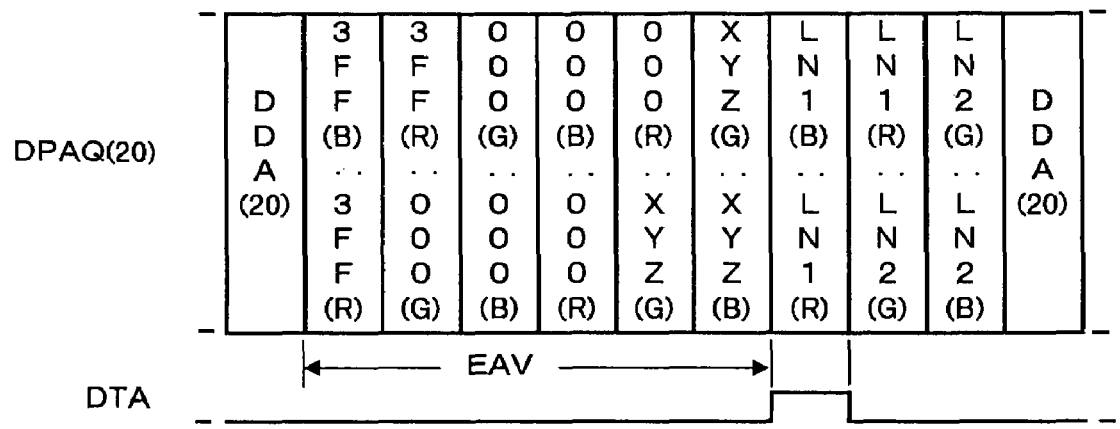
FIGS. 20A, 20B and 20C are time charts used for explaining the embodied structure of the data time difference absorbing portion shown in FIG. 19.
Figure 20B:
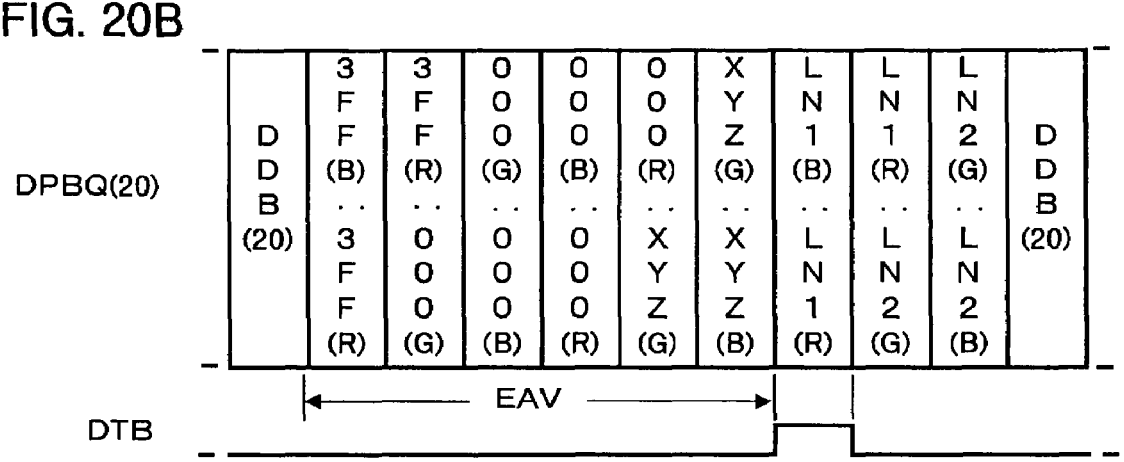
Figure 20C:
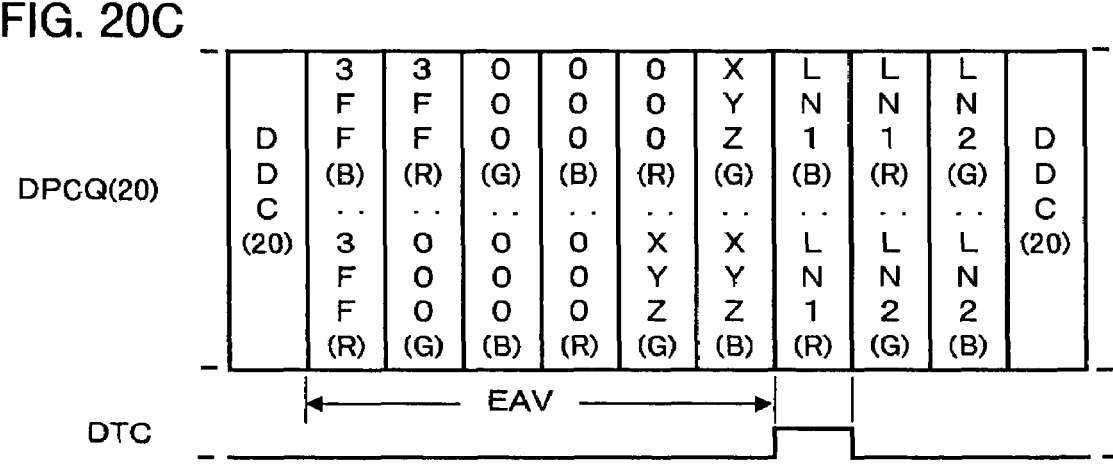

The timing detection output signal DTA is obtained, for example, just after the time reference code data EAV in the 20-bit word sequence data DPAQ(20) as shown in FIG. 20A, the timing detection output signal DTB is obtained, for example, just after the time reference code data EAV in the 20-bit word sequence data DPBQ(20) as shown in FIG. 20B, and the timing detection output signal DTC is obtained, for example, just after the time reference code data EAV in the 20-bit word sequence data DPCQ(20) as shown in FIG. 20C. These timing detection output signals DTA, DTB and DTC thus obtained represent a relation of timing between each two of the time reference code data EAV in the 20-bit word sequence data DPAQ(20), the time reference code data EAV in the 20-bit word sequence data DPBQ(20) and the time reference code data EAV in the 20-bit word sequence data DPCQ(20), that is, a relation of timing between each two of the 20-bit word sequence data DPAQ(20), the 20-bit word sequence data DPBQ(20) and the 20-bit word sequence data DPCQ(20).

The timing detection output signals DTA, DTB and DTC obtained from the timing data detecting portion 182 are supplied to a phase difference detecting portion 183. In the phase difference detecting portion 183, a phase difference between each two of the timing detection output signals DTA, DTB and DTC is detected to produce phase difference detection output signals CPX in response to the detected phase differences.

The phase difference detection output signals CPX obtained from the phase difference detecting portion 183 are supplied to the control signal producing portion 181. The control signal producing portion 181 is operative to cause at least one of the reading enable signals REA, REB and REC to vary in response to the phase difference detection output signals CPX so as to control at least one of a timing at which the 20-bit word sequence data DPA(20) are read from the FIFO memory 176, a timing at which the 20-bit word sequence data DPB(20) are read from the FIFO memory 177 and a timing at which the 20-bit word sequence data DPC(20) are read from the FIFO memory 178. Such a control of the timing for reading is conducted to keep a condition in which the phase difference between each two of the timing detection output signals DTA, DTB and DTC detected by the phase difference detecting portion 183 is substantially zero. Consequently, the 20-bit word sequence data DPAQ(20) derived from the FIFO memory 176, the 20-bit word sequence data DPBQ(20) derived from the FIFO memory 177 and the 20-bit word sequence data DPCQ(20) derived from the FIFO memory 178 are so processed that the time difference between each two of the 20-bit word sequence data DPAQ(20), the 20-bit word sequence data DPBQ(20) and the 20-bit word sequence data DPCQ(20) is substantially absorbed.

The 20-bit word sequence data DPAQ(20), DPBQ(20) and DPCQ(20) obtained from the data time difference absorbing portion 170 are supplied to a data synthesizing portion 185. In the data synthesizing portion 185, the 20-bit word sequence data DPAQ(20), DPBQ(20) and DPCQ(20) are subjected to data synthesizing process, which is proceeded inversely to the data dividing to which the 30-bit word sequence data constituting the digital video signal DRGB(30) are subjected in the data dividing portion 142, to reproduce the digital video signal DRGB(30).

Incidentally, it is possible to use an ordinary address controlled memory in place of each of the FIFO memories 176, 177 and 178 in the data time difference absorbing portion 170.

Figure 21:
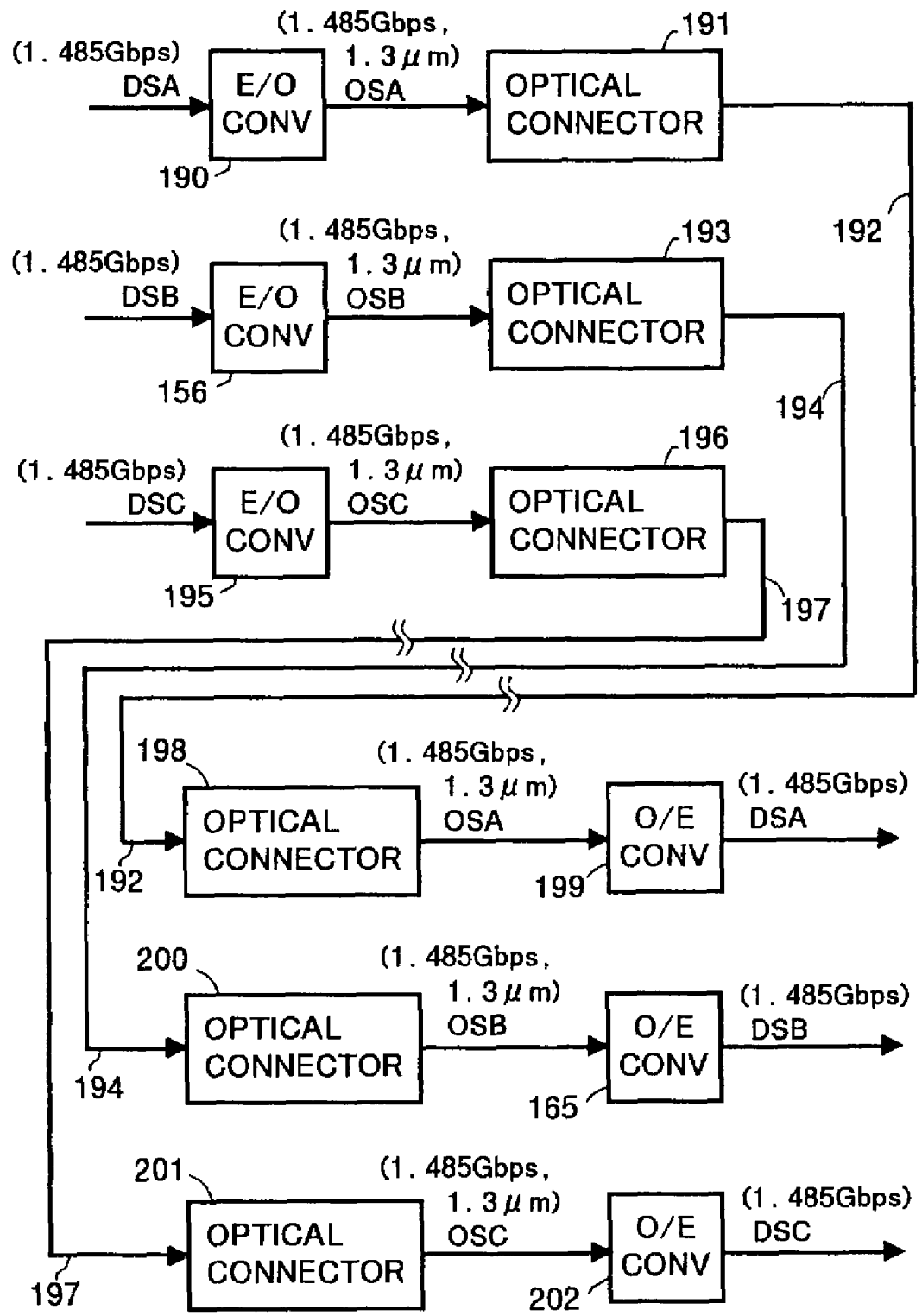
FIG. 21 is a schematic block diagram showing a part of a eighth example of a data transmitting and receiving apparatus including a second embodiment of apparatus for receiving digital data according to the eighth aspect of the present invention, in which a second embodiment of data time difference absorbing circuit according to the second aspect of the present invention is employed and a second embodiment of method of receiving digital data according to the fifth aspect of the present invention is carried out.

FIG. 21 shows a part of a eighth example of a data transmitting and receiving apparatus including a second embodiment of apparatus for receiving digital data according to the eighth aspect of the present invention, in which a second embodiment of data time difference absorbing circuit according to the second aspect of the present invention is employed and a second embodiment of method of receiving digital data according to the fifth aspect of the present invention is carried out.

The eighth example, a part of which is shown in FIG. 21, has a number of blocks constituted in the same manner as those in the seventh example shown in FIG. 17 and blocks in the eighth example which are constituted to be different from those in the seventh example are shown in FIG. 8.

Referring to FIG. 21, the wave multiplexing portion 153 and the wave dividing portion 163 employed in the seventh example shown in FIG. 17 are not provided, and E/O convertors 190 and 195 and O/E convertors 199 and 202 are provided in place of the E/O convertors 152 and 159 and the O/E convertors 164 and 166 employed in the seventh example shown in FIG. 17.

In the eighth example, a part of which is shown in FIG. 21, serial data DSA having the bit transmission rate of 1.485 Gbps is supplied to the E/O convertor 190 and an optical signal OSA having the central wavelength of 1.3 μm and the bit transmission rate of 1.485 Gbps is obtained from the E/O convertor 190. The optical signal OSA is guided through an optical connector 191 to an optical fiber data transmission line 192 to be transmitted to a receiving side.

Serial data DSB having the bit transmission rate of 1.485 Gbps are supplied to the E/O convertor 156. An optical signal OSB having the central wavelength of 1.3 μm and the bit transmission rate of 1.485 Gbps is obtained based on the serial data DSB from the E/O convertor 156. The optical signal OSB is guided through an optical connector 193 to an optical fiber data transmission line 194 to be transmitted to a receiving side.

Further, serial data DSC having the bit transmission rate of 1.485 Gbps is supplied to the E/O convertor 195. An optical signal OSC having the central wavelength of 1.3 μm and the bit transmission rate of 1.485 Gbps is obtained based on the serial data DSC from the E/O convertor 195. The optical signal OSC is guided through an optical connector 196 to an optical fiber data transmission line 197 to be transmitted to a receiving side.

Each of the optical fiber data transmission lines 192, 194 and 197 is made of, for example, fused quartz SMF.

In the receiving side, the optical signal OSA transmitted through the optical fiber data transmission line 192 is guided through an optical connector 198 to the O/E convertor 199. The serial data DSA is reproduced based on the optical signal OSA to be transmitted at the bit transmission rata of 1.485 Gbps in the O/E convertor 199. The optical signal OSB transmitted through the optical fiber data transmission line 194 is guided through an optical connector 200 to an O/E convertor 165. The serial data DSB is reproduced based on the optical signal OSB to be transmitted at the bit transmission rata of 1.485 Gbps in the O/E convertor 165. The optical signal OSC transmitted through the optical fiber data transmission line 197 is guided through an optical connector 201 to the O/E convertor 202. The serial data DSC is reproduced based on the optical signal OSC to be transmitted at the bit transmission rata of 1.485 Gbps in the O/E convertor 202.

As described above, in the eighth example having the part shown in FIG. 21, the optical signals OSA, OSB and OSC in the form of three channel signals are transmitted through the optical fiber data transmission lines 192, 194 and 197, respectively, The other operations of the eighth example are the same as those in the seventh example shown in FIG. 17.

Figure 22:
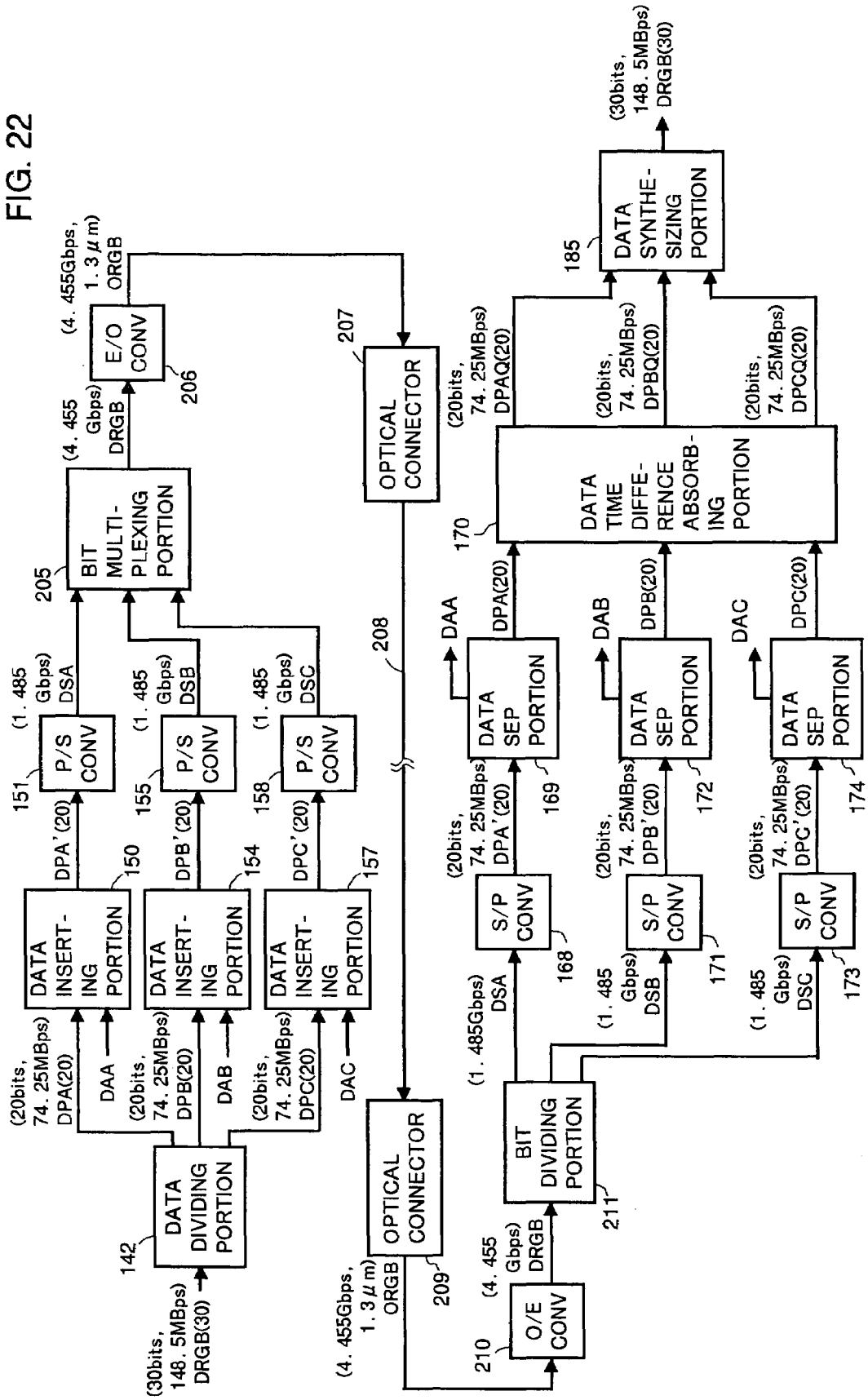
FIG. 22 is a schematic block diagram showing a ninth example of a data transmitting and receiving apparatus including a third embodiment of apparatus for receiving digital data according to the eighth aspect of the present invention, in which a third embodiment of data time difference absorbing circuit according to the second aspect of the present invention is employed and a third embodiment of method of receiving digital data according to the fifth aspect of the present invention is carried out.

FIG. 22 shows a ninth example of a data transmitting and receiving apparatus including a third embodiment of apparatus for receiving digital data according to the eighth aspect of the present invention, in which a third embodiment of data time difference absorbing circuit according to the second aspect of the present invention is employed and a third embodiment of method of receiving digital data according to the fifth aspect of the present invention is carried out.

The ninth example shown in FIG. 22 has also a number of blocks constituted in the same manner as those in the seventh example shown in FIG. 17 and in FIG. 22, blocks, signals and data corresponding to those in the seventh example shown in FIG. 17 are marked with the same references and further description thereof will be omitted.

In the ninth example shown in FIG. 22, serial data DSA having the bit transmission rate of 1.485 Gbps from a P/S convertor 151, serial data DSB having the bit transmission rate of 1.485 Gbps from a P/S convertor 155 and serial data DSC having the bit transmission rate of 1.485 Gbps from a P/S convertor 158 are supplied to a bit multiplexing portion 205. In the bit multiplexing portion 205, each bit of the serial data DSA, each bit of the serial data DSB and each bit of the serial data DSC are successively extracted to be arranged in series so that the serial data DSA, DSB and DSC are subjected to bit multiplexing to produce multiplexed serial data DRGB having the bit transmission rate of 1.485 Gbps× 3=4.455 Gbps.

The multiplexed serial data DRGB obtained from the bit multiplexing portion 205 are supplied to an E/O convertor 206. The E/O convertor 206 is operative to cause the multiplexed serial data DRGB to be subjected to E/O conversion to produce an optical signal ORGB having the central wavelength of about 1.3 μm. The optical signal ORGB is obtained based on the multiplexed serial data DRGB from the E/O convertor 206 to be transmitted at the bit transmission rate of 4.455 Gbps and guided through an optical connector 207 to an optical fiber data transmission line 208 to be transmitted to a receiving side. The optical fiber data transmission line 208 is made of, for example, fused quartz SMF.

The optical signal ORGB transmitted through the optical fiber data transmission line 208 is received by the second embodiment of apparatus for receiving digital data according to the eighth aspect of the present invention, in which the second embodiment of data time difference absorbing circuit according to the second aspect of the present invention is employed and the second embodiment of method of receiving digital data according to the fifth aspect of the present invention is carried out.

In the second embodiment of apparatus for receiving digital data according to the eighth aspect of the present invention, the optical signal ORGB which has the central wavelength of about 1.3 μm and is transmitted at the bit transmission rate of 4.455 Gbps through the optical fiber data transmission line 208 is guided through an optical connector 209 to an O/E convertor 210. The optical connector 209 and the O/E convertor 210 constitute a data receiving portion for receiving the optical signal ORGB transmitted through the optical fiber data transmission line 208.

The O/E convertor 210 is operative to cause the optical signal ORGB having the central wavelength of about 1.3, m to be subjected to O/E conversion to reproduce the multiplexed serial data DRGB having the bit transmission rate of 4.455 Gbps. The multiplexed serial data DRGB thus reproduced are supplied to a bit dividing portion 211.

In the bit dividing portion 211, each bit of the multiplexed serial data DRGB is extracted successively and separated to form first, second and third bit groups. The first bit group includes first every other bits, the second bit group includes second every other bits and the third bit group includes third every other bits so that the multiplexed serial data DRGB is subjected to bit dividing. Thereby, the serial data DSA having the bit transmission rate of 4.455 Gbps/3=1.485 Gbps, the serial data DSB having the bit transmission rate of 4.455 Gbps/3=1.485 Gbps and the serial data DSC having the bit transmission rate of 4.455 Gbps/3=1.485 Gbps which form three channel data are reproduced. The serial data DSA are supplied to an S/P convertor 168, the serial data DSB are supplied to an S/P convertor 171 and the serial data DSC are supplied to an S/P convertor 173.

The other operations of the ninth example shown in FIG. 22 are the same as those of the seventh example shown in FIG. 17.

Figure 23:
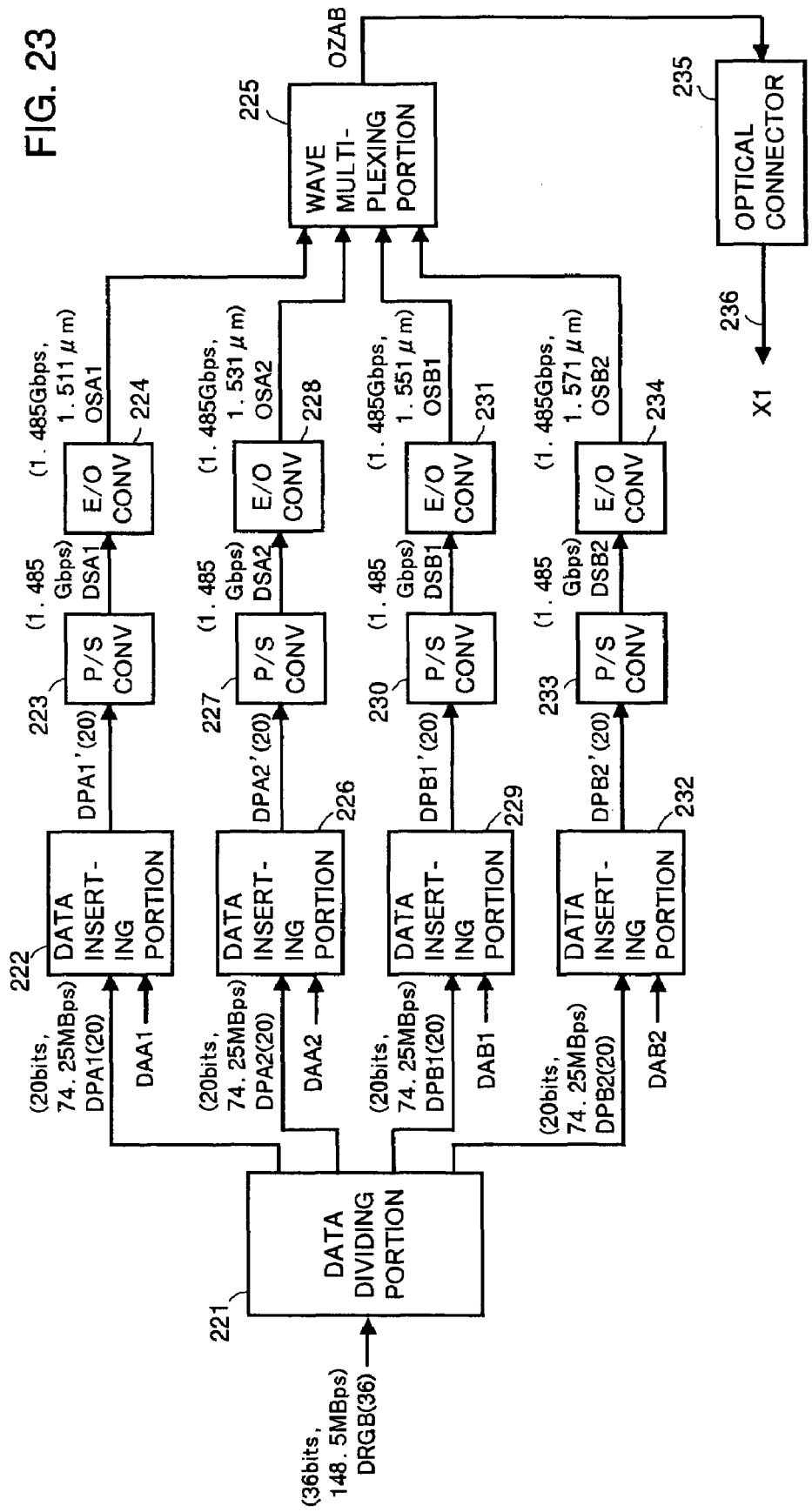
FIGS. 23 and 24 are schematic block diagrams showing a tenth example of a data transmitting and receiving apparatus including a first embodiment of apparatus for receiving digital data according to the ninth aspect of the present invention, in which a first embodiment of data time difference absorbing circuit according to the third aspect of the present invention is employed and a first embodiment of method of receiving digital data according to the sixth aspect of the present invention is carried out.
Figure 24:
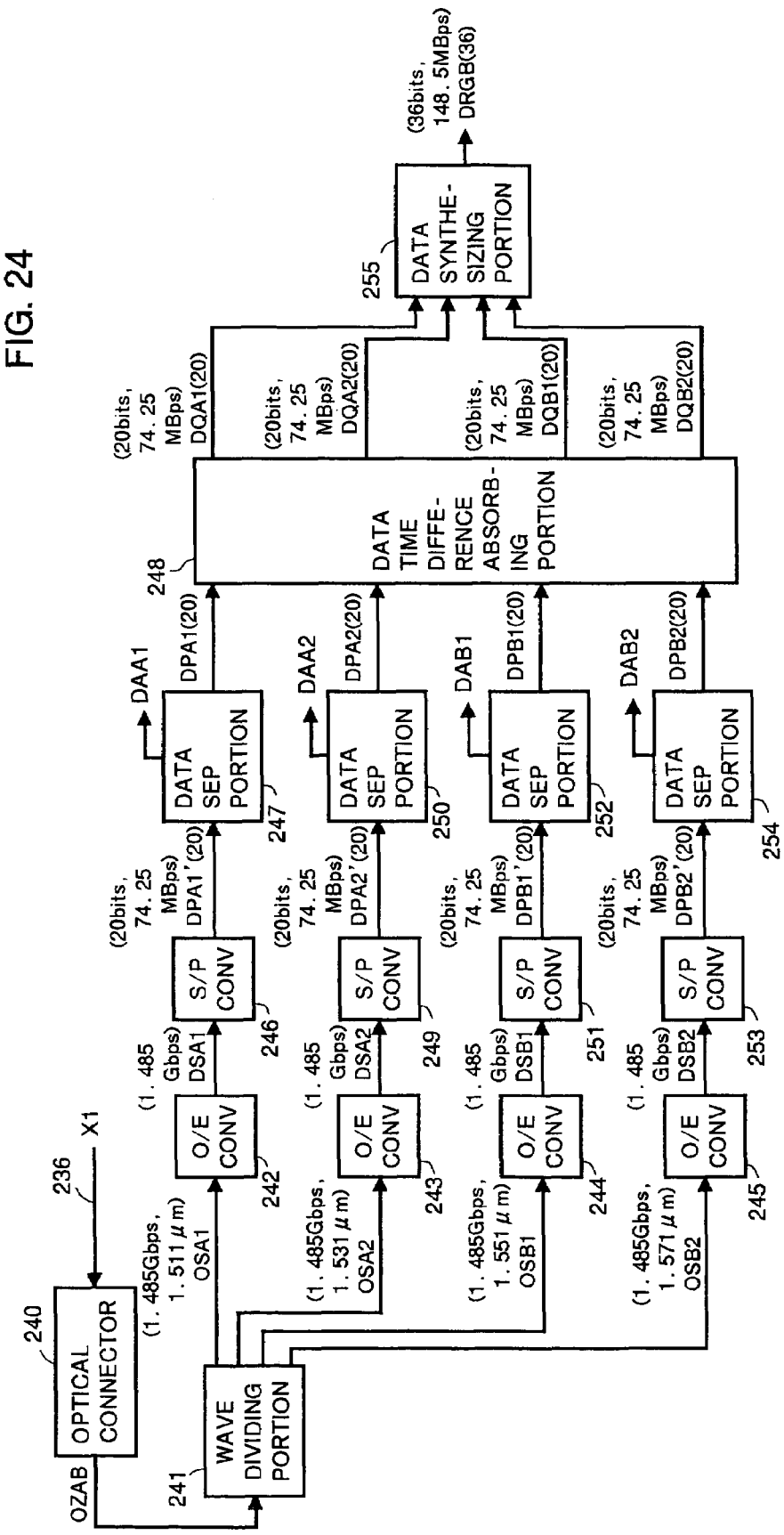

FIGS. 23 and 24 show a tenth example of a data transmitting and receiving apparatus which includes a first embodiment of apparatus for receiving digital data according to the ninth aspect of the present invention, in which a first embodiment of data time difference absorbing circuit according to the third aspect of the present invention is employed and a first embodiment of method of receiving digital data according to the sixth aspect of the present invention is carried out.

Referring to FIGS. 23 and 24, a digital video signal DRGB(36) is supplied to a data dividing portion 221 at a data transmitting side.

The digital video signal DRGB(36) is, for example, a progressive HD digital video signal produced in the form of G, B and R signals having a frame rate of 60 Hz and constituted with 36-bit word sequence data. The 36-bit word sequence data are composed of a series of 36b it words, each of which is formed by multiplexing a G data sequence GD (12), a B data sequence BD(12) and a R data sequence RD(12) with each other under a condition in which horizontal blanking period portions of the G data sequence GD (12), the B data sequence BD (12) and the R data sequence RD(12) are synchronized with one another.

Each of the G data sequence GD(12), the B data sequence BD(12) and the R data sequence RD(12) is constituted with 12-bit word sequence data to be transmitted at the word transmitting rate of, for exam ple, 148.5 MBps in accordance with the data formats as shown in FIGS. 2A, 2B and 2C, respectively.

In the horizontal blanking period portion of the digital video signal DRGB(36), four 36-bit words (3FF(G):3FF(B): 3FF(R), 000(G):000(B) 000(R), 000(G):000(B):000(R), XYZ(G):XYZ(B):XYZ(R)) are provided as time reference code data EAV and another four 36-bit words (3FF(G):3FF (B):3FF(R), 000(G):000(B):000(R), 000(G):000(B):000(R), XYZ(G):XYZ(B) :XYZ(R)) are provided as time reference code data SAV.

Figure 25:
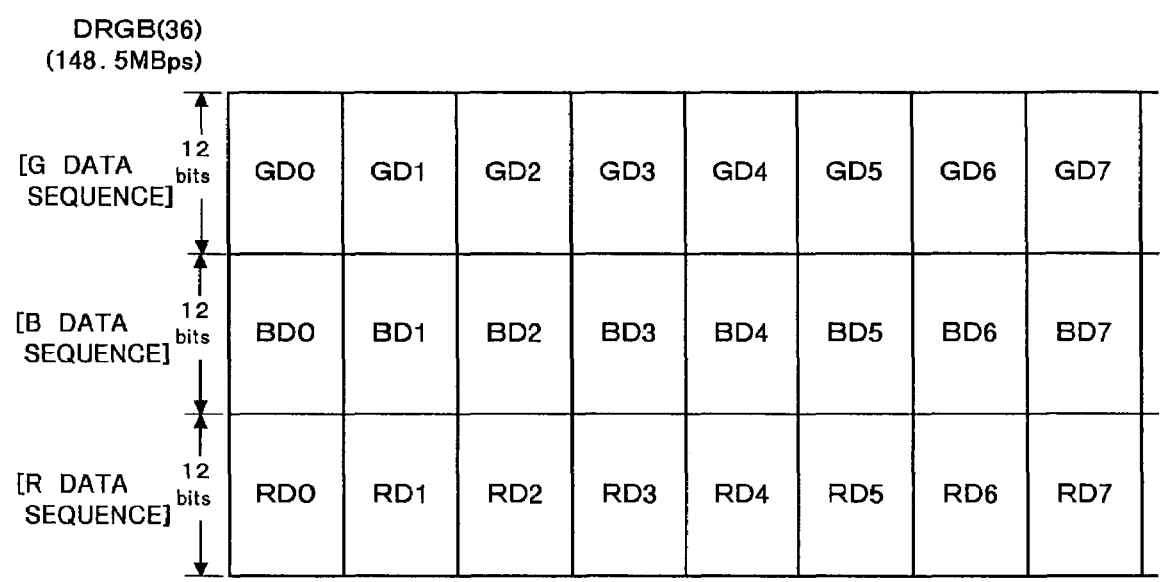

In the data dividing portion 221, the digital video signal DRGB(36) which is constituted with 36-bit word sequence data as shown in FIG. 25 are subjected to data dividing process.

In this data dividing process carried out in the data dividing portion 221, each of 12-bit word sequence GD0, GD1, GD2, GD3, . . . which constitutes the G data sequence, 12-bit word sequence BD0, BD1, BD2, BD3, . . . which constitutes the B data sequence, and 12-bit word sequence RD0, RD1, RD2, RD3, . . . which constitutes the R data sequence, is divided into first and second 12-bit word groups at every line period portion. Every other line period portion of each of the G data sequence, B data sequence and R data sequence divided to belong to the first 12-bit word group constitutes 36-bit word sequence data DRGB(36)A having the word transmission rate of 148.5 MBps/2=74.25 MBps as shown in FIG. 26A and another every other line period portion of each of the G data sequence, B data sequence and R data sequence divided to belong to the second 12-bit word group constitutes 36-bit word sequence data DRGB(36)B having the word transmission rate of 148.5 MBps/2=74.25 MBps as shown in FIG. 26B.

Next, the 36-bit word sequence data DRGB(36)A shown in FIG. 26A are subjected to bit dividing process in which each of the 12 bit word sequence GD0, GD1, GD2, GD3, which constitutes the G data sequence, the 12-bit word sequence BD0, BD1, BD2, BD3, . . . which constitutes the B data sequence, and the 12-bit word sequence RD0, RD1, RD2, RD3, . . . which constitutes the R data sequence is divided into upper ten bits G0:2 to G0:11, G1:2 to G1:11, G2:2 to G2:11, G3:2 to G3:11, . . . , B0:2 to B0:11, B1:2 to B1:11, B2:2 to B2:11, B3:2 to B3:11, . . . and R0:2 to R0:11, R1:2 to R1:11, R2:2 to R2:11, R3:2 to R3:11, . . . , and lower two bits G0:0 and G0:1, G1:0 and G1:1, G2:0 and G2:1, G3:0 and G3:1, . . . , B0:0 and B0:1, B1:0 and B1:1, B2:0 and B20:1, B3:0 and B30:1, . . . and R0:0 and R0:1, R1:0 and R1:1, R2:0 and R20:1, R3:0 and R30:1, . . . .

Then, the lower two bits G0:0 and G0:1, B0:0 and B0:1 and R0 and R0:1 are multiplexed to be six bits GBR0(0~1), the lower two bits G1:0 and G1:1, B1:0 and B1:1 and R1 and R1:1 are multiplexed to be six bits GBR1(0~1), the lower two bits G2:0 and G2:1, B2:0 and B2:1 and R2 and R2:1 are multiplexed to be six bits GBR2(0~1), the lower two bits G3:0 and G3:1, B3:0 and B3:1 and R3:0 and R3:1 are multiplexed to be six bits GBR3(0~1), . . . . Further, additional four bits γ0, γ1, γ2, γ3 . . . are added to the six bits GBR0(0~1), GBR1(0~1), GBR21(0~1), GBR3(0~1), . . . , respectively, to produce ten bits GBR0(0~1)+γ0, GBR1 (1~1)+γ1, GBR2(1~1)+γ2, GBR3(1~1)+γ3, . . . .

The upper ten bits G0:2 to G0:11, G1:2 to G1:11, G2:2 to G2:11, G3:2 to G3:11, . . . , B0:2 to B0:11, B1:2 to B1:11, B2:2 to B2:11, B3:2 to B3:11, . . . and R0:2 to R0:11, R1:2 to R1:11, R2:2 to R2:11, R3:2 to R3:11, . . . are separated to form first and second groups. Then, the ten bits GBR0(0~1)+ γ0, GBR1(1~1)+γ1, GBR2(1~1)+γ2, GBR3(1~1)+γ3, . . . are added to the second group. As a result, first and second 10-bit groups (10 BITS GROUP 1 and 10 BITS GROUP 2) partitioned by bold lines on a bit table shown in FIG. 27 are obtained. 20-bit word sequence data DRGB(20)A1 are produced based on the first 10-bit group shown in FIG. 27 to be transmitted at the word transmission rate of 72.25 MBps, as shown in FIG. 28A and another 20-bit word sequence data DRGB(20)A2 are produced based on the second 10-bit group shown in FIG. 27 to be transmitted at the word transmission rate of 72.25 MBps, as shown in FIG. 28B. This means that the 36-bit word sequence data DRGB(36)A having the word transmission rate of 74.25 MBps are converted to a couple of word sequence data including the 20-bit word sequence data DRGB(20)A1 having the word transmission rate of 74.25 MBps and the 20-bit word sequence data DRGB(20)A2 having the word transmission rate of 74.25 MBps.

Similarly, the 36-bit word sequence data DRGB(36)B shown in FIG. 26B are subjected to bit dividing process in which each of the 12-bit word sequence GD0, GD1, GD2, GD3, . . . which constitutes the G data sequence, the 12-bit word sequence BD0, BD1, BD2, BD3, . . . which constitutes the B data sequence, and the 12-bit word sequence RD0, RD1, RD2, RD3, . . . which constitutes the R data sequence is divided into upper ten bits G0:2 to G0:11, G1:2 to G1:11, G2:2 to G2:11, G3:2 to G3:11, . . . , B0:2 to B0:11, B1:2 to B1:11, B2:2 to B2:11, B3:2 to B3:11, . . . and R0:2 to R0:11, R1:2 to R1:11, R2:2 to R2:11, R3:2 to R3:11, . . . , and lower two bits G0:0 and G0:1, G1:0 and G1:1, G2:0 and G2:1, G3:0 and G3:1, . . . , B0:0 and B0:1, B1:0 and B1:1, B2:0 and B20:1, B3:0 and B30:1, . . . and R0:0 and R0:1, R1:0 and R1:1, R2:0 and R20:1, R3:0 and R30:1, . . . .

Then, the lower two bits G0:0 and G0:1, B0:0 and B0:1 and R0 and R0:1 are multiplexed to be six bits GBR0(0~1), the lower two bits G1:0 and G1:1, B1:0 and B1:1 and R1 and R1:1 are multiplexed to be six bits GBR1(0~1), the lower two bits G2:0 and G2:1, B2:0 and B2:1 and R2 and R2:1 are multiplexed to be six bits GBR2(0~1), the lower two bits G3:0 and G3:1, B3:0 and B3:1 and R3:0 and R3:1 are multiplexed to be six bits GBR3(0~1), . . . . Further, additional four bits γ0, γ1, γ2, γ3 . . . are added to the six bits GBR0(0~1), GBR1(0~1), GBR21(0~1), GBR3(0~1), . . . , respectively, to produce ten bits GBR0(0~1)+γ0, GBR1 (1~1)+γ1, GBR2(1~1)+γ2, GBR3(1~1)+γ3, . . . .

The upper ten bits G0:2 to G0:11, G1:2 to G1:11, G2:2 to G2:11, G3:2 to G3:11, . . . , B0:2 to B0:11, B1:2 to B1:11, B2:2 to B2:11, B3:2 to B3:11, . . . and R0:2 to R0:11, R1:2 to R1:11, R2:2 to R2:11, R3:2 to R3:11, . . . are separated to form first and second groups. Then, the ten bits GBR0(0~1)+ γ0, GBR1(1~1)+γ1, GBR2(1~1)+γ2, GBR3(1~1)+γ3, . . . are added to the second group. As a result, first and second 10-bit groups (10 BITS GROUP 1 and 10 BITS GROUP 2) partitioned by bold lines on a bit table shown in FIG. 27 are obtained.

20-bit word sequence data DRGB(20)B1 are produced based on the first 10-bit group shown in FIG. 27 to be transmitted at the word transmission rate of 72.25 MBps, as shown in FIG. 29A and another 20-bit word sequence data DRGB(20)B2 are produced based on the second 10-bit group shown in FIG. 27 to be transmitted at the word transmission rate of 72.25 MBps, as shown in FIG. 29B. This means that the 36-bit word sequence data DRGB(36)B having the word transmission rate of 74.25 MBps are converted to a couple of word sequence data including the 20-bit word sequence data DRGB(20)B1 having the word transmission rate of 74.25 MBps and the 20-bit word sequence data DRGB(20)B2 having the word transmission rate of 74.25 MBps.

As described above, the 36-bit word sequence data DRGB (36) having the word transmission rate of 148.5 MBps is converted to four word sequence data including the 20-bit word sequence data DRGB(20)A1, DRGB(20)A2, DRGB (20)B1 and DRGB(20)B2 each having the word transmission rate of 74.25 MBps in the data dividing portion 221.

The 20-bit word sequence data DRGB(20)A1, DRGB(20) A2, DRGB(20)B1 and DRGB(20)B2 thus obtained are derived from the data dividing portion 221 as a group of 20-bit word sequence data DPA1(20), DPA2(20), DPB1(20) and DPB1(20).

The 20-bit word sequence data DPA1(20) is supplied to a data inserting portion 222. In the data inserting portion 222, ancillary data DAA1 which are, for example, audio data at need or the like are inserted into 20-bit word sequence data DPA1(20) to produce 20-bit word sequence data DPA1' (20) containing the ancillary data DAA1. The 20-bit word sequence data DPA1' (20) obtained from the data inserting portion 222 are supplied to a P/S convertor 223.

The P/S convertor 223 is operative to cause the 20-bit word sequence data DPA1' (20) to be subjected to P/S conversion to produce serial data DSA1. The serial data DSA1 is formed based on the 20-bit word sequence data DPA1' (20) to be transmitted at the bit transmission rate of 74.25×20=1.485 Gbps and supplied to an E/O convertor 224. The E/O convertor 224 is operative to cause the serial data DSA1 to be subjected to E/O conversion to produce optical signal OSA1 having the central wavelength of, for example, about 1.511 μm. The optical signal OSA1 is formed based on the serial data DSA1 to be transmitted at the bit transmission rate of 1.485 Gbps and supplied to a wave multiplexing portion 225.

The 20-bit word sequence data DPA2(20) is supplied to a data inserting portion 226. In the data inserting portion 226, ancillary data DAA2 which are, for example, audio data at need or the like are inserted into 20-bit word sequence data DPA2(20) to produce 20-bit word sequence data DPA2' (20) containing the ancillary data DAA2. The 20-bit word sequence data DPA2' (20) obtained from the data inserting portion 226 are supplied to a P/S convertor 227.

The P/S convertor 227 is operative to cause the 20-bit word sequence data DPA2' (20) to be subjected to P/S conversion to produce serial data DSA2. The serial data DSA2 is formed based on the 20-bit word sequence data DPA2' (20) to be transmitted at the bit transmission rate of 74.25×20=1.485 Gbps and supplied to an E/O convertor 228. The E/O convertor 228 is operative to cause the serial data DSA2 to be subjected to E/O conversion to produce optical signal OSA2 having the central wavelength of, for example, about 1.531 μm. The optical signal OSA2 is formed based on the serial data DSA2 to be transmitted at the bit transmission rate of 1.485 Gbps and supplied to the multiplexing portion 225.

The 20-bit word sequence data DPB1(20) is supplied to a data inserting portion 229. In the data inserting portion 229, ancillary data DAB1 which are, for example, audio data at need or the like are inserted into 20-bit word sequence data DPB120) to produce 20-bit word sequence data DPB1' (20) containing the ancillary data DAB1. The 20-bit word sequence data DPB1' (20) obtained from the data inserting portion 229 are supplied to a P/S convertor 230.

The P/S convertor 230 is operative to cause the 20-bit word sequence data DPB1' (20) to be subjected to P/S conversion to produce serial data DSB1. The serial data DSB1 is formed based on the 20-bit word sequence data DPB1' (20) to be transmitted at the bit transmission rate of 74.25×20=1.485 Gbps and supplied to an E/O convertor 231. The E/O convertor 231 is operative to cause the serial data DSB1 to be subjected to E/O conversion to produce optical signal OSB1 having the central wavelength of, for example, about 1.551 μm. The optical signal OSB1 is formed based on the serial data DSBL to be transmitted at the bit transmission rate of 1.485 Gbps and supplied to the multiplexing portion 225.

Further, the 20-bit word sequence data DPB2(20) is supplied to a data inserting portion 232. In the data inserting portion 232, ancillary data DAB2 which are, for example, audio data at need or the like are inserted into 20-bit word sequence data DPB2(20) to produce 20-bit word sequence data DPB2' (20) containing the ancillary data DAB2. The 20-bit word sequence data DPB2' (20) obtained from the data inserting portion 232 are supplied to a P/S convertor 233.

The P/S convertor 233 is operative to cause the 20-bit word sequence data DPB2' (20) to be subjected to P/S conversion to produce serial data DSB2. The serial data DSB2 is formed based on the 20-bit word sequence data DPB2' (20) to be transmitted at the bit transmission rate of 74.25×20=1.485 Gbps and supplied to an E/O convertor 234. The E/O convertor 234 is operative to cause the serial data DSB2 to be subjected to E/O conversion to produce optical signal OSB2 having the central wavelength of, for example, about 1.571 μm. The optical signal OSB2 is formed based on the serial data DSB2 to be transmitted at the bit transmission rate of 1.485 Gbps and supplied to the multiplexing portion 225.

In the wave multiplexing portion 225 to which the optical signal OSA1 from the E/O convertor 224, the optical signal OSA2 from the E/O convertor 228, the optical signal OSB1 from the E/O convertor 231 and the optical signal OSB2 from the E/O convertor 234 are supplied, the optical signal OSA1 having the central wavelength of about 1.511 μ/m, the optical signal OSA2 having the central wavelength of about 1.531 µm, the optical signal OSB1 having the central wavelength of about 1.531 µm and the optical signal OSB2 having the central wavelength of about 1.571 µm are multiplexed with one another to produce a multiplexed optical signal OZAB. The multiplexed optical signal OZAB is derived from the wave multiplexing portion 225 as a transmission signal.

The optical signals OSA1, OSA2, OSB1 and OSB2 have the respective central wavelengths so close to one another as to be different only by about 0.02 µm (20 nm) for producing the multiplexed optical signal OZAB. Therefore, the wave multiplexing technology called Coarse Wavelength Division Multiplexing (CWDM) is applied to a portion including the E/O convertors 224, 228, 231 and 234 and the wave multiplexing portion 225.

The multiplexed optical signal OZAB which is the transmission signal derived from the wave multiplexing portion 225 is guided through an optical connector 235 to an optical fiber data transmission line 236 to be transmitted thereby to a receiving side. The optical fiber data transmission line 236 is made of, for example, fused quartz SMF.

The multiplexed optical signal OZAB transmitted through the optical fiber data transmission line 236 is received by the first embodiment of apparatus for receiving digital data according to the ninth aspect of the present invention, in which the first embodiment of data time difference absorbing circuit according to the third aspect of the present invention is employed and the first embodiment of method of receiving digital data according to the sixth aspect of the present invention is carried out.

In the first embodiment of apparatus for receiving digital data according to the ninth aspect of the present invention, the multiplexed optical signal OZAB transmitted through the optical fiber data transmission line 236 is guided through an optical connector 240 to a wave dividing portion 241. The optical connector 240 and the wave dividing portion 241 constitute a data receiving portion for receiving the multiplexed optical signal OZAB transmitted through the optical fiber data transmission line 236.

In the wave dividing portion 241, the multiplexed optical signal OZAB is divided into a first optical element having the central wavelength of about 1.511 µm, a second optical element having the central wavelength of about 1.531 µm, a third optical element having the central wavelength of about 1.551 µm and a fourth optical element having the central wavelength of about 1.571 µm to reproduce the optical signal OSA1 which has the central wavelength of about 1.511 µm and the bit transmission rate of 1.485 Gbps, the optical signal OSA2 which has the central wavelength of about 1.531 µm and the bit transmission rate of 1.485 Gbps, the optical signal OSB1 which has the central wavelength of about 1.551 µm and the bit transmission rate of 1.485 Gbps, and the optical signal OSB2 which has the central wavelength of about 1.571 µm and the bit transmission rate of 1.485 Gbps.

The optical signal OSA1 having the central wavelength of about 1.511 µm, the optical signal OSA2 having the central wavelength of about 1.531 µm, the optical signal OSB1 having the central wavelength of about 1.5531 µm and the optical signal OSB2 having the central wave length of about 1.571 µm reproduced by the wave dividing portion 241 are supplied to O/E convertors 242, 243, 244 and 245, respectively.

The O/E convertor 242 is operative to cause the optical signal OSA1 to be subjected to O/E conversion to reproduce the serial data DSA1. The serial data DSA1 is reproduced based on the optical signal OSA1 having the central wavelength of about 1.511 µm and the bit transmission rate of 1.485 Gbps to be transmitted at the bit transmission rate of 1.485 Gbps. The serial data DSA1 thus reproduced are supplied to an S/P convertor 246. The S/P convertor 246 is operative to cause the serial data DSA1 to be subjected to S/P conversion to reproduce the 20-bit word sequence data DPA1' (20). The 20-bit word sequence data DPA1' (20) are reproduced based on the serial data DSA1 to be transmitted at the word transmission rate of 74.25 MBps and supplied to a data separating portion 247. In the data separating portion 247, the ancillary data DAA1 are separated from the 20-bit word sequence data DPA1' (20) so that the 20-bit word sequence data DPA1(20) and the ancillary data DAA1 are separately obtained. The 20-bit word sequence data DPA1 (20) are supplied to a data time difference absorbing portion 248.

The O/E convertor 243 is operative to cause the optical signal OSA2 to be subjected to O/E conversion to reproduce the serial data DSA2. The serial data DSA2 is reproduced based on the optical signal OSA2 having the central wavelength of about 1.531 µm and the bit transmission rate of 1.485 Gbps to be transmitted at the bit transmission rate of 1.485 Gbps. The serial data DSA2 thus reproduced are supplied to an S/P convertor 249. The S/P convertor 249 is operative to cause the serial data DSA2 to be subjected to S/P conversion to reproduce the 20-bit word sequence data DPA2' (20). The 20-bit word sequence data DPA2' (20) are reproduced based on the serial data DSA2 to be transmitted at the word transmission rate of 74.25 MBps and supplied to a data separating portion 250. In the data separating portion 250, the ancillary data DAA2 are separated from the 20-bit word sequence data DPA2' (20) so that the 20-bit word sequence data DPA2(20) and the ancillary data DAA2 are separately obtained. The 20-bit word sequence data DPA2 (20) are supplied to the data time difference absorbing portion 248.

The O/E convertor 244 is operative to cause the optical signal OSB1 to be subjected to O/E conversion to reproduce the serial data DSB1. The serial data DSBL is reproduced based on the optical signal OSB1 having the central wavelength of about 1.531 µm and the bit transmission rate of 1.485 Gbps to be transmitted at the bit transmission rate of 1.485 Gbps. The serial data DSB1 thus reproduced are supplied to an S/P convertor 251. The S/P convertor 251 is operative to cause the serial data DSB1 to be subjected to S/P conversion to reproduce the 20-bit word sequence data DPB1' (20). The 20-bit word sequence data DPB1' (20) are reproduced based on the serial data DSB1 to be transmitted at the word transmission rate of 74.25 MBps and supplied to a data separating portion 252. In the data separating portion 252 the ancillary data DAB1 are separated from the 20-bit word sequence data DPB1' (20) so that the 20-bit word sequence data DPB1(20) and the ancillary data DAB1 are separately obtained. The 20-bit word sequence data DPB1 (20) are supplied to the data time difference absorbing portion 248.

The O/E convertor 245 is operative to cause the optical signal OSB2 to be subjected to O/E conversion to reproduce the serial data DSB2. The serial data DSB2 is reproduced based on the optical signal OSB2 having the central wavelength of about 1.571 µm and the bit transmission rate of 1.485 Gbps to be transmitted at the bit transmission rate of 1.485 Gbps. The serial data DSB2 thus reproduced are supplied to an S/P convertor 253. The S/P convertor 253 is operative to cause the serial data DSB2 to be subjected to S/P conversion to reproduce the 20-bit word sequence data DPB2' (20). The 20-bit word sequence data DPB2' (20) are reproduced based on the serial data DSB2 to be transmitted at the word transmission rate of 74.25 MBps and supplied to a data separating portion 254. In the data separating portion 254 the ancillary data DAB2 are separated from the 20-bit word sequence data DPB2' (20) so that the 20-bit word sequence data DPB2(20) and the ancillary data DAB2 are separately obtained. The 20-bit word sequence data DPB2 (20) are supplied to the data time difference absorbing portion 248.

The data time difference absorbing portion 248 is formed with the first embodiment of data time difference absorbing portion circuit according to the third aspect of the present invention.

In the data time difference absorbing portion 248, time difference between each two of the 20-bit word sequence data DPA1(20) from the data separating portion 247, the 20-bit word sequence data DPA2(20) from the data separating portion 250, the 20-bit word sequence data DPB1(20) from the data separating portion 252 and the 20-bit word sequence data DPB2(20) from the data separating portion 254 is absorbed to produce 20-bit word sequence data DQA1 (20) which are obtained based on the 20-bit word sequence data DPA1 (20) to be transmitted at the word transmission rate of 74.25 MBps, 20-bit word sequence data DQA2(20) which are obtained based on the 20-bit word sequence data DPA2(20) to be transmitted at the word transmission rate of 74.25 MBps, 20-bit word sequence data DQB1(20) which are obtained based on the 20-bit word sequence data DPB1(20) to be transmitted at the word transmission rate of 74.25 MBps, and 20-bit word sequence data DQB2(20) which are obtained based on the 20-bit word sequence data DPB2(20) to be transmitted at the word transmission rate of 74.25 MBps in such a manner that time difference between each two of the 20-bit word sequence data DQA1(20), the 20-bit word sequence data DQA2(20), the 20-bit word sequence data DQB1(20) and the 20-bit word sequence data DQB2(20) is substantially zero.

Figure 30:
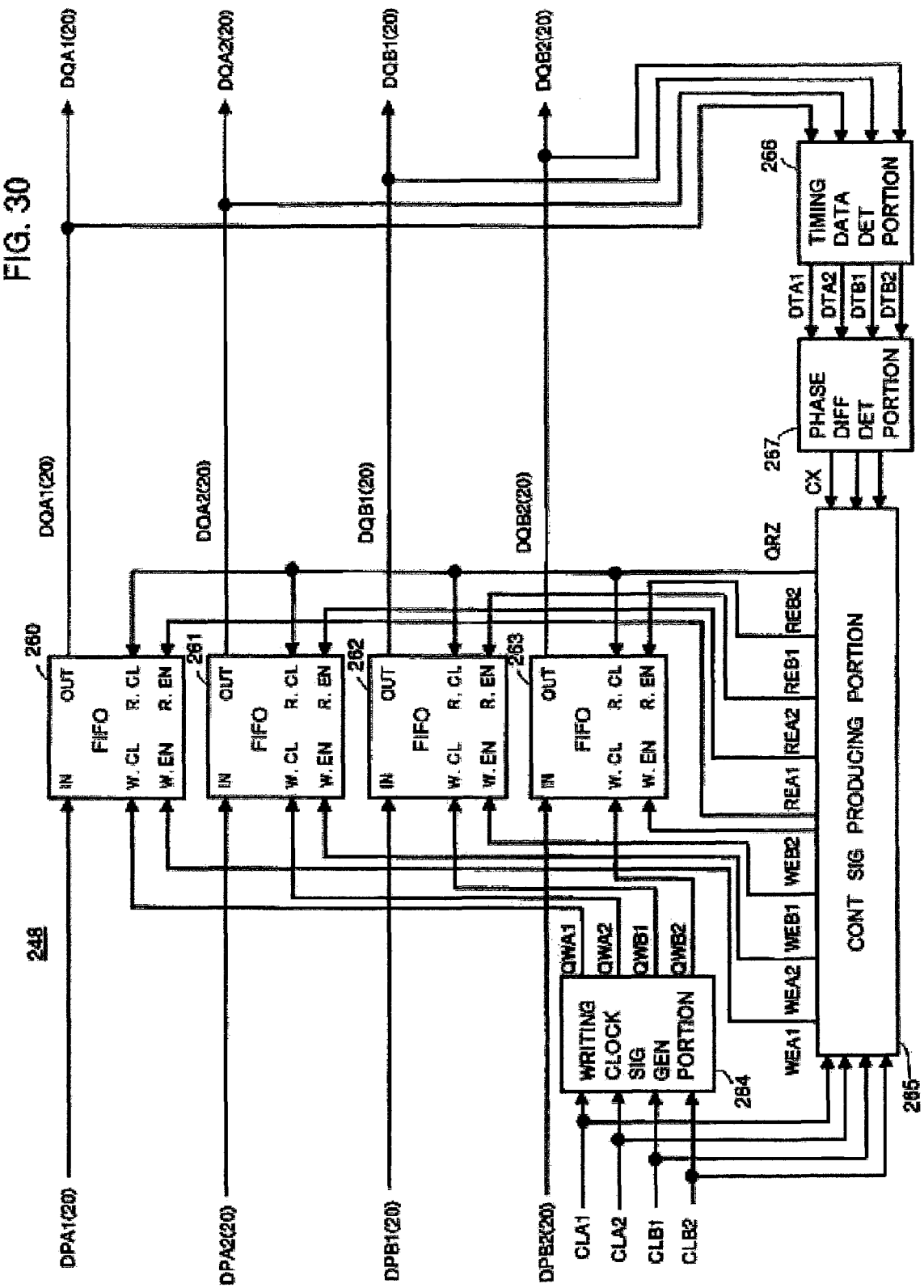
FIG. 30 is a schematic block diagram showing an embodied structure of a data time difference absorbing portion provided in the tenth example shown in FIGS. 23 and 24.

FIG. 30 shows an embodied structure of the data time difference absorbing portion 248. In the embodied structure shown in FIG. 30, the 20-bit word sequence data DPA1(20) obtained from the data separating portion 247 are supplied to an input terminal (IN) of an FIFO memory 260, the 20-bit word sequence data DPA2(20) obtained from the data separating portion 250 are supplied to an input terminal (IN) of an FIFO memory 261, the 20-bit word sequence data DPB1 (20) obtained from the data separating portion 252 are supplied to an input terminal (IN) of an FIFO memory 262, and the 20-bit word sequence data DPB2(20) obtained from the data separating portion 254 are supplied to an input terminal (IN) of an FIFO memory 263.

A clock pulse signal CLA1 for the 20-bit word sequence data DPA1' (20) which is, for example, reproduced in the S/P convertor 246 to have the frequency of 74.25 MHz, a clock pulse signal CLA2 for the 20-bit word sequence data DPA2' (20) which is, for example, reproduced in the S/P convertor 249 to have the frequency of 74.25 MHz, a clock pulse signal CLB1 for the 20-bit word sequence data DPB1' (20) which is, for example, reproduced in the S/P convertor 251 to have the frequency of 74.25 MHz, and a clock pulse signal CLB2 for the 20-bit word sequence data DPB2' (20) which is, for example, reproduced in the S/P convertor 253 to have the frequency of 74.25 MHz, are supplied to a writing clock signal generating portion 264 and a control signal producing portion 265.

In the writing clock signal generating portion 264, a writing clock signal QWA1 is produced based on the clock pulse signal CLA1 to have the frequency of 74.25 MHz, a writing clock signal QWA2 is produced based on the clock pulse signal CLA2 to have the frequency of 74.25 MHz, a writing clock signal QWB1 is produced based on the clock pulse signal CLB1 to have the frequency of 74.25 MHz and a writing clock signal QWB2 is produced based on the clock pulse signal CLB2 to have the frequency of 74.25 MHz. The writing clock signal QWA1 is supplied to a writing clock terminal (W.CL) of the FIFO memory 260, the writing clock signal QWA2 is supplied to a writing clock terminal (W.CL) of the FIFO memory 261, the writing clock signal QWB1 is supplied to a writing clock terminal (W.CL) of the FIFO memory 262 and the writing clock signal QWB2 is supplied to a writing clock terminal (W.CL) of the FIFO memory 263.

In the control signal producing portion 265, a writing enable signal WEA1 is produced based on the clock pulse signal CLA1, a writing enable signal WEA2 is produced based on the clock pulse signal CLA2, a writing enable signal WEB1 is produced based on the clock pulse signal CLB1 and a writing enable signal WEB2 is produced based on the clock pulse signal CLB2. The writing enable signal WEA1 is supplied to a writing enable terminal (W.EN) of the FIFO memory 260, the writing enable signal WEA2 is supplied to a writing enable terminal (W.EN) of the FIFO memory 261, the writing enable signal WEB1 is supplied to a writing enable terminal (W.EN) of the FIFO memory 262 and the writing enable signal WEB2 is supplied to a writing enable terminal (W.EN) of the FIFO memory 263.

In the FIFO memory 260, under a condition in which the writing enable signal WEA1 functions effectively, the 20-bit word sequence data DPA1(20) having the word transmission rate of 74.25 MBps are written to be stored at every predetermined data amount in accordance with the writing clock signal QWA1. In the FIFO memory 261, under a condition in which the writing enable signal WEA2 functions effectively, the 20-bit word sequence data DPA2(20) having the word transmission rate of 74.25 MBps are written to be stored at every predetermined data amount in accordance with the writing clock signal QWA2. In the FIFO memory 262, under a condition in which the writing enable signal WEB1 functions effectively, the 20-bit word sequence data DPB1(20) having the word transmission rate of 74.25 MBps are written to be stored at every predetermined data amount in accordance with the writing clock signal QWB1. In the FIFO memory 263, under a condition in which the writing enable signal WEB2 functions effectively, the 20-bit word sequence data DPB2(20) having the word transmission rate of 74.25 MBps are written to be stored at every predetermined data amount in accordance with the writing clock signal QWB2.

Further, in the control signal producing portion 265, a reading clock signal QRZ is also produced based on the clock pulse signal CLA1, CLA2, CLB1 or CLB2 to be supplied to a reading clock terminal (R.CL) of the FIFO memory 260, a reading clock terminal (R.CL) of the FIFO memory 261, a reading clock terminal (R.CL) of the FIFO memory 262 and a reading clock terminal (R.CL) of the FIFO memory 263 to be common to the FIFO memories 260, 261, 262 and 263 and reading enable signals REA1, REA2, REB1 and REB2 are produced to be supplied to a reading enable terminal (R. EN) of the FIFO memory 260, a reading enable terminal (R.EN) of the FIFO memory 261, a reading enable terminal (R.EN) of the FIFO memory 262 and a reading enable terminal (R.EN) of the FIFO memory 263, respectively.

Thereby, under a condition in which the reading enable signal REA1 acts effectively on the FIFO memory 260, the 20-bit word sequence data DPA1(20) stored in the FIFO memory 260 are read from an output terminal (OUT) of the FIFO memory 260 at every predetermined data amount to be transmitted at the word transmission rate of 74.25 MBps in accordance with the reading clock signal QRZ. The 20-bit word sequence data DPA1 (20) thus read out are derived from the FIFO memory 260 as the 20-bit word sequence data DQA1(20) having the word transmission rate of 74.25 MBps.

Under a condition in which the reading enable signal REA2 acts effectively on the FIFO memory 261, the 20-bit word sequence data DPA2(20) stored in the FIFO memory 261 are read from an output terminal (OUT) of the FIFO memory 261 at every predetermined data amount to be transmitted at the word transmission rate of 74.25 MBps in accordance with the reading clock signal QRZ. The 20-bit word sequence data DPA2(20) thus read out are derived from the FIFO memory 261 as the 20-bit word sequence data DQA2(20) having the word transmission rate of 74.25 MBps.

Under a condition in which the reading enable signal REB1 acts effectively on the FIFO memory 262, the 20-bit word sequence data DPB1(20) stored in the FIFO memory 262 are read from an output terminal (OUT) of the FIFO memory 262 at every predetermined data amount to be transmitted at the word transmission rate of 74.25 MBps in accordance with the reading clock signal QRZ. The 20-bit word sequence data DPB1(20) thus read out are derived from the FIFO memory 262 as the 20-bit word sequence data DQB1(20) having the word transmission rate of 74.25 MBps.

Further, under a condition in which the reading enable signal REB2 acts effectively on the FIFO memory 263, the 20-bit word sequence data DPB2(20) stored in the FIFO memory 263 are read from an output terminal (OUT) of the FIFO memory 263 at every predetermined data amount to be transmitted at the word transmission rate of 74.25 MBps in accordance with the reading clock signal QRZ. The 20-bit word sequence data DPB2(20) thus read out are derived from the FIFO memory 263 as the 20-bit word sequence data DQB2(20) having the word transmission rate of 74.25 MBps.

The 20-bit word sequence data DQA1 (20) derived from the FIFO memory 260, the 20-bit word sequence data DQA2(20) derived from the FIFO memory 261, the 20-bit word sequence data DQB1(20) derived from the FIFO memory 262 and the 20-bit word sequence data DQB2(20) derived from the FIFO memory 263 are supplied to a timing data detecting portion 266. In the timing data detecting portion 266, the time reference code data EAV contained in the 20-bit word sequence data DQA1(20) are detected to produce a timing detection output signal DTA1 in response to the detected time reference code data EAV, the time reference code data EAV contained in the 20-bit word sequence data DQA2(20) are detected to produce a timing detection output signal DTA2 in response to the detected time reference code data EAV, the time reference code data EAV contained in the 20-bit word sequence data DQB1(20) are detected to produce a timing detection output signal DTB1 in response to the detected time reference code data EAV and the time reference code data EAV contained in the 20-bit word sequence data DQB2(20) are detected to produce a timing detection output signal DTB2 in response to the detected time reference code data EAV.

The timing detection output signal DTA1 is obtained, for example, just after the time reference code data EAV in the 20-bit word sequence data DQA1(20) as shown in FIG. 31A, the timing detection output signal DTA2 is obtained, for example, just after the time reference code data EAV in the 20-bit word sequence data DQA2(20) as shown in FIG. 31B, the timing detection output signal DTB1 is obtained, for example, just after the time reference code data EAV in the 20-bit word sequence data DQB1(20) as shown in FIG. 31C, and the timing detection output signal DTB2 is obtained, for example, just after the time reference code data EAV in the 20-bit word sequence data DQB2(20) as shown in FIG. 31D.

These timing detection output signals DTA1, DTA2, DTB1 and DTB2 thus obtained represent a relation of timing between each two of the time reference code data EAV in the 20-bit word sequence data DQA1(20), the time reference code data EAV in the 20-bit word sequence data DQA2(20), the time reference code data EAV in the 20 bit word sequence data DOB1(20) and the time reference code data EAV in the 20-bit word sequence data DQB2(20), that is, a relation of timing between each two of the 20-bit word sequence data DQA1(20), the 20-bit word sequence data DQA2(20), the 20-bit word sequence data DQB1(20) and the 20-bit word sequence data DQB2(20).

The timing detection output signals DTA1, DTA2, DTB1 and DTB2 obtained from the timing data detecting portion 266 are supplied to a phase difference detecting portion 267. In the phase difference detecting portion 267, a phase difference between each two of the timing detection output signals DTA1, DTA2, DTB1 and DTB2 is detected to produce phase difference detection output signals CX in response to the detected phase differences.

The phase difference detection output signals CX obtained from the phase difference detecting portion 267 are supplied to the control signal producing portion 265. The control signal producing portion 265 is operative to cause at least one of the reading enable signals REA1, REA2, REB1 and REB2 to vary in response to the phase difference detection output signals CX so as to control at least one of a timing at which the 20-bit word sequence data DPA1(20) are read from the FIFO memory 260, a timing at which the 20-bit word sequence data DPA2(20) are read from the FIFO memory 261, a timing at which the 20-bit word sequence data DPB1(20) are read from the FIFO memory 262 and a timing at which the 20-bit word sequence data DPB2(20) are read from the FIFO memory 263. Such a control of the timing for reading is conducted to keep a condition in which the phase difference between each two of the timing detection output signals DTA1, DTA2, DTB1 and DTB2 detected by the phase difference detecting portion 267 is substantially zero. Consequently, the 20-bit word sequence data DQA1 (20) derived from the FIFO memory 260, the 20-bit word sequence data DQA2(20) derived from the FIFO memory 261, the 20-bit word sequence data DQB1(20) derived from the FIFO memory 262 and the 20 bit word sequence data DQB2(20) derived from the FIFO memory 263 are so processed that the time difference between each two of the 20-bit word sequence data DQA1(20), the 20-bit word sequence data DQA2(20), the 20-bit word sequence data DPB1(20) and the 20-bit word sequence data DPB2(20) is substantially absorbed.

The 20-bit word sequence data DQA1(20), DQA2(20), DQB1(20) and DQB2(20) obtained from the data time difference absorbing portion 248 are supplied to a data synthesizing portion 255. In the data synthesizing portion 255, the 20-bit word sequence data DQA1(20), DQA2(20), DQB1(20) and DQB2(20) are subjected to data synthesizing process, which is proceeded inversely to the data dividing process to which the 36-bit word sequence data constituting the digital video signal DRGB(36) are subjected in the data dividing portion 221, to reproduce the digital video signal DRGB(36).

Incidentally, it is possible to use an ordinary address controlled memory in place of each of the FIFO memories 260, 261, 262 and 263 in the data time difference absorbing portion 248.

Figure 32:
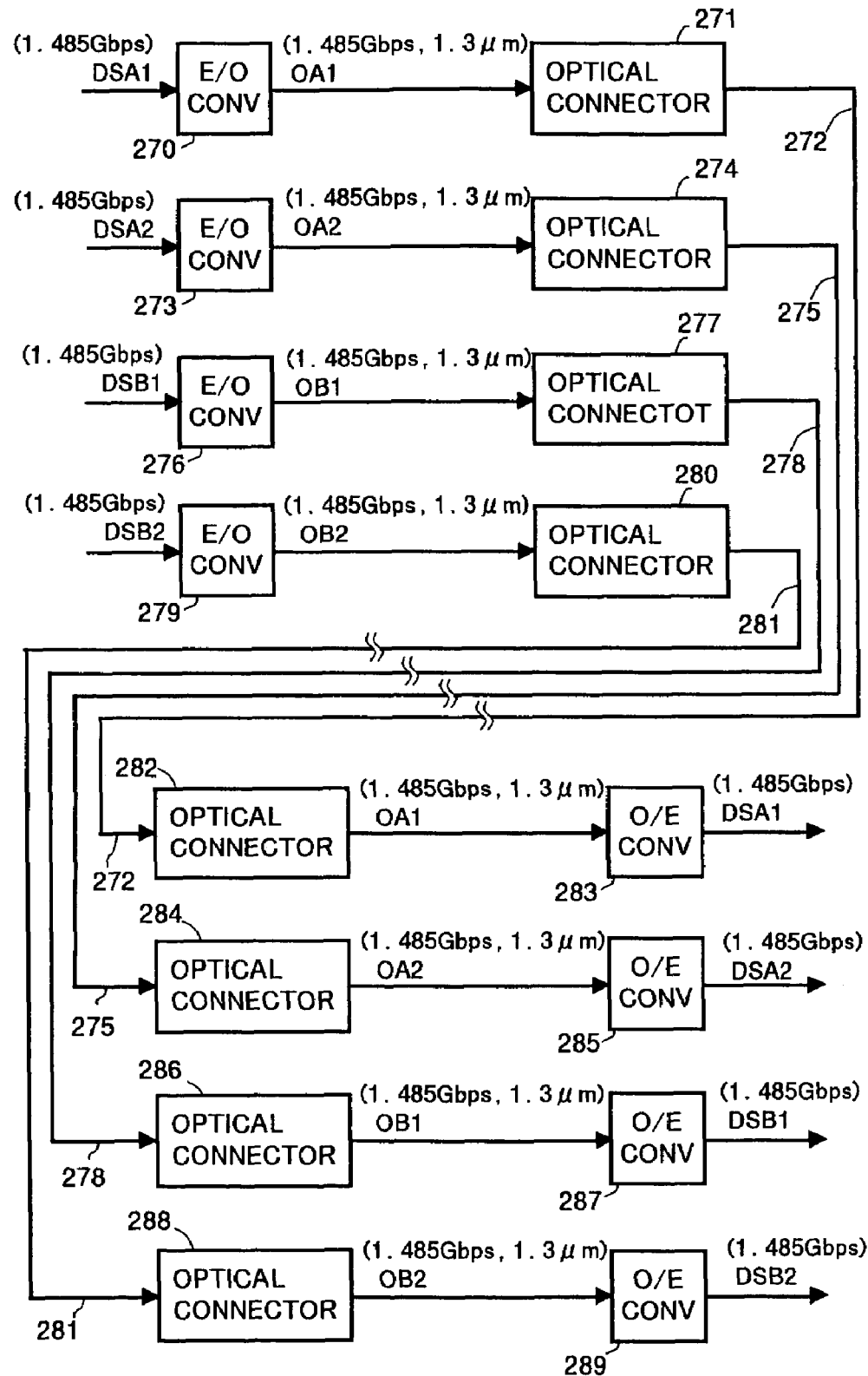
FIG. 32 is a schematic block diagram showing a part of a eleventh example of a data transmitting and receiving apparatus including a second embodiment of apparatus for receiving digital data according to the ninth aspect of the present invention, in which a second embodiment of data time difference absorbing circuit according to the third aspect of the present invention is employed and a second embodiment of method of receiving digital data according to the sixth aspect of the present invention is carried out.

FIG. 32 shows a part of a eleventh example of a data transmitting and receiving apparatus including a second embodiment of apparatus for receiving digital data according to the ninth aspect of the present invention, in which a second embodiment of data time difference absorbing circuit according to the third aspect of the present invention is employed and a second embodiment of method of receiving digital data according to the sixth aspect of the present invention is carried out.

The eleventh example, a part of which is shown in FIG. 32, has a number of blocks constituted in the same manner as those in the tenth example shown in FIGS. 23 and 24 and blocks in the eighth example which are constituted to be different from those in the tenth example are shown in FIG. 32.

Referring to FIG. 32, the wave multiplexing portion 225 and the wave dividing portion 241 employed in the tenth example shown in FIGS. 23 and 24 are not provided, and E/O convertors 270, 273, 276 and 279 and O/E convertors 283, 285, 287 and 289 are provided in place of the E/O convertors 224, 228, 231 and 234 and the O/E convertors 242, 243, 244 and 245 employed in the tenth example shown in FIGS. 23 and 24.

In the eleventh example, a part of which is shown in FIG. 32, serial data DSA1 having the bit transmission rate of 1.485 Gbps is supplied to the E/O convertor 270 and an optical signal OA1 having the central wavelength of 1.3 μm and the bit transmission rate of 1.485 Gbps is obtained from the E/O convertor 270. The optical signal OA1 is guided through an optical connector 271 to an optical fiber data transmission line 272 to be transmitted to a receiving side.

Serial data DSA2 having the bit transmission rate of 1.485 Gbps is supplied to the E/O convertor 273 and an optical signal OA2 having the central wavelength of 1.3 μm and the bit transmission rate of 1.485 Gbps is obtained from the E/O convertor 273. The optical signal OA2 is guided through an optical connector 274 to an optical fiber data transmission line 275 to be transmitted to a receiving side.

Serial data DSB1 having the bit transmission rate of 1.485 Gbps is supplied to the E/O convertor 276 and an optical signal OB1 having the central wavelength of 1.3 μm and the bit transmission rate of 1.485 Gbps is obtained from the E/O convertor 276. The optical signal OB1 is guided through an optical connector 277 to an optical fiber data transmission line 278 to be transmitted to a receiving side.

Further, serial data DSB2 having the bit transmission rate of 1.485 Gbps is supplied to the E/O convertor 279 and an optical signal OB2 having the central wavelength of 1.31 μm and the bit transmission rate of 1.485 Gbps is obtained from the E/O convertor 279. The optical signal OB2 is guided through an optical connector 280 to an optical fiber data transmission line 281 to be transmitted to a receiving side.

Each of the optical fiber data transmission lines 272, 275, 278 and 281 is made of, for example, fused quartz SMF.

In the receiving side, the optical signal OA1 transmitted through the optical fiber data transmission line 272 is guided through an optical connector 282 to the O/E convertor 283. The serial data DSA1 are reproduced based on the optical signal OA1 to be transmitted at the bit transmission rata of 1.485 Gbps in the O/E convertor 283. The optical signal OA2 transmitted through the optical fiber data transmission line 275 is guided through an optical connector 284 to the O/E convertor 285. The serial data DSA2 are reproduced based on the optical signal OA2 to be transmitted at the bit transmission rata of 1.485 Gbps in the O/E convertor 285. The optical signal OBI transmitted through the optical fiber data transmission line 278 is guided through an optical connector 286 to the O/E convertor 287. The serial data DSB1 are reproduced based on the optical signal OB1 to be transmitted at the bit transmission rata of 1.485 Gbps in the O/E convertor 287. The optical signal OB2 transmitted through the optical fiber data transmission line 281 is guided through an optical connector 288 to the O/E convertor 289. The serial data DSB2 are reproduced based on the optical signal OB2 to be transmitted at the bit transmission rata of 1.485 Gbps in the O/E convertor 289.

As described above, in the eleventh example having the part shown in FIG. 32, the optical signals OA1, OA2, OB1 and OB2 in the form of four channel signals are transmitted through the optical fiber data transmission lines 272, 275, 278 and 281, respectively.

The other operations of the eighth example are the same as those in the tenth example shown in FIGS. 23 and 24.

Figure 33:
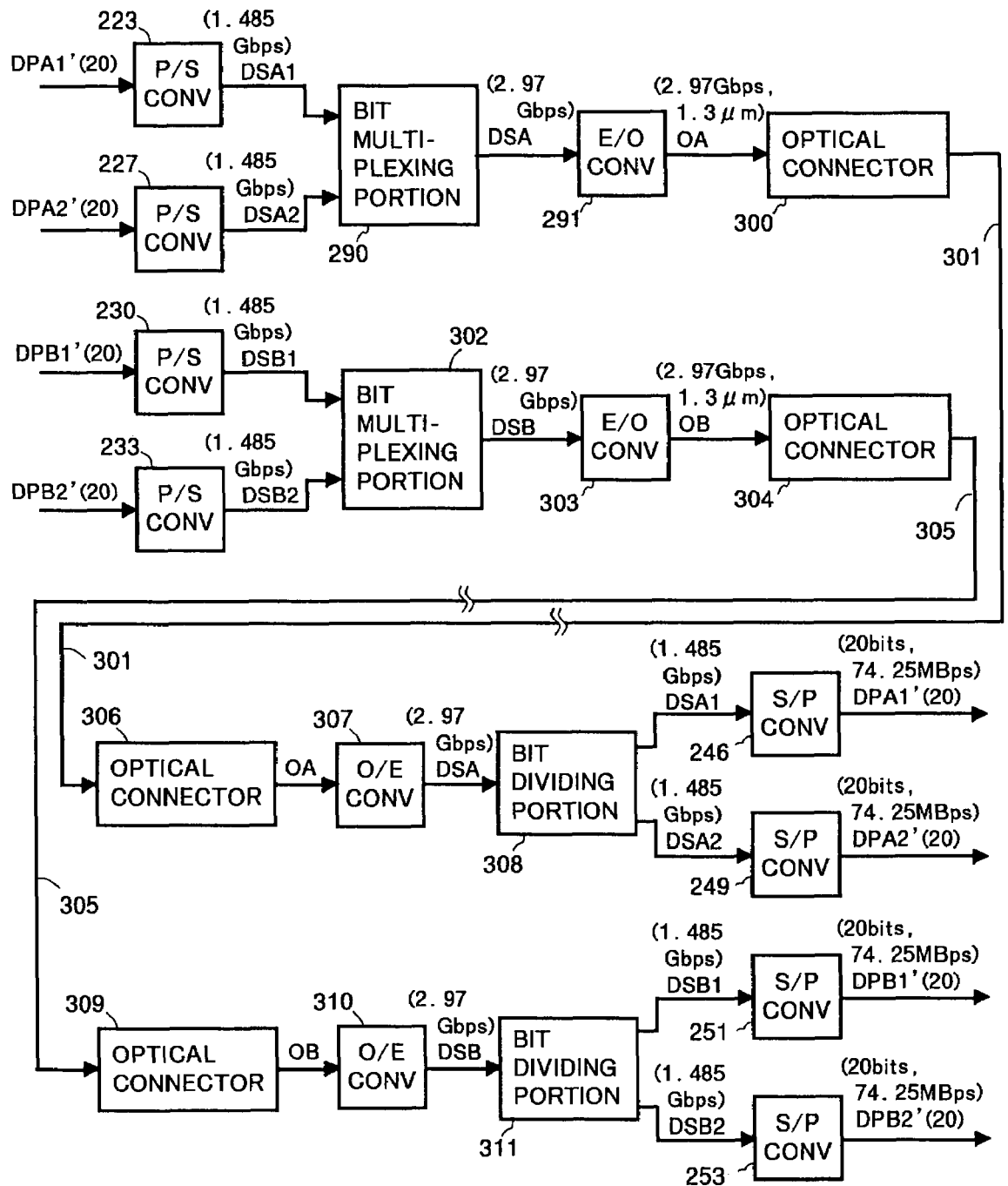
FIG. 33 is a schematic block diagram showing a part of a twelfth example of a data transmitting and receiving apparatus including a third embodiment of apparatus for receiving digital data according to the ninth aspect of the present invention, in which a third embodiment of data time difference absorbing circuit according to the third aspect of the present invention is employed and a third embodiment of method of receiving digital data according to the sixth aspect of the present invention is carried out.

FIG. 33 shows a part of a twelfth example of a data transmitting and receiving apparatus including a third embodiment of apparatus for receiving digital data according to the ninth aspect of the present invention, in which a third embodiment of data time difference absorbing circuit according to the third aspect of the present invention is employed and a third embodiment of method of receiving digital data according to the sixth aspect of the present invention is carried out.

The twelfth example, a part of which is shown in FIG. 33, has a number of blocks constituted in the same manner as those in the tenth example shown in FIGS. 23 and 24 and blocks in the eighth example which are constituted to be different from those in the tenth example are shown in FIG. 33.

Referring to FIG. 33, bit multiplexing portions 290 and 302, E/O convertors 291 and 303, O/E convertors 307 and 310 and bit dividing portions 308 and 311 are provided in place of the E/O convertors 224, 228, 231 and 234, the wave multiplexing portion 225, the wave dividing portion 241 and the O/E convertors 242, 243, 244 and 245 employed in the tenth example shown in FIGS. 23 and 24.

In the twelfth example, a part of which is shown in FIG. 33, serial data DSA1 having the bit transmission rate of 1.485 Gbps from a P/S convertor 223 and serial data DSA2 having the bit transmission rate of 1.485 Gbps from a P/S convertor 227 are supplied to the bit multiplexing portion 290. In the bit multiplexing portion 290, the serial data DSA1 and DSA2 are multiplexed with each other to produce multiplexed serial data DSA having the bit transmission rate of 1.485 Gbps×2=2.97 Gbps. The multiplexed serial data DSA are supplied to the E/O convertor 291 and an optical signal OA produced based on the multiplexed serial data DSA to have the central wavelength of about 1.3 μm and the bit transmission rate of 2.97 Gbps is obtained from the E/O convertor 291. The optical signal OA thus obtained is guided through an optical connector 300 to an optical fiber data transmission line 301 to be transmitted to a receiving side.

Similarly, serial data DSB1 having the bit transmission rate of 1.485 Gbps from a P/S convertor 230 and serial data DSB2 having the bit transmission rate of 1.485 Gbps from a P/S convertor 233 are supplied to the bit multiplexing portion 302. In the bit multiplexing portion 302, the serial data DSB1 and DSB2 are multiplexed with each other to produce multiplexed serial data DSB having the bit transmission rate of 1.485 Gbps×2=2.97 Gbps. The multiplexed serial data DSB are supplied to the E/O convertor 303 and an optical signal OB produced based on the multiplexed serial data DSB to have the central wavelength of about 1.3 μm and the bit transmission rate of 2.97 Gbps is obtained from the E/O convertor 303. The optical signal OB thus obtained is guided through an optical connector 304 to an optical fiber data transmission line 305 to be transmitted to the receiving side.

In the receiving side, the optical signal OA transmitted through the optical fiber data transmission line 301 is guided through an optical connector 306 to the O/E convertor 307. The multiplexed serial data DSA are reproduced based on the optical signal OA to be transmitted at the bit transmission rata of 2.97 Gbps in the O/E convertor 307 and supplied to the bit dividing portion 308. In the bit dividing portion 308, the multiplexed serial data DSA are subjected to bit dividing process to reproduce the serial data DSA1 and DSA2 each having the bit transmission rate of 1.485 Gbps. The serial data DSA1 and DSA2 thus reproduced are supplied to S/P convertors 246 and 249, respectively.

Similarly, the optical signal OB transmitted through the optical fiber data transmission line 305 is guided through an optical connector 309 to the O/E convertor 310. The multiplexed serial data DSB are reproduced based on the optical signal OB to be transmitted at the bit transmission rata of 2.97 Gbps in the O/E convertor 310 and supplied to the bit dividing portion 311. In the bit dividing portion 311, the multiplexed serial data DSB are subjected to bit dividing process to reproduce the serial data DSB1 and DSB2 each having the bit transmission rate of 1.485 Gbps. The serial data DSB1 and DSB2 thus reproduced are supplied to S/P convertors 251 and 253, respectively.

In the S/P convertors 246, 249, 251 and 253, the 20-bit word sequence data DPA1' (20), DPA2' (20), DPB1' (20) and DPB2' (20) each having the word transmission rate of 74.25 MBps are reproduced, respectively.

As described above, in the twelfth example having the part shown in FIG. 33, the optical signals OA and OB in the form of two channel signals are transmitted through the optical fiber data transmission lines 301 and 305, respectively.

The other operations of the twelfth example are the same as those in the tenth example shown in FIGS. 23 and 24.

APPLICABILITY FOR INDUSTRIAL USE

As apparent from the above description, with the data time difference absorbing circuit according to each of the first to third aspects of the present invention, digital data read respectively from plural memories are obtained without any substantial time difference between each two of them in either case where at least one of digital data stored respectively in the plural memories retard in relation to the rest of the digital data stored respectively in the plural memories or at least one of digital data stored respectively in the plural memories advance in relation to the rest of the digital data stored respectively in the plural memories. This means that a time difference between each two of digital data stored respectively in plural memories can be absorbed appropriately and effectively with the data time difference absorbing circuit according to each of the first, second and third aspect of the present invention.

Further, with the method of receiving digital data according to each of the fourth to sixth aspects of the present invention or the apparatus for receiving digital data according to each of the seventh to ninth aspects of the present invention, in which plural memories for digital data transmitted thorough data transmission lines are provided, digital data read respectively from the memories are obtained without any substantial time difference between each two of them in either case where at least one of the digital data stored respectively in the memories retard in relation to the rest of the digital data stored respectively in the memories or at least one of the digital data stored respectively in the memories advance in relation to the rest of the digital data stored respectively in the memories. This means that a time difference between each two of digital data transmitted through data transmission lines can be absorbed appropriately and effectively with the method of receiving digital data according to each of the fourth to sixth aspects of the present invention or the apparatus for receiving digital data according to each of the seventh to ninth aspects of the present invention.

The invention claimed is:

1. A data time difference absorbing circuit comprising;
    a first memory in which each part having predetermined data amount of first digital data containing first time reference code data relating to the start and end of active video is stored one by one and from which each stored part of the first digital data is read one by one,
    a second memory in which each part having predetermined data amount of second digital data containing second time reference code data relating to the start and end of active video is stored one by one and from which each stored part of the second digital data is read one by one,
    data detecting means for detecting the first time reference code data contained in the first digital data read from the first memory and the second time reference code data contained in the second digital data read from the second memory,
    phase difference detecting means for detecting a phase difference between the first and second time reference code data detected by the data detecting means, and
    memory controlling means operative to control at least one of a first timing at which the first digital data are read from the first memory and a second timing at which the second digital data are read from the second memory in response to the phase difference detected by the phase difference detecting means so as to keep a condition in which the phase difference detected by the phase difference detecting means is substantially zero.

2. A data time difference absorbing circuit according to claim 1, wherein said memory controlling means is operative to cause the first and second digital data to be read from the first and second memories, respectively, in accordance with a reading clock signal common to the first and second memories and to prevent temporarily one of the first and second digital data from being read from one of the first and second memories in response to the phase difference detected by the phase difference detecting means.

3. A data time difference absorbing circuit according to claim 2, wherein said memory controlling means is operative to prevent one of the first and second digital data from being read from one of the first and second memories for one clock period of the reading clock signal, repeatedly as occasion demands, in response to the phase difference detected by the phase difference detecting means.

4. A data time difference absorbing circuit according to claim 2, wherein said memory controlling means is operative to produce the reading clock and first and second reading enable signals, to supply the first memory with the reading clock signal and the first reading enable signal and supply the second memory with the reading clock signal and the second reading enable signal, and to prevent temporarily one of the first and second digital data from being read from one of the first and second memories by means of the one of the first and second reading enable signals in response to the phase difference detected by the phase difference detecting means.

5. A data time difference absorbing circuit according to claim 4, wherein said memory controlling means is operative to prevent one of the first and second digital data from being read from one of the first and second memories for one clock period of the reading clock signal, repeatedly as occasion demands, by means of the one of the first and second reading enable signals in response to the phase difference detected by the phase difference detecting means.

6. A data time difference absorbing circuit comprising;
a first memory in which each part having predetermined data amount of first digital data containing first time reference code data relating to the start and end of active video is stored one by one and from which each stored part of the first digital data is read one by one,
a second memory in which each part having predetermined data amount of second digital data containing second time reference code data relating to the start and end of active video is stored one by one and from which each stored part of the second digital data is read one by one,
a third memory in which each part having predetermined data amount of third digital data containing third time reference code data relating to the start and end of active video is stored one by one and from which each stored part of the third digital data is read one by one,
data detecting means for detecting the first time reference code data contained in the first digital data read from them first memory, the second time reference code data contained in the second digital data read from the second memory and the third time reference code data contained in the third digital data read from the third memory,
phase difference detecting means for detecting a phase difference between each two of the first, second and third time reference code data detected by the data detecting means, and
memory controlling means operative to control at least one of a first timing at which the first digital data are read from the first memory, a second timing at which the second digital data are read from the second memory and a third timing at which the third digital data are read from the third memory in response to the phase difference detected by the phase difference detecting means so as to keep a condition in which the phase difference detected by the phase difference detector is substantially zero.

7. A data time difference absorbing circuit according to claim 6, wherein said memory controlling means is operative to cause the first, second and third digital data to be read from the first, second and third memories, respectively, in accordance with a reading clock signal common to the first, second and third memories and to prevent temporarily one of the first, second and third digital data from being read from one of the first, second and third memories in response to the phase difference detected by the phase difference detecting means.

8. A data time difference absorbing circuit according to claim 7, wherein said memory controlling means is operative to prevent one of the first, second and third digital data from being read from one of the first, second and third memories for one clock period of the reading clock signal, repeatedly as occasion demands, in response to the phase difference detected by the phase difference detecting means.

9. A data time difference absorbing circuit according to claim 7, wherein said memory controlling means is operative to produce the reading clock and first, second and third reading enable signals, to supply the first memory with the reading clock signal and the first reading enable signal, the second memory with the reading clock signal and the second reading enable signal and the third memory with the reading clock signal and the third reading enable signal, and to prevent temporarily one of the first, second and third digital data from being read from one of the first, second and third memories by means of the one of the first, second and third reading enable signals in response to the phase difference detected by the phase difference detecting means.

10. A data time difference absorbing circuit according to claim 9, wherein said memory controlling means is operative to prevent one of the first, second and third digital data from being read from one of the first, second and third memories for one clock period of the reading clock signal, repeatedly as occasion demands, by means of the one of the first, second and third reading enable signals in response to the phase difference detected by the phase difference detecting means.

11. A data time difference absorbing circuit comprising;
a first memory in which each part having predetermined data amount of first digital data containing first time reference code data relating to the start and end of active video is stored one by one and from which each stored part of the first digital data is read one by one,
a second memory in which each part having predetermined data amount of second digital data containing second time reference code data relating to the start and end of active video is stored one by one and from which each stored part of the second digital data is read one by one,
a third memory in which each part having predetermined data amount of third digital data containing third time reference code data relating to the start and end of active video is stored one by one and from which each stored part of the third digital data is read one by one,
a fourth memory in which each part having predetermined data amount of fourth digital data containing fourth time reference code data relating to the start and end of active video is stored one by one and from which each stored part of the fourth digital data is read one by one,
data detecting means for detecting the first time reference code data contained in the first digital data read from them first memory, the second time reference code data contained in the second digital data read from the second memory, the third time reference code data contained in the third digital data read from the third memory and the fourth time reference code data contained in the fourth digital data read from the fourth memory,
phase difference detecting means for detecting phase difference between each two of the first, second, third and fourth time reference code data detected by the data detecting means, and
memory controlling means operative to control at least one of a first timing at which the first digital data are read from the first memory, a second timing at which the second digital data are read from the second memory, a third timing at which the third digital data are read from the third memory and a fourth timing at which the fourth digital data are read from the fourth memory in response to the phase difference detected by the phase difference detecting means so as to keep a condition in which the phase difference detected by the phase difference detector is substantially zero.

12. A data time difference absorbing circuit according to claim 11, wherein said memory controlling means is operative to cause the first, second, third and fourth digital data to be read from the first, second, third and fourth memories, respectively, in accordance with a reading clock signal common to the first, second, third and fourth memories and to prevent temporarily one of the first, second, third and fourth digital data from being read from one of the first, second, third and fourth memories in response to the phase difference detected by the phase difference detecting means.

13. A data time difference absorbing circuit according to claim 12, wherein said memory controlling means is operative to prevent one of the first, second, third and fourth digital data from being read from one of the first, second, third and fourth memories for one clock period of the reading clock signal, repeatedly as occasion demands, in response to the phase difference detected by the phase difference detecting means.

14. A data time difference absorbing circuit according to claim 12, wherein said memory controlling means is operative to produce the reading clock and first, second, third and fourth reading enable signals, to supply the first memory with the reading clock signal and the first reading enable signal, the second memory with the reading clock signal and the second reading enable signal, the third memory with the reading clock signal and the third recording enable signal and the fourth memory with the reading clock signal and the fourth reading enable signal, and to prevent temporarily one of the first, second, third and fourth digital data from being read from one of the first, second, third and fourth memories by means of the one of the first, second, third and fourth reading enable signals in response to the phase difference detected by the phase difference detecting means.

15. A data time difference absorbing circuit according to claim 14, wherein said memory controlling means is operative to prevent one of the first, second, third and fourth digital data from being read from one of the first, second, third and fourth memories for one clock period of the reading clock signal, repeatedly as occasion demands, by means of the one of the first, second, third and fourth reading enable signals in response to the phase difference detected by the phase difference detecting means.

16. A method of receiving digital data comprising the steps of;
receiving a signal transmitted through a data transmission line,
obtaining a first digital data containing a first time reference code data relating to the start and end of active video and a second digital data containing a second time reference code data relating to the start and end of active video from the signal received,
storing each part having predetermined data amount of the first digital data in a first memory one by one and each part having predetermined data amount of the second digital data in a second memory one by one and then reading each stored part of the first digital data from the first memory one by one and each stored part of the second digital data from the second memory,
detecting the first time reference code data contained in the first digital data read from the first memory and the second time reference code data contained in the second digital data read from the second memory,
detecting a phase difference between the first and second time reference code data previously detected, and
controlling at least one of a first timing at which the first digital data are read from the first memory and a second timing at which the second digital data are read from the second memory in response to the phase difference previously detected so as to keep a condition in which the phase difference previously detected is substantially zero.

17. A method according to claim 16, wherein the first and second digital data are read from the first and second memories, respectively, in accordance with a reading clock signal common to the first and second memories and one of the first and second digital data are prevented temporarily from being read from one of the first and second memories in response to the phase difference previously detected.

18. A method according to claim 17, wherein one of the first and second digital data are prevented from being read from one of the first and second memories for one clock period of the reading clock signal, repeatedly as occasion demands, in response to the phase difference previously detected.

19. A method according to claim 17, wherein the reading clock signal and first reading enable signal are supplied to the first memory, the reading clock signal and second reading enable signal are supplied to the second memory, and one of the first and second digital data are prevented temporarily from being read from one of the first and second memories by means of the one of the first and second reading enable signals in response to the phase difference previously detected.

20. A method according to claim 19, wherein one of the first and second digital data are prevented from being read from one of the first and second memories for one clock period of the reading clock signal, repeatedly as occasion demands, by means of the one of the first and second reading enable signals in response to the phase difference previously detected.

21. A method of receiving digital data comprising the steps of;
receiving a signal transmitted through a data transmission line,
obtaining a first digital data containing a first time reference code data relating to the start and end of active video, a second digital data containing a second time reference code data relating to the start and end of active video and a third digital data containing a third time reference code data relating to the start and end of active video from the signal received,
storing each part having predetermined data amount of the first digital data in a first memory one by one, each part having predetermined data amount of the second digital data in a second memory one by one and each part having predetermined data amount of the third digital data in a third memory one by one and then reading each stored part of the first digital data from the first memory one by one, each stored part of the second digital data from the second memory and each stored part of the third digital data from the third memory,
detecting the first time reference code data contained in the first digital data read from the first memory, the second time reference code data contained in the second digital data read from the second memory and the third time reference code data contained in the third digital data read from the third memory, detecting a phase difference between each two of the first, second and third time reference code data previously detected, and controlling at least one of a first timing at which the first digital data are read from the first memory, a second timing at which the second digital data are read from the second memory and a third timing at which the third digital data are read from the third memory in response to the phase difference previously detected so as to keep a condition in which the phase difference previously detected is substantially zero.

22. A method according to claim 21, wherein the first, second and third digital data are read from the first, second and third memories, respectively, in accordance with a reading clock signal common to the first, second and third memories and one of the first, second and second digital data are prevented temporarily from being read from one of the first, second and third memories in response to the phase difference previously detected.

23. A method according to claim 22, wherein one of the first, second and third digital data are prevented from being read from one of the first, second and third memories for one clock period of the reading clock signal, repeatedly as occasion demands, in response to the phase difference previously detected.

24. A method according to claim 22, wherein the reading clock signal and first reading enable signal are supplied to the first memory, the reading clock signal and second reading enable signal are supplied to the second memory, the reading clock signal and third reading enable signal are supplied to the third memory, and one of the first, second and third digital data are prevented temporarily from being read from one of the first, second and third memories by means of the one of the first, second and third reading enable signals in response to the phase difference previously detected.

25. A method according to claim 24, wherein one of the first, second and third digital data are prevented from being read from one of the first, second and third memories for one clock period of the reading clock signal, repeatedly as occasion demands, by means of the one of the first, second and third reading enable signals in response to the phase difference previously detected.

26. A method of receiving digital data comprising the steps of;

receiving a signal transmitted through a data transmission line, obtaining a first digital data containing a first time reference code data relating to the start and end of active video, a second digital data containing a second time reference code data relating to the start and end of active video, a third digital data containing a third time reference code data relating to the start and end of active video and a fourth digital data containing a fourth time reference code data relating to the start and end of active video from the signal received, storing each part having predetermined data amount of the first digital data in a first memory one by one, each part having predetermined data amount of the second digital data in a second memory one by one, each part having predetermined data amount of the third digital data in a third memory one by one and each part having predetermined data amount of the fourth digital data in a fourth memory one by one and then reading each stored part of the first digital data from the first memory one by one, each stored part of the second digital data from the second memory, each stored part of the third digital data from the third memory and each stored part of the fourth digital data from the fourth memory, detecting the first time reference code data contained in the first digital data read from the first memory, the second time reference code data contained in the second digital data read from the second memory, the third time reference code data contained in the third digital data read from the third memory and the fourth time reference code data contained in the fourth digital data read from the fourth memory, detecting a phase difference between each two of the first, second, third and fourth time reference code data previously detected, and controlling at least one of a first timing at which the first digital data are read from the first memory, a second timing at which the second digital data are read from the second memory, a third timing at which the third digital data are read from the third memory and a fourth timing at which the fourth time reference code data contained in the fourth digital data read from the fourth memory in response to the phase difference previously detected so as to keep a condition in which the phase difference previously detected is substantially zero.

27. A method according to claim 26, wherein the first, second, third and fourth digital data are read from the first, second, third and fourth memories, respectively, in accordance with a reading clock signal common to the first, second and third memories and one of the first, second, third and fourth digital data are prevented temporarily from being read from one of the first, second, third and fourth memories in response to the phase difference previously detected.

28. A method according to claim 27, wherein one of the first, second, third and fourth digital data are prevented from being read from one of the first, second, third and fourth memories for one clock period of the reading clock signal, repeatedly as occasion demands, in response to the phase difference previously detected.

29. A method according to claim 27, wherein the reading clock signal and first reading enable signal are supplied to the first memory, the reading clock signal and second reading enable signal are supplied to the second memory, the reading clock signal and third reading enable signal are supplied to the third memory, the reading clock signal and fourth reading enable signal are supplied to the fourth memory, and one of the first, second, third and fourth digital data are prevented temporarily from being read from one of the first, second, third and fourth memories by means of the one of the first, second, third and fourth reading enable signals in response to the phase difference previously detected.

30. A method according to claim 29, wherein one of the first, second, third and fourth digital data are prevented from being read from one of the first, second, third and fourth memories for one clock period of the reading clock signal, repeatedly as occasion demands, by means of the one of the first, second, third and fourth reading enable signals in response to the phase difference previously detected.

31. An apparatus for receiving digital data comprising;

data receiving means for receiving a signal transmitted through a data transmission line, digital data producing means for obtaining a first digital data containing a first time reference code data relating to the start and end of active video and a second digital data containing a second time reference code data relating to the start and end of active video from the signal received by the data receiving means, a first memory in which each part having predetermined data amount of the first digital data is stored one by one and from which each stored part of the first digital data is read one by one, a second memory in which each part having predetermined data amount of the second digital data is stored one by one and from which each stored part of the second digital data is read one by one, data detecting means for detecting the first time reference code data contained in the first digital data read from the first memory and the second time reference code data contained in the second digital data read from the second memory, phase difference detecting means for detecting a phase difference between the first and second time reference code data detected by the data detecting means, and memory controlling means operative to control a first timing at which the first digital data are read from the first memory and a second timing at which the second digital data are read from the second memory in response to the phase difference detected by the phase difference detecting means so as to keep a condition in which the phase difference detected by the phase difference detecting means is substantially zero.

32. An apparatus according to claim 31, wherein said memory controlling means is operative to cause the first and second digital data to be read from the first and second memories, respectively, in accordance with a reading clock signal common to the first and second memories and to prevent temporarily one of the first and second digital data from being read from one of the first and second memories in response to the phase difference detected by the phase difference detecting means.

33. An apparatus according to claim 32, wherein said memory controlling means is operative to prevent one of the first and second digital data from being read from one of the first and second memories for one clock period of the reading clock signal, repeatedly as occasion demands, in response to the phase difference detected by the phase difference detecting means.

34. An apparatus according to claim 32, wherein said memory controlling means is operative to produce the reading clock and first and second reading enable signals, to supply the first memory with the reading clock signal and the first reading enable signal and supply the second memory with the reading clock signal and the second reading enable signal, and to prevent temporarily one of the first and second digital data from being read from one of the first and second memories by means of the one of the first and second reading enable signals in response to the phase difference detected by the phase difference detecting means.

35. An apparatus according to claim 34, wherein said memory controlling means is operative to prevent one of the first and second digital data from being read from one of the first and second memories for one clock period of the reading clock signal, repeatedly as occasion demands, by means of the one of the first and second reading enable signals in response to the phase difference detected by the phase difference detecting means.

36. An apparatus for receiving digital data comprising;
data receiving means for receiving a signal transmitted though a data transmission line,
digital data producing means for obtaining a first digital data containing a first time reference code data relating to the start and end of active video, a second digital data containing a second time reference code data relating to the start and end of active video and a third digital data containing a third time reference code data relating to the start and end of active video from the signal received by the data receiving portion, a first memory which each part having predetermined data amount of the first digital data is stored one by one and from which each stored part of the first digital data is read one by one, a second memory in which each part having predetermined data amount of the second digital data is stored one by one and from which each stored part of the second digital data is read one by one, a third memory in which each part having predetermined data amount of the third digital data is stored one by one and from which each stored part of the third digital data is read one by one, data detecting portion for detecting the first time reference code data contained in the first digital data read from the first memory, the second time reference code data contained in the second digital data read from the second memory and the third time reference code data contained in the third digital data read from the third memory, phase difference detecting means for detecting a phase difference between each two of the first, second and third time reference code data detected by the data detecting means, and memory controlling means operative to control a first timing at which the first digital data are read from the first memory, a second timing at which the second digital data are read from the second memory and a third timing at which the third digital data are read from the third memory in response to the phase difference detected by the phase difference detecting means so as to keep a condition in which the phase difference detected by the phase difference detecting means is substantially zero.

37. An apparatus according to claim 36, wherein said memory controlling means is operative to cause the first, second and third digital data to be read from the first, second and third memories, respectively, in accordance with a reading clock signal common to the first, second and third memories and to prevent temporarily one of the first, second and third digital data from being read from one of the first, second and third memories in response to the phase difference detected by the phase difference detecting means.

38. An apparatus according to claim 37, wherein said memory controlling means is operative to prevent one of the first, second and third digital data from being read from one of the first, second and third memories for one clock period of the reading clock signal, repeatedly as occasion demands, in response to the phase difference detected by the phase difference detecting means.

39. An apparatus according to claim 37, wherein said memory controlling means is operative to produce the reading clock and first, second and third reading enable signals, to supply the first memory with the reading clock signal and the first reading enable signal, the second memory with the reading clock signal and the second reading enable signal and the third memory with the reading clock signal and the third reading enable signal, and to prevent temporarily one of the first, second and third digital data from being read from one of the first, second and third memories by means of the one of the first, second and third reading enable signals in response to the phase difference detected by the phase difference detecting means.

40. An apparatus according to claim 39, wherein said memory controlling means is operative to prevent one of the first, second and third digital data from being read from one of the first, second and third memories for one clock period of the reading clock signal, repeatedly as occasion demands, by means of the one of the first, second and third reading enable signals in response to the phase difference detected by the phase difference detecting means.

41. An apparatus for receiving digital data comprising;

data receiving means for receiving a signal transmitted through a data transmission line, digital data producing means for obtaining a first digital data containing a first time reference code data relating to the start and end of active video, a second digital data containing a second time reference code data relating to the start and end of active video, a third digital data containing a third time reference code data relating to the start and end of active video and fourth digital data containing a fourth time reference code data relating to the start and end of active video from the signal received by the data receiving means, a first memory in which each part having predetermined data amount of the first digital data is stored one by one and from which each stored part of the first digital data is read one by one, a second memory in which each part having predetermined data amount of the second digital data is stored one by one and from which each stored part of the second digital data is read one by one, a third memory in which each part having predetermined data amount of the third digital data is stored one by one and from which each stored part of the third digital data is read one by one a fourth memory in which each part having predetermined data amount of the fourth digital data is stored one by one and from which each stored part of the fourth digital data is read one by one, data detecting means for detecting the first time reference code data contained in the first digital data read from the first memory, the second time reference code data contained in the second digital data read from the second memory, the third time reference code data contained in the third digital data read from the third memory and the fourth time reference code data contained in the fourth digital data read from the fourth memory, phase difference detecting means for detecting a phase difference between each two of the first, second, third and fourth time reference code data detected by the data detecting means, and memory controlling means operative to control a first timing at which the first digital data are read from the first memory, a second timing at which the second digital data are read from the second memory, a third timing at which the third digital data are read from the third memory, and a fourth timing at which the fourth digital data are read from the fourth memory in response to the phase difference detected by the phase difference detecting means so as to keep a condition in which the phase difference detected by the phase difference detecting means is substantially zero.

42. An apparatus according to claim 41, wherein said memory controlling means is operative to cause the first, second, third and fourth digital data to be read from the first, second, third and fourth memories, respectively, in accordance with a reading clock signal common to the first, second, third and fourth memories and to prevent temporarily one of the first, second, third and fourth digital data from being read from one of the first, second, third and fourth memories in response to the phase difference detected by the phase difference detecting means.

43. An apparatus according to claim 42, wherein said memory controlling means is operative to prevent one of the first, second, third and fourth digital data from being read from one of the first, second, third and fourth memories for one clock period of the reading clock signal, repeatedly as occasion demands, in response to the phase difference detected by the phase difference detecting means.

44. An apparatus according to claim 42, wherein said memory controlling means is operative to produce the reading clock and first, second, third and fourth reading enable signals, to supply the first memory with the reading clock signal and the first reading enable signal, the second memory with the reading clock signal and the second reading enable signal, the third memory with the reading clock signal and the third recording enable signal and the fourth memory with the reading clock signal and the fourth reading enable signal, and to prevent temporarily one of the first, second, third and fourth digital data from being read from one of the first, second, third and fourth memories by means of the one of the first, second, third and fourth reading enable signals in response to the phase difference detected by the phase difference detecting means.

45. An apparatus according to claim 44, wherein said memory controlling means is operative to prevent one of the first, second, third and fourth digital data from being read from one of the first, second, third and fourth memories for one clock period of the reading clock signal, repeatedly as occasion demands, by means of the one of the first, second, third and fourth reading enable signals in response to the phase difference detected by the phase difference detecting means.

* * * * *